US009256960B2

(12) United States Patent
Sasai et al.

(10) Patent No.: US 9,256,960 B2
(45) Date of Patent: Feb. 9, 2016

(54) IMAGE CODING METHOD AND IMAGE DECODING METHOD

(75) Inventors: Hisao Sasai, Osaka (JP); Takahiro Nishi, Nara (JP); Youji Shibahara, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 85 days.

(21) Appl. No.: 13/985,640

(22) PCT Filed: Feb. 20, 2012

(86) PCT No.: PCT/JP2012/001104
§ 371 (c)(1), (2), (4) Date: Aug. 15, 2013

(87) PCT Pub. No.: WO2012/114711
PCT Pub. Date: Aug. 30, 2012

(65) Prior Publication Data

US 2013/0322774 A1 Dec. 5, 2013

Related U.S. Application Data

(60) Provisional application No. 61/445,580, filed on Feb. 23, 2011, provisional application No. 61/450,827, filed on Mar. 9, 2011.

(51) Int. Cl.

| | |
|---|---|
| *G06K 9/36* | (2006.01) |
| *G06T 9/00* | (2006.01) |
| *H04N 19/13* | (2014.01) |

(Continued)

(52) U.S. Cl.
CPC *G06T 9/00* (2013.01); *H04N 19/13* (2014.11); *H04N 19/436* (2014.11); *H04N 19/61* (2014.11)

(58) Field of Classification Search
USPC .......... 382/233, 235, 243, 244, 248; 358/539, 358/426.03, 426.04
See application file for complete search history.

(56) References Cited

U.S. PATENT DOCUMENTS 7,330,139 B2 * 2/2008 Kim et al. .................... 341/107
7,336,720 B2 * 2/2008 Martemyanov et al. . 375/240.12

(Continued)

FOREIGN PATENT DOCUMENTS

JP 2005-130099 5/2005
JP 2009-207029 9/2009

OTHER PUBLICATIONS

International Search Report issued May 22, 2012 in corresponding International Application No. PCT/JP2012/001104.

(Continued)

*Primary Examiner* — Yosef Kassa
(74) *Attorney, Agent, or Firm* — Wenderoth, Lind & Ponack, L.L.P.

(57) ABSTRACT

An image decoding method includes: arithmetic decoding steps for performing arithmetic decoding processes on decoding target signals according to contexts determined based on the types of the decoding target signals and the symbol occurrence probabilities determined based on the contexts; and a context update step for executing a group of context update processes on the decoding target signals in each of processing units each obtained as a segment having a certain size, according to the decoded signals resulting from the arithmetic decoding processes.

7 Claims, 43 Drawing Sheets

(51) Int. Cl.
*H04N 19/61* (2014.01)
*H04N 19/436* (2014.01)

(56) References Cited

U.S. PATENT DOCUMENTS

| | | | | |
|---|---|---|---|---|
| 7,742,528 | B2 * | 6/2010 | Kondo et al. | 375/240.23 |
| 7,821,430 | B2 | 10/2010 | Sakaguchi | |
| 7,970,059 | B2 * | 6/2011 | Kondo | H03M 7/40 375/240.23 |
| 8,005,146 | B2 * | 8/2011 | Kondo | H03M 7/40 375/240.23 |
| 8,098,736 | B2 * | 1/2012 | Kondo | H03M 7/40 375/240.23 |
| 8,345,767 | B2 * | 1/2013 | Nanbu et al. | 375/240.23 |
| 8,687,904 | B2 * | 4/2014 | Sasai et al. | 382/247 |
| 8,755,620 | B2 * | 6/2014 | Sasai | H03M 7/4018 382/233 |
| 2005/0088324 | A1 | 4/2005 | Fuchigami et al. | |
| 2007/0115154 | A1 | 5/2007 | Park et al. | |
| 2009/0219183 | A1 | 9/2009 | Sakaguchi | |

OTHER PUBLICATIONS

ISO/IEC 14496-10 (MPEG-4 Part10: Advanced Video Coding), Oct. 1, 2004.

Thomas Wiegand et al., "Overview of the H.264/AVC Video Coding Standard", IEEE Transactions on Circuits and Systems for Video Technology, Jul. 2003, pp. 1-19.

Dake He et al., "Improving throughput for V2V coding in HEVC", Joint Collaborative Team on Video Coding (JCT-VC) of ITU-T SG16 WP3 and ISO/IEC JTC1/SC29/WG11 2nd Meeting: Geneva, CH, Jul. 21-28, 2010, [JCTVC-B036].

Madhukar Budagavi et al., "Parallel Context Processing techniques for high coding efficiency entropy coding in HEVC.", Joint Collaborative Team on Video Coding (JCT-VC) of ITU-T SG16 WP3 and ISO/IEC JTC1/SC29/WG11 2nd Meeting: Geneva, CH, Jul. 21-28, 2010, [JCTVC-B088].

* cited by examiner

FIG. 3

| Index ctxIdx | Occurrence probability pStateIdx | Symbol valMPS |
|---|---|---|
| 0 | 12 | 1 |
| 1 | 7 | 0 |
| 2 | 41 | 0 |
| 3 | 22 | 1 |
| 4 | 10 | 1 |
| 5 | 8 | 0 |
| 6 | 50 | 1 |
| ⋮ | ⋮ | ⋮ |

(a)

(b)

(c)

| Index ctxIdx | Occurrence probability |
|---|---|
| 0 | 1, 0, 0, 1, 1 |
| 1 | 0, 0 |
| 2 | 1, 1, 1 |
| 3 | 0 |
| 4 | |
| ⋮ | ⋮ |

FIG. 5

| pStateIdx | 0 | 1 | 2 | 3 | 4 | 5 | 6 | 7 | 8 | 9 | ... | 57 | 58 | 59 | 60 | 61 | 62 | 63 |
|---|---|---|---|---|---|---|---|---|---|---|---|---|---|---|---|---|---|---|
| transIdxLPS | 0 | 0 | 1 | 2 | 2 | 4 | 4 | 5 | 6 | 7 | ... | 36 | 37 | 37 | 37 | 38 | 38 | 63 |
| transIdxMPS | 1 | 2 | 3 | 4 | 5 | 6 | 7 | 8 | 9 | 10 | ... | 58 | 59 | 60 | 61 | 62 | 62 | 63 |

(a)

(b)

(c)

| Index ctxIdx | Occurrence probability |
|---|---|
| 0 | 1, 0, 0, 1, 1 |
| 1 | 0, 0 |
| 2 | 1, 1, 1 |
| 3 | 0 |
| 4 | |
| ⋮ | ⋮ |

FIG. 31

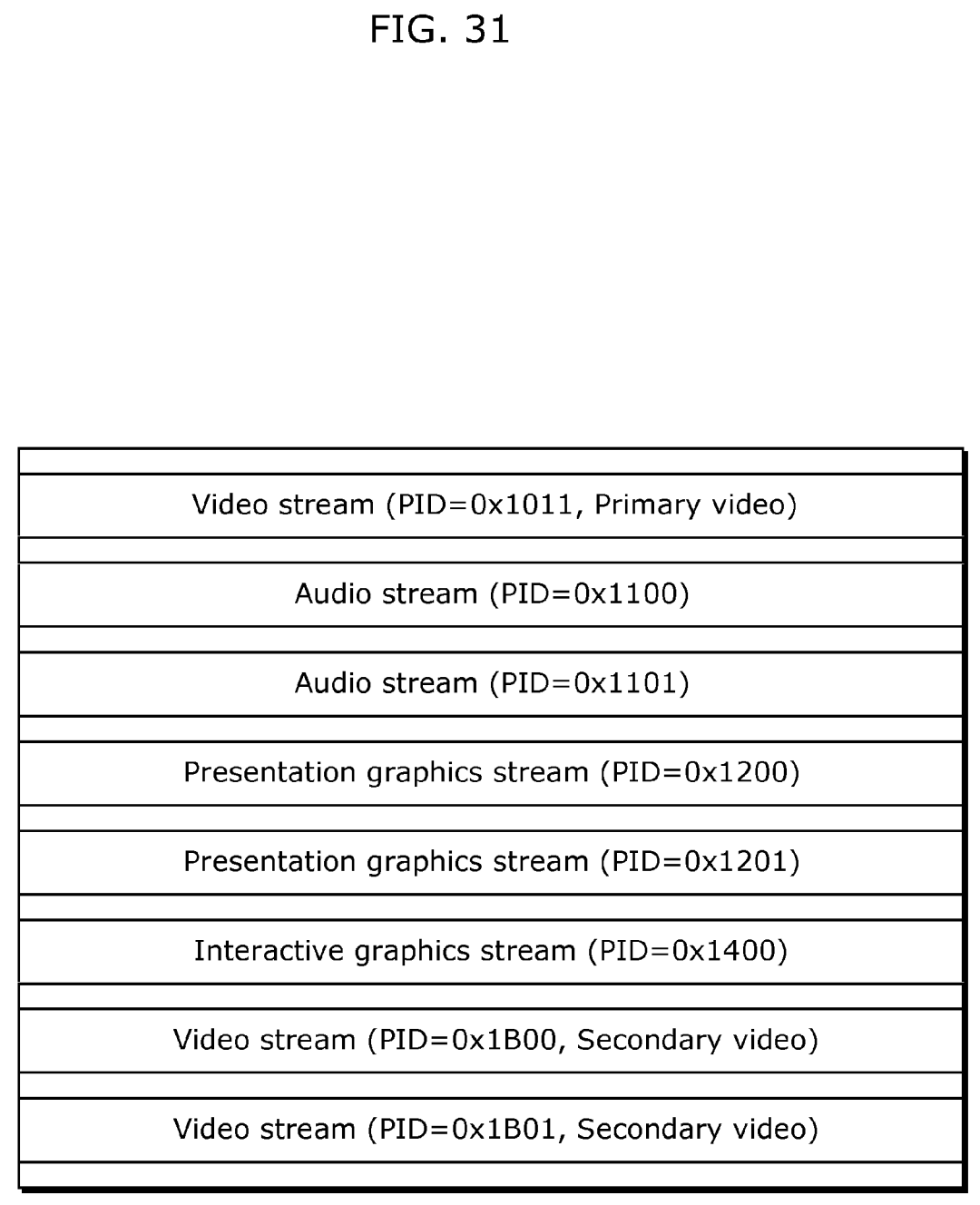

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) | ex800

FIG. 42

| Corresponding standard | Driving frequency |
|---|---|
| MPEG-4 AVC | 500 MHz |
| MPEG-2 | 350 MHz |
| ⋮ | ⋮ |

(a)

(b)

IMAGE CODING METHOD AND IMAGE DECODING METHOD

TECHNICAL FIELD

The present invention relates to image coding methods, image decoding methods, image coding apparatuses, and image decoding apparatuses, and relates particularly to image coding methods and image decoding methods which involve arithmetic coding and arithmetic decoding, and image coding apparatuses and image decoding apparatuses which perform arithmetic coding and arithmetic decoding.

BACKGROUND ART

Recent years have seen an increase in the number of applications for services of, for example, video on demand type services. Examples of such services include video-conferencing through the Internet, digital video broadcasting, and streaming of video contents. These applications rely on transmission of video information. When video data is transmitted or recorded, a considerable amount of data is transmitted through a conventional transmission path having a limited bandwidth or is stored in a conventional recording medium having a limited data storage capacity. In order to transmit the video information through the conventional transmission channel or store the video information onto the storage medium, it is essential to compress or reduce the amount of digital data.

For the purpose of compressing video data, many video coding standards have been developed. Such video coding standards are, for instance, the International Telecommunication Union Telecommunication Standardization Sector (ITU-T) standards denoted as H.26× and the ISO/IEC standards denoted as MPEG-x. The most advanced video coding standards are currently the standards denoted as H.264/AVC or MPEG-4/AVC (see Non-patent Literature 1 and Non-patent Literature 2).

The data compression processes in the H.264/AVC Standard is roughly divided into prediction, transform, quantization, and entropy coding. The entropy coding is intended to reduce redundant information in information to be used for the prediction and quantized information. Representatives of entropy coding include variable-length coding, adaptive coding, and fixed-length coding. Representatives of variable-length coding include Huffman coding, run-length coding, and arithmetic coding. Among these, arithmetic coding is known as a scheme which is intended to determine output codes by calculating symbol occurrence probabilities and which provides a high coding efficiency by determining codes according to the features of image data, compared to Huffman coding which uses a fixed coding table.

With reference to FIGS. 22 to 24, a conventional arithmetic decoding method is described.

First, a flow of arithmetic decoding is described below with reference to FIGS. 22 to 24.

FIG. 22 is a block diagram of a structure of an arithmetic decoder which performs conventional H.264/AVC arithmetic decoding processes. As shown in FIG. 22, the arithmetic decoder 90 includes a context selection (Context Selection) unit 91, a context load (Context Load) unit 92, a binary arithmetic decoder (Bin Decoder) 93, a de-binarizer (De-Binarizer) 94, a context update (Context Update) unit 95, and context memory (Context Memory) 96.

FIG. 23 is a flowchart of the arithmetic decoding processes.

First, the context selection unit 91 performs a process for selecting a context for each of decoding target signals (Step S01). In the context selection, for example, an already decoded decoding symbol or an already decoded signal of a de-binarized neighboring block is obtained. According to a predetermined method, the context is determined and the determined context number is notified to the context load unit 92.

The context load unit 92 loads a symbol occurrence probability corresponding to the context specified by the context memory 96 according to the context number (Step S02). Based on the loaded symbol occurrence probability, the binary arithmetic decoder 93 performs an arithmetic decoding process (Step S03).

The context update unit 95 performs an update process on the context used for decoding from the decoding symbol resulting from the arithmetic decoding (Step S04). In the context update process, the symbol occurrence probability corresponding to the context is updated, and the updated symbol occurrence probability is stored in the context memory 96. On the other hand, the decoded symbols resulting from the arithmetic decoding are subjected to a de-binarization process (Step S05), and decoded signals obtained from the decoding target signals are output.

FIG. 24 is a schematic diagram of processing timings for parallel processes implemented to perform faster arithmetic decoding processes.

FIG. 24 illustrates, along a time axis, a context selection process (CS), a context load process (CL), a binary arithmetic decoding process (BAD), and a context update (CU) operation in a processing circuit for a process 1 (Proc1). For simplicity, the time periods required for the respective processes and operation are equal in FIG. 24. This example also shows a process 2 (Proc2), a process 3 (Proc3), and a process 4 (Proc4).

Each of parts associated by a corresponding one of the arrows in the diagram has a dependency that they need to be processed in the sequence shown by the arrow. In the binary arithmetic decoding process, a current internal state in binary arithmetic decoding is updated for each decoding. This is why the binary arithmetic decoding process involves such a dependency. In addition, in the case where the same context is used (as in the case shown in the diagram), a result of updating the context is further used for reference, and thus there is a dependency between the context update (CU) and the context load (CL) for next decoding.

CITATION LIST

Patent Literature

[NPL 1]

ISO/IEC14496-10 “MPEG4 Part 10 Advanced Video Coding”

[NPL 2]

Thomas Wiegand et al, “Overview of the H.264/AVC Video Coding Standard”, IEEE TRANSACTIONS ON CIRCUITS AND SYSTEMS FOR VIDEO TECHNOLOGY, JULY 2003, PP, 1-19

SUMMARY OF INVENTION

Technical Problem

However, in the aforementioned conventional technique, the context update result is further used for reference when the same context is used as explained in FIG. 24, the context update (CU) and the context load (CL) for the next decoding have the dependency. For this reason, processing delay (latency) corresponding to three processing units is required as shown in FIG. 24, which reduces an execution time reduction effect by parallel processes.

The present invention was made to solve the aforementioned problem, with an aim to facilitate parallelization of processes and to provide an image coding method and an image decoding method which makes it possible to keeping coding efficiencies.

Solution to Problem

An image decoding method according to an aspect of the present invention is a method for decoding coded image data. More specifically, the image decoding method includes: performing arithmetic decoding on each of decoding target signals according to a context determined based on a type of the decoding target signal and a symbol occurrence probability determined based on the context; and executing a group of context update processes on signals in each of processing units each obtained as a segment having a certain size, according to the decoded signal resulting from the arithmetic decoding.

With this, it is possible to determine the processing order of the signals in the processing unit without depending on the selected contexts. For this reason, it is possible to facilitate the parallelization of the processes on the signals in the processing unit, and to thereby perform fast parallel decoding processes on a larger amount of data (such as high resolution video signals).

As an example, the processing unit may be a block.

In addition, in the executing, the context update processes on the signals in the processing unit may be executed in an order inverse to a decoding order of the signals.

In addition, in the executing, the context update processes may be executed such that part of signals including decoding symbols in the processing unit are executed last in the processing unit and in an order inverse to a decoding order of the part of signals.

An image coding method according to another aspect of the present invention is a method for compression coding image data. More specifically, the image coding method includes: performing arithmetic coding on each of coding target signals according to a context determined based on a type of the coding target signal and a symbol occurrence probability determined based on the context; and executing a group of context update processes on signals in each of processing units each obtained as a segment having a certain size, according to the coded signal resulting from the arithmetic coding.

As an example, the processing unit may be a block.

In addition, in the executing, the context update processes on the signals in the processing unit may be executed in an order inverse to a coding order of the signals.

In addition, in the executing, the context update processes may be executed such that part of signals including coding symbols in the processing unit are executed last and in an order inverse to a coding order of the part of signals.

It is to be noted that the present invention can be realized not only as an image coding method and an image decoding method but also as an apparatus including processing units which execute the processing steps of the image coding method and the image decoding method. In addition, these steps may be implemented as a program causing a computer to execute these steps. Furthermore, the present invention may be realized as a recording medium such as a computer readable Compact Disc-Read Only Memory (CD-ROM) having the program recorded thereon, or information, data, or a signal representing the program. The program, information, data, or signal may be distributed through communication networks such as the Internet.

In addition, a part or all of the structural elements of the image coding apparatus and the image decoding apparatus may be configured with a single system Large-Scale Integration (LSI). The system LSI is a super multi function LSI manufactured by integrating structural units on a single chip, and is specifically a computer system configured to include a microprocessor, a ROM, a Random Access Memory (RAM), and so on.

An image decoding method according to another aspect of the present invention is a method for decoding coded image data. More specifically, the image decoding method is intended to perform arithmetic decoding on each of decoding target signals according to a context determined based on the type of the decoding target signal and a symbol occurrence probability determined based on the context, execute a group of context update processes on signals in each of processing units, according to the decoded signal resulting from the arithmetic decoding, and to thereby reduce dependencies on a processing order of contexts which are used for reference in the decoding.

An image coding method according to another aspect of the present invention is a method for compression-coding image data. More specifically, the image coding method is intended to perform arithmetic coding on each of coding target signals according to a context determined based on the type of the coding target signal and a symbol occurrence probability determined based on the context, execute a group of context update processes on signals in each of processing units, according to the coded signal resulting from the arithmetic coding, and to thereby reduce dependencies on a processing order of contexts which are used for reference in the coding.

An image decoding method according to another aspect of the present invention is a method for decoding coded image data. More specifically, the image decoding method is intended to perform arithmetic decoding on each of decoding target signals according to a context determined based on the type of the decoding target signal and a symbol occurrence probability determined based on the context, execute a group of context update processes on signals in each of processing units, according to the decoded signal resulting from the arithmetic decoding, and to thereby reduce dependencies on a processing order of contexts which are used for reference in the decoding. The image decoding method uses a context memory which is paired with a conventional context memory when performing the context update processes. With this, the image decoding method makes it possible to decode a coded stream appropriately and quickly utilizing switching by cooperative switches, while suppressing increase in a required memory amount.

An image decoding method according to another aspect of the present invention is a method for decoding coded image data. More specifically, the image decoding method is intended to perform arithmetic decoding on each of decoding target signals according to a context determined based on the type of the decoding target signal and a symbol occurrence probability determined based on the context, and execute a group of context update processes on signals in each of processing units, according to the decoded signal resulting from the arithmetic decoding, and to thereby reduce dependencies on a processing order of contexts which are used for reference in the decoding. By determining that a block is a processing unit, it is possible to select a block size adapted to image features so that a context update can be performed frequently for complex image parts and rarely for simple image parts, and thus it is possible to perform parallel decoding processes on the coded stream while suppressing reduction in the coding efficiency.

An image decoding method according to another aspect of the present invention is a method for decoding coded image data. More specifically, the image decoding method is intended to perform arithmetic decoding on each of decoding target signals according to a context determined based on the type of the decoding target signal and a symbol occurrence probability determined based on the context, execute a group of context update processes on signals in each of processing units, according to the decoded signal resulting from the arithmetic decoding, and to thereby reduce dependencies on a processing order of contexts which are used for reference in the decoding. The image decoding method further involves performing the context update processes in an order inverse to the decoding order of the decoding target signals so as to enable efficient use of the symbol occurrence probabilities for a next processing unit. With this, the image decoding method makes it possible to appropriately decode a coded stream coded with an increased coding efficiency.

An image decoding method according to another aspect of the present invention is a method for decoding coded image data. More specifically, the image decoding method is intended to perform arithmetic decoding on each of decoding target signals according to a context determined based on the type of the decoding target signal and a symbol occurrence probability determined based on the context, execute a group of context update processes on signals in each of processing units, according to the decoded signal resulting from the arithmetic decoding, and to thereby reduce dependencies on a processing order of contexts which are used for reference in the decoding. The image decoding method further involves performing the context update processes such that part of signals including decoding symbols in the processing unit are executed last and in an order inverse to a decoding order of the part of signals, so as to enable efficient use of the symbol occurrence probabilities for a next processing unit. With this, the image decoding method makes it possible to appropriately decode a coded stream coded with an increased coding efficiency.

An image coding method according to another aspect of the present invention is a method for compression-coding image data. More specifically, the image coding method is intended to perform arithmetic coding on each of coding target signals according to a context determined based on the type of the coding target signal and a symbol occurrence probability determined based on the context, execute a group of context update processes on signals in each of processing units, according to the coded signal resulting from the arithmetic coding, and to thereby reduce dependencies on a processing order of contexts which are used for reference in the coding. The image coding method uses a context memory which is paired with a conventional context memory when performing the context update processes. With this, the image coding method makes it possible to perform fast coding processes utilizing switching by cooperative switches, while suppressing increase in a required memory amount.

An image coding method according to another aspect of the present invention is a method for compression-coding image data. More specifically, the image coding method is intended to perform arithmetic coding on each of coding target signals according to a context determined based on the type of the coding target signal and a symbol occurrence probability determined based on the context, execute a group of context update processes on signals in each of processing units, according to the coded signal resulting from the arithmetic coding, and to thereby reduce dependencies on a processing order of contexts which are used for reference in the coding. By determining that a block is a processing unit, it is possible to select a block size adapted to image features so that a context update can be performed frequently for complex image parts and rarely for simple image parts, and it is possible to perform parallel coding processes while suppressing reduction in the coding efficiency.

An image coding method according to another aspect of the present invention is a method for compression-coding image data. More specifically, the image coding method is intended to perform arithmetic coding on each of coding target signals according to a context determined based on the type of the coding target signal and a symbol occurrence probability determined based on the context, execute a group of context update processes on signals in each of processing units, according to the coded signal resulting from the arithmetic coding, and to thereby reduce dependencies on a processing order of contexts which are used for reference in the coding. The image coding method further involves performing the context update processes in an order inverse to the decoding order of the coding target signals so as to enable efficient use of the symbol occurrence probabilities for a next processing unit. With this, the image coding method makes it possible to perform parallel coding processes while increasing the coding efficiency.

An image coding method according to another aspect of the present invention is a method for compression-coding image data. More specifically, the image coding method is intended to perform arithmetic coding on each of coding target signals according to a context determined based on the type of the coding target signal and a symbol occurrence probability determined based on the context, execute a group of context update processes on signals in each of processing units, according to the coded signal resulting from the arithmetic coding, and to thereby reduce dependencies on a processing order of contexts which are used for reference in the coding. The image coding method further involves performing the context update processes such that part of coding target signals including decoding symbols in the processing unit are executed last and in an order inverse to a decoding order of the part of coding target signals, so as to enable efficient use of the symbol occurrence probabilities for a next processing unit. With this, the image coding method makes it possible to perform parallel coding processes while increasing the coding efficiency.

Advantageous Effects of Invention

According to the present invention, it is possible to realize efficient parallel processes while keeping coding efficiencies.

BRIEF DESCRIPTION OF DRAWINGS

FIG. 3 is a diagram of a symbol occurrence probability table according to Embodiment 1.

FIG. 5 is an association table of transIdxMPS and transIdxLPS.

FIG. 31 illustrates a structure of multiplexed data.

FIG. 42 shows an example of a look-up table in which video data standards are associated with driving frequencies.

DESCRIPTION OF EMBODIMENTS

Hereinafter, embodiments of the present invention are described with reference to the drawings.

Embodiment 1

An arithmetic decoding method according to an embodiment is schematically described. The arithmetic decoding method according to this embodiment is intended to perform a group of context update processes on decoding target signals in each of processing units each obtained as a segment having a certain size. In this way, it is possible to realize parallel arithmetic decoding processes within the processing unit.

The arithmetic decoding method according to this embodiment has been schematically described above.

Figure 1:
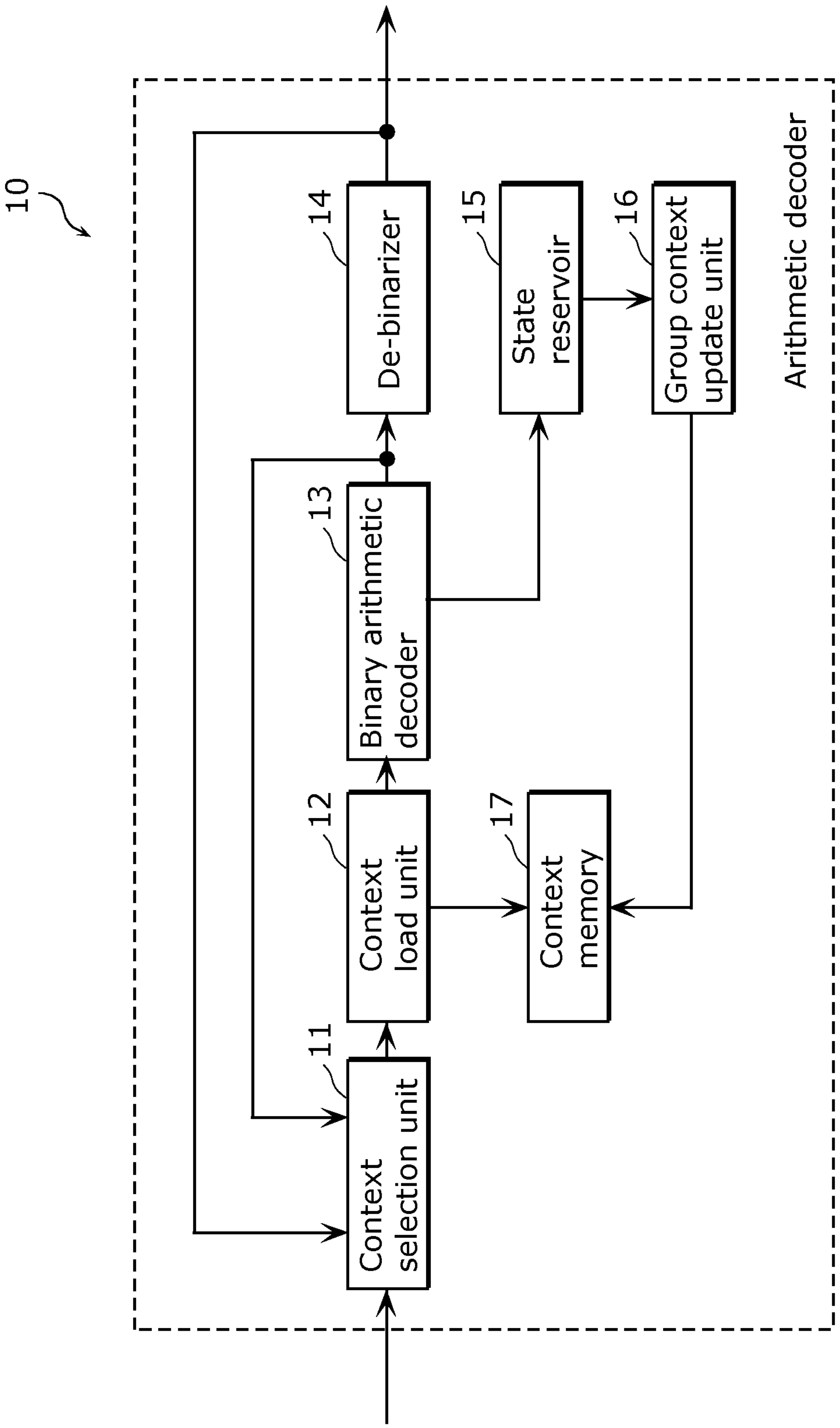
FIG. 1 is a block diagram of an arithmetic decoder according to Embodiment 1.

Next, a description is given of a structure of an arithmetic decoder which performs the arithmetic decoding method according to this embodiment. FIG. 1 is a block diagram showing an exemplary structure of the arithmetic decoder according to Embodiment 1. The arithmetic decoder 10 according to Embodiment 1 corresponds to a part of an image decoding apparatus 400 which decodes compression-coded image data as will be described later.

As shown in FIG. 1, the arithmetic decoder 10 includes a context selection (Context Selection) unit 11, a context load (Context Load) unit 12, a binary arithmetic decoder (Bin Decoder) 13, a de-binarizer (De-Binarizer) 14, a state reservoir (Reservoir) 15, a group context update (Group Context Update) unit 16, and a context memory (Context Memory) 17. Operations performed by the arithmetic decoder 10 according to Embodiment 1 are described in detail with reference to FIG. 2.

Figure 2:
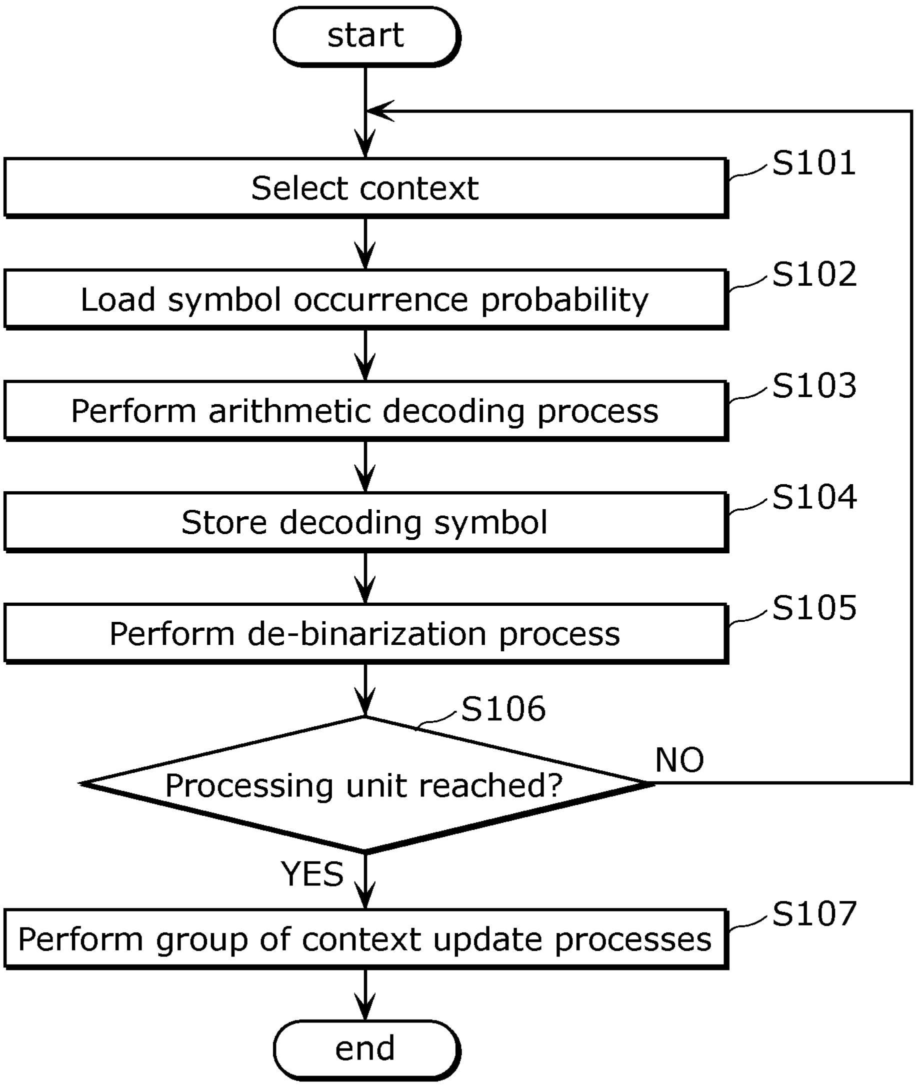
FIG. 2 is a flowchart of arithmetic decoding processes according to Embodiment 1.

FIG. 2 is a flowchart of the arithmetic decoding processes.

First, the context selection unit 11 performs a process for selecting a context for each of decoding target signals (Step S101). In the context selection, for example, an already decoded decoding symbol or an already decoded signal of a de-binarized neighboring block is obtained. According to a predetermined method, a context is determined and the determined context number is notified to the context load unit 12.

Next, the context load unit 12 loads a symbol occurrence probability corresponding to the specified context from the context memory 17 according to the context number (Step S102). Here, associations between symbol occurrence probabilities and contexts may be managed in an association table or the like. Such a symbol occurrence probability table is described in detail later.

Next, based on the loaded symbol occurrence probability, the binary arithmetic decoder 13 performs an arithmetic decoding process (Step S103). More specifically, based on the symbol occurrence probability obtained from the context load unit 12, the binary arithmetic decoder 13 updates an internal state of the binary arithmetic decoder 13 and outputs a decoding symbol according to the updated internal state. Here, the internal state of the binary arithmetic decoder 13 is a value which is sequentially updated until it is initialized or reset. Here, for example, details of operations performed by the binary arithmetic decoder 13 may conform to the H.264 standard.

Next, the decoding symbol resulting from the arithmetic decoding process is output to the state reservoir 15 (Step S104). Here, such a decoding symbol is stored for each of contexts, and the state of the context is managed. The state reservoir 15 is described in detail later.

On the other hand, the de-binarizer 14 performs a de-binarization process on the decoded symbol resulting from the arithmetic decoding (Step S105), and outputs a decoded signal obtained from the decoding target signal.

When the decoding unit based on which a decoding process is performed does not reach a processing unit in a group of context update processes (NO in Step S106), the group context update unit 16 determines a return to a context selection process (S101) for a next decoding target signal.

On the other hand, when the decoding unit based on which a decoding process is performed reaches the processing unit in the group of context update processes (YES in Step S106), the group context update unit 16 obtains the decoding symbol of each context from the state reservoir 15, and executes the group of context update processes (Step S107). Here, the group context update unit 16 resets the information stored in the state reservoir 15.

In the group of context update processes, the symbol occurrence probabilities corresponding to the contexts are updated, and the updated symbol occurrence probabilities are stored in the context memory 17. These processes are described in detail later.

The structure of the arithmetic decoder 10 according to this embodiment has been schematically described above.

Here, a symbol occurrence probability table is described. FIG. 3 is a diagram of the symbol occurrence probability table according to Embodiment 1.

The symbol occurrence probability table is an association table in which contexts and symbol occurrence probabilities are associated with each other. The index (ctIdx) in FIG. 3 is an index indicating a context, specifically, an index which is determined based on one of information of a neighboring macroblock which is currently being coded in the context selection unit 11, already coded information in a block, and the position of a bit to be coded.

The entry indicated by the index includes a probability information item (pStateIdx) indicating a symbol occurrence probability and a symbol (valMPS) indicating a symbol (Most Probable Symbol) having the highest occurrence probability. These are equivalent to the ones defined in the H.264 standard. In other words, pStateIdx is an index indicating the value of the symbol occurrence probability. The context memory 17 stores a table of symbol occurrence probability values each corresponding to PStateIdx.

Figure 4:
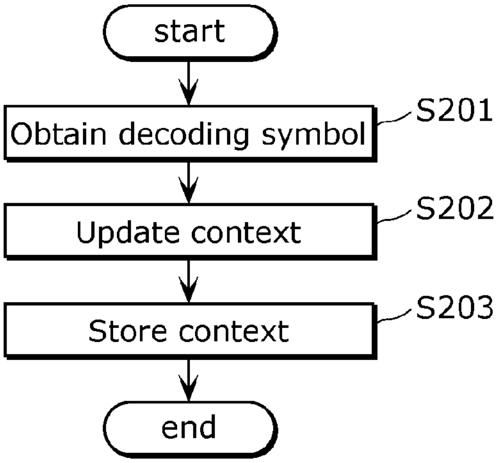
FIG. 4 is a diagram for explaining operations performed by a state reservoir according to Embodiment 1.
Figure 4:
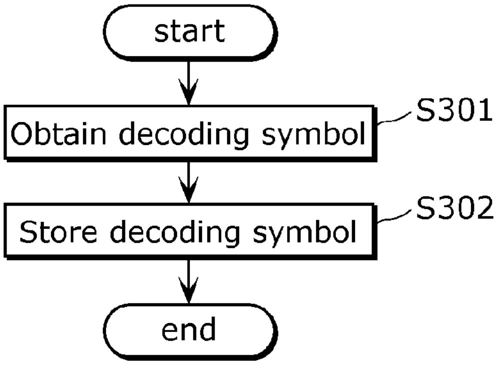

Next, the state reservoir 15 is explained. FIG. 4 is a flowchart showing exemplary operations performed by the state reservoir 15 according to Embodiment 1.

(Group Update Scheme 1)

In FIG. 4, (a) shows an exemplary case where the state reservoir 15 performs a context update process based on a decoding symbol resulting from an arithmetic decoding process and stores the updated context. First, the state reservoir 15 obtains the decoding symbol from the binary arithmetic decoder 13 (Step S201), and performs the update processes on the obtained decoding symbols and the contexts used in the arithmetic decoding (Step S202).

Although the symbol occurrence probability value in the context memory 17 is obtained for each context update in a conventional approach, the updated context is stored in the state reservoir 15 instead of the context memory 17 (Step S203). In this case, in Step S107 of FIG. 2, the group context update unit 16 reflects, onto the symbol occurrence probability value in the context memory 17, the result of updating the context stored in the state reservoir 15.

The context update process in this case may be performed based on, for example, a transition table as shown in FIG. 5. FIG. 5 is a table showing, for each of symbol occurrence probability values (pStateIdx), (i) transIdxMP which is a next symbol occurrence probability value (pStateIdx) in the case of an occurrence of a symbol having a high occurrence probability (MPS) and (ii) a next symbol occurrence probability value (pStateIdx) in the case of an occurrence of a symbol having a low occurrence probability (LPS). In FIG. 4, (a) shows an example of updating, for each context, a symbol occurrence probability value depending on whether a decoding symbol is an MPS or an LPS, and storing the updated context.

It is to be noted that the updated context may be stored in another memory area in the context memory 17 for efficient memory use. In this case, a context update process can be performed for each of signals, which provides an advantageous effect of being able to easily control execution timings.

(Group Update Scheme 2)

On the other hand, (b) of FIG. 4 shows an example where the state reservoir 15 stores a decoding symbol resulting from an arithmetic decoding process.

First, the state reservoir 15 obtains a decoding symbol from the binary arithmetic decoder 13 (Step S301), and stores the obtained decoding symbol using a scheme suitable for the context used in the arithmetic decoding (Step S302). As an exemplary storage scheme, it is good to store an occurrence symbol for each context in a table as shown in (c) of FIG. 4. The largest value for the length of each occurrence symbol is determined based on the processing unit in the group of context update processes.

In this case, in Step S107 of FIG. 2, the group context update unit 16 performs a context update process based on the resulting occurrence symbol for each context stored in the state reservoir 15, and reflects it onto the symbol occurrence probability value in the context memory 17.

Here, it is also good that the group context update unit 16 sequentially performs update processes according to occurrence symbols stored in (c) of FIG. 4, with reference to the transition table shown in FIG. 5 (a group update scheme 2A).

In this case, update processes are sequentially performed as a group at the time when the processing unit in the group of context update processes is reached. Therefore, there is no need to perform any context update process at the time of performing arithmetic decoding processes. For this reason, there is a possibility that the processing load is distributed.

In addition, the group context update unit 16 may perform an update process on a signal for which an occurrence symbol has been processed in advance and stored in (c) of FIG. 4 (a group update scheme 2B).

Exemplary preparation processes are performed using schemes as shown below.

A first scheme is to calculate a difference between the number of times of occurrence of 1 and the number of times of occurrence of 0, and to perform update only for either 1 or 0 having the largest number of times of occurrence. More specifically, when ctxIdx=0 is satisfied as in (c) of FIG. 4, 1 occurs three times and 0 occurs twice. Thus, update processes are performed assuming that 1 occurs once.

In this way, it is possible to reduce the processing load required for the update.

A second scheme is to count up in advance the number of times of sequential occurrence of MPSs, and perform a group of update processes. More specifically, when txIdx=0 is satisfied as in (c) of FIG. 4, 0 occurs twice. When 0 is an MPS, it is only necessary that 2 is added to a current pStateIdx as shown in the transition table in FIG. 5, and no sequential operation is required.

In this way, it is possible to reduce the processing load required for the update.

A third scheme is to update a symbol occurrence order such that an MPS occurs first and an LPS occurs last. More specifically, when 1 is an MPS in the case where ctxIdx=0 is satisfied as in (c) of FIG. 4, it is also good to perform a process assuming that 11100 occurs in this sequence. Here, update in the case where the LPS occurs is greatly changed, and thus it is possible to select a stable symbol occurrence probability by placing the MPS first. Alternatively, the LPS may be placed first in an inversed manner. Which one of them is placed first may be determined in advance or may be determined based on information coded as header information.

In this way, the coding efficiency may be further increased. Here, one of the aforementioned first, second, and third schemes may be performed solely, or some or all of the schemes may be performed in combination.

Figure 6:
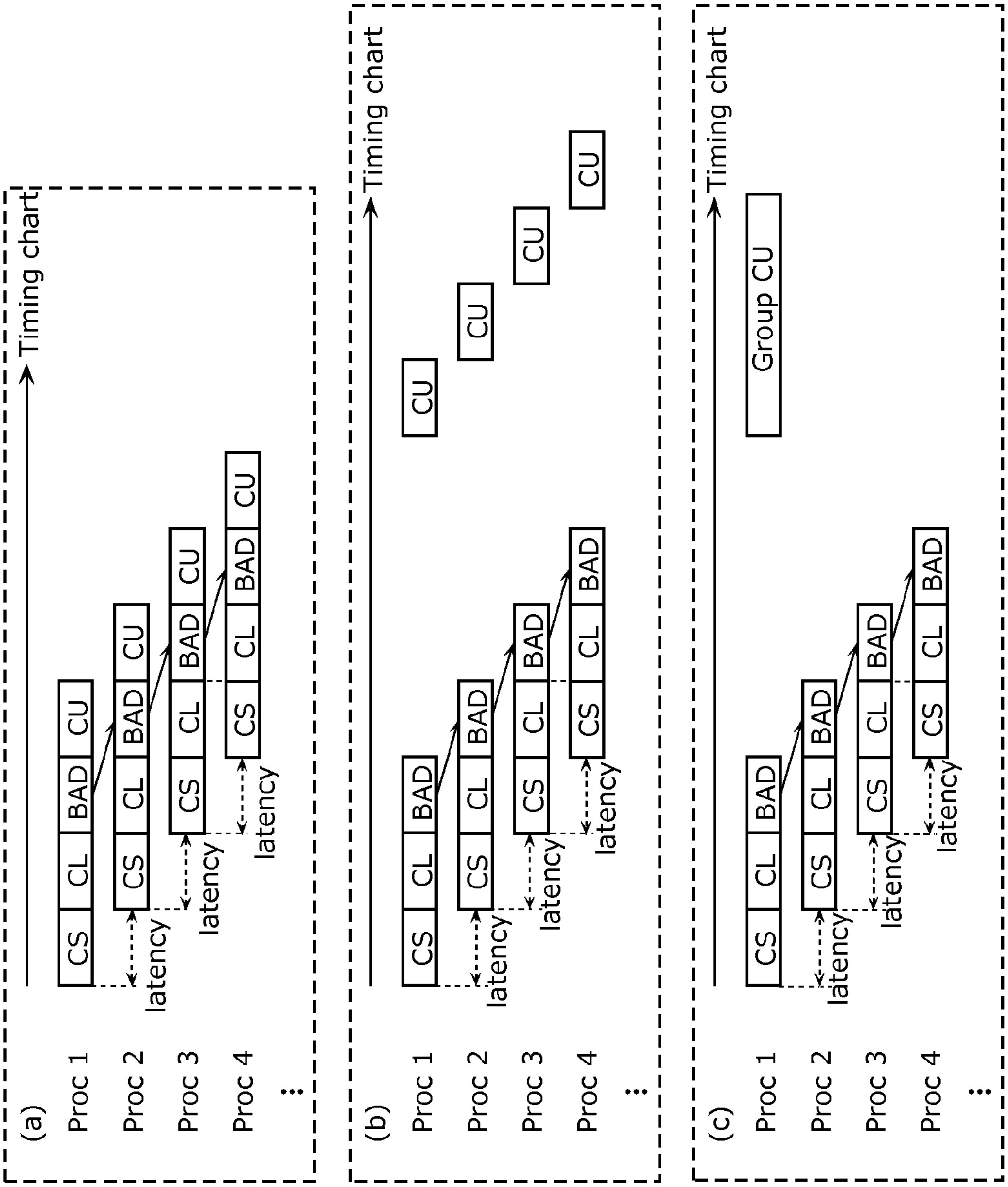
FIG. 6 is a timing chart of arithmetic decoding processes according to Embodiment 1.

FIG. 6 is a schematic diagram of processing timings for parallel processes implemented to perform faster arithmetic decoding processes.

In FIG. 6, (a), (b), and (c) correspond to the group update scheme 1, the group update scheme 2A, and the group update scheme 2B, respectively.

FIG. 6 illustrates, along a time axis, a context selection process (CS), a context load process (CL), a binary arithmetic decoding process (BAD), and a context update (CU) operation in a processing circuit for a process 1 (Proc1). For simplicity, the time periods required for the respective processes and operation are equal in FIG. 6. Likewise, this example also shows a process 2 (Proc2), a process 3 (Proc3), and a process 4 (Proc4). In addition, a Group CU in (c) of FIG. 6 shows a group of context update processes in the case where a preparation process is performed on occurrence symbols in advance. The processing time varies depending on the details of the preparation process, and thus the Group CU is presented to have a size larger than or equal to one processing unit.

In addition, each of parts associated by a corresponding one of the arrows in the diagram has a dependency that they need to be processed in the sequence shown by the arrow. In the binary arithmetic decoding process, a current internal state of the binary arithmetic decoder 13 is updated for each decoding. This is why the binary arithmetic decoding process involves such a dependency. In addition, in the case where the same context is used (as in the case shown in the diagram), a result of updating the context is further used for reference, and thus there is a dependency between the context update (CU) and the context load (CL) for next decoding. However, according to this embodiment, it is possible to solve the dependency, and thus no arrow showing a dependency is required in FIG. 6.

In the case of the group update scheme 1 shown in (a) of FIG. 6, the process 1 is to sequentially perform the processes (which are the context selection process, the context load process, and the binary arithmetic decoding process), and performs the context update process lastly. Here, in the context update process, the update result is not reflected onto the context memory. For this reason, a symbol occurrence probability value which is loaded at the time of context load in the process 2 is always a past symbol occurrence provability value, specifically, a symbol occurrence provability value immediately after the group of context update processes. For this reason, even when the context update process in the process 1 is performed after the context load processes in the processes 2 and 3 (in the diagram), it is possible to perform the decoding process accurately.

In this way, even when parallel processes are performed, it is possible to minimize (one processing time in the diagram) a processing delay (latency). This processing delay is caused due to dependencies in state values in the arithmetic decoding. Thus, it is possible to further reduce the processing delay by estimation or the like of the state values. It is to be noted that this embodiment is effective in the viewpoint of reducing the processing delay caused due to the dependencies of contexts even in the case of further reducing the processing delay.

Next, unlike the case of (a) of FIG. 6, the group update scheme 2A shown in (b) of FIG. 6 is used in the case of not performing any context update process immediately after arithmetic decoding, and updating contexts for signals in each of processing units in the group of context update processes. Even in this case, it is possible to keep the processing delay (latency) in the arithmetic decoding within the one processing time as in the case of (a) of FIG. 6.

Next, unlike the case of (a) of FIG. 6, the group update scheme 2B shown in (c) of FIG. 6 is used in the case of performing a preparation process and then performing a group update for each of processing units in the group of context update processes. Even in this case, it is possible to keep the processing delay (latency) in the arithmetic decoding within the one processing time as in the case of (a) of FIG. 6. In addition, the processing time required for the group update may be reduced more significantly than in the case of (b) of FIG. 6.

Here, the unit in the decoding process is the processing unit in the group of context update processes, and may be, for example, one of the following: a transform unit (TU) which is a unit of coefficient coding; a prediction unit (PU) which is a unit of switching prediction schemes in prediction coding; a coding unit (CU) which is a unit of coding; and a largest coding unit (LCU) which is the largest one of available units of coding. Use of a larger processing unit can increase a parallelization degree. However, the use of the larger processing unit delays context update, reduces adaptability of a symbol occurrence probability in an image, and increases the possibility that the coding efficiency is reduced.

One of these processing units may be determined in advance for the type of each coding signal, or may be switched based on header information (for example, information indicating a profile). In this way, depending on a parallelization degree to be required in processing, it is possible to control the processing unit, and thus to increase a parallelization degree in the processing while suppressing reduction in the coding efficiency.

Figure 7:
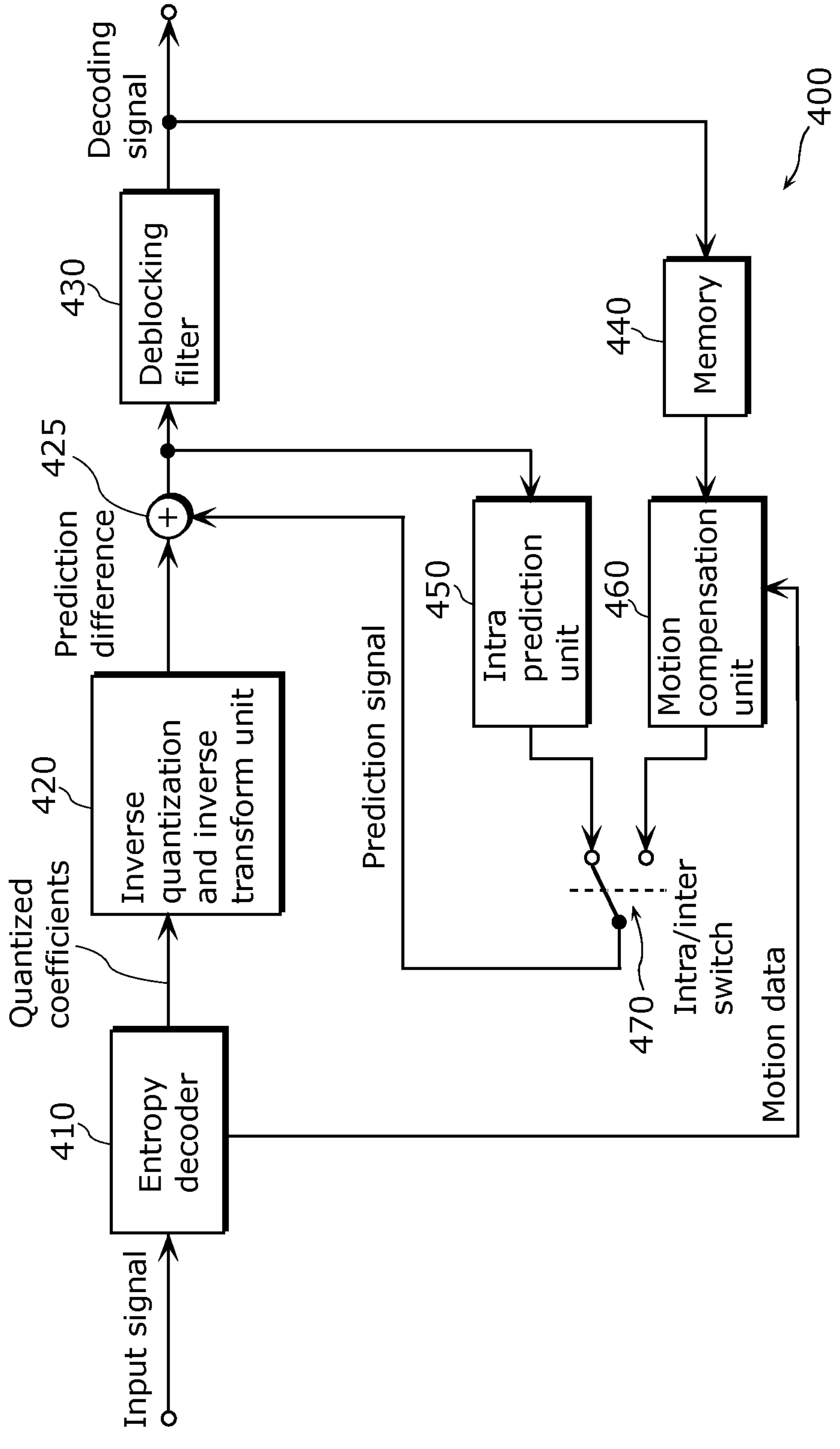
FIG. 7 is a block diagram of an arithmetic decoding apparatus according to Embodiment 1.

Here, the arithmetic decoder 10 according to this embodiment corresponds to a part of an image decoding apparatus which decodes compression-coded image data. FIG. 7 is a block diagram showing an exemplary structure of the image decoding apparatus 400 according to this embodiment.

The image decoding apparatus 400 decodes the compression-coded image data. For example, the image decoding apparatus 400 receives an input of a decoding target signal representing each of blocks of the coded image data. The image decoding apparatus 400 reconstructs the image data by performing variable length decoding, inverse quantization, and inverse transform on the input decoding target signal.

As shown in FIG. 7, the image decoding apparatus 400 includes: an entropy decoder 410, an inverse quantization and inverse transform unit 420, an adder 425, a deblocking filter 430, a memory 440, an intra prediction unit 450, a motion compensation unit 460, and an intra/inter switch 470.

The entropy decoder 410 reconstructs quantized coefficients by performing variable length decoding on the input signal (input stream). Here, the input signal (input stream) is a decoding target signal and corresponds to data of each block of the coded image data. In addition, the entropy decoder 410 obtains motion data from the input signal, and outputs the obtained motion data to the motion compensation unit 460.

The inverse quantization and inverse transform unit 420 reconstructs transform coefficients by performing inverse quantization on the quantized coefficients reconstructed by the entropy decoder 410. Next, the inverse quantization and inverse transform unit 420 reconstructs a prediction difference by performing inverse transform on the reconstructed transform coefficients. The adder 425 generates a decoded image by adding the reconstructed prediction difference and the prediction signal.

The deblocking filter 430 performs a deblocking filtering process on the generated decoded image. The decoded image after being subjected to the deblocking filtering process is output as a decoded signal. The memory 440 is a memory for storing reference images for use in motion compensation. More specifically, the memory 440 stores decoded images after being subjected to the deblocking filtering process.

The intra prediction unit 450 generates a prediction signal (an intra prediction signal) by performing intra prediction. More specifically, the intra prediction unit 450 generates an intra prediction signal by performing intra prediction with reference to an image neighboring a decoding target block (an input signal) in a decoded image generated by the adder 425.

The motion compensation unit 460 generates a prediction signal (an inter prediction signal) by performing motion compensation based on motion data output from the entropy decoder 410.

The intra/inter switch 470 selects one of the intra prediction signal and the inter prediction signal, and outputs the selected signal as a prediction signal to the adder 425.

With this structure, the image decoding apparatus 400 according to this embodiment decodes the compression-coded image data.

Here, in FIG. 7, the arithmetic decoder 10 according to this embodiment is included in the entropy decoder 410. In other words, the arithmetic decoder 10 performs arithmetic decoding and de-binarization on the prediction-coded imaged data as an input stream IS. In addition, signal type information SE is information indicating the positions of the quantized coefficients, motion data, or an intra prediction direction to be used by the intra prediction unit 450.

Here, when information indicating information about a processing unit (a processing unit or a signal type for classification) in the group of context update processes is stored at a starting point (a stream header) of a bitstream, it is also good to load the stored information and switch the context update process. In this way, it is possible to decode the coded stream having a structure which can be processed by appropriate parallel processes.

Here, a header storage unit may be a unit corresponding to a slice or a picture, and such an alternative unit can be decoded in the same manner. In addition, both of the encoder side and the decoder side do not always need to transmit such information, in other word, may share the information.

As described above, the image decoding apparatus and the image decoding method according to this embodiment make it possible to perform parallel arithmetic decoding processes, and perform the whole processes at high speed.

For example, it is possible to solve a dependency of contexts using an appropriate unit although such a dependency is conventionally required. For this reason, it is possible to realize parallel processes while keeping coding efficiency. For example, such parallel processes can be performed by a high speed operation circuit which is required for processing such as real-time reproduction processing on high resolution video.

Embodiment 2

An arithmetic decoding method according to an embodiment is schematically described. The arithmetic coding method according to this embodiment is intended to perform a group of context update processes on coding target signals in each of processing units each obtained as a segment having a certain size. In this way, it is possible to realize parallel arithmetic coding processes within the certain processing unit.

The arithmetic coding method according to this embodiment has been schematically described above.

Figure 8:
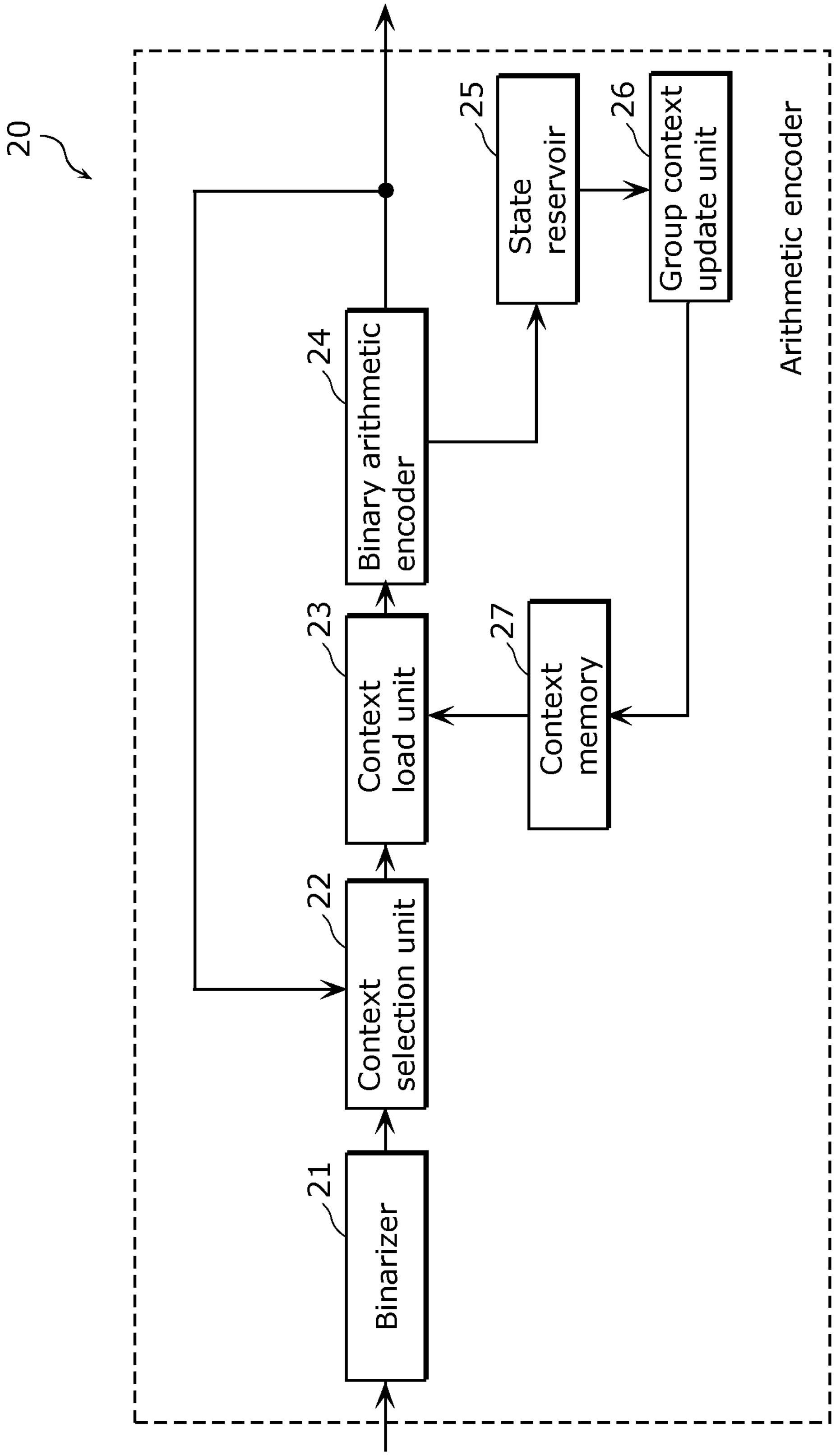
FIG. 8 is a block diagram of an arithmetic encoder according to Embodiment 2.

Next, a description is given of a structure of an arithmetic encoder which performs the arithmetic coding method in this embodiment. FIG. 8 is a block diagram showing an exemplary structure of the arithmetic encoder according to Embodiment 2. Here, as will be described later, the arithmetic encoder 20 according to Embodiment 2 compression-codes an image signal, and corresponds to a part of an image coding apparatus 200 which outputs coded image data.

As shown in FIG. 8, the arithmetic encoder 20 includes: a binarizer (Binarizer) 21, a context selection (Context Selection) unit 22, a context load (Context Load) unit 23, a binary arithmetic encoder (Bin Encoder) 24, a state reservoir (Reservoir) 25, a group context update (Group Context Update) unit 26, and a context memory (Context Memory) 27. Operations performed by the arithmetic encoder 20 according to Embodiment 2 are described in detail with reference to FIG. 9.

Figure 9:
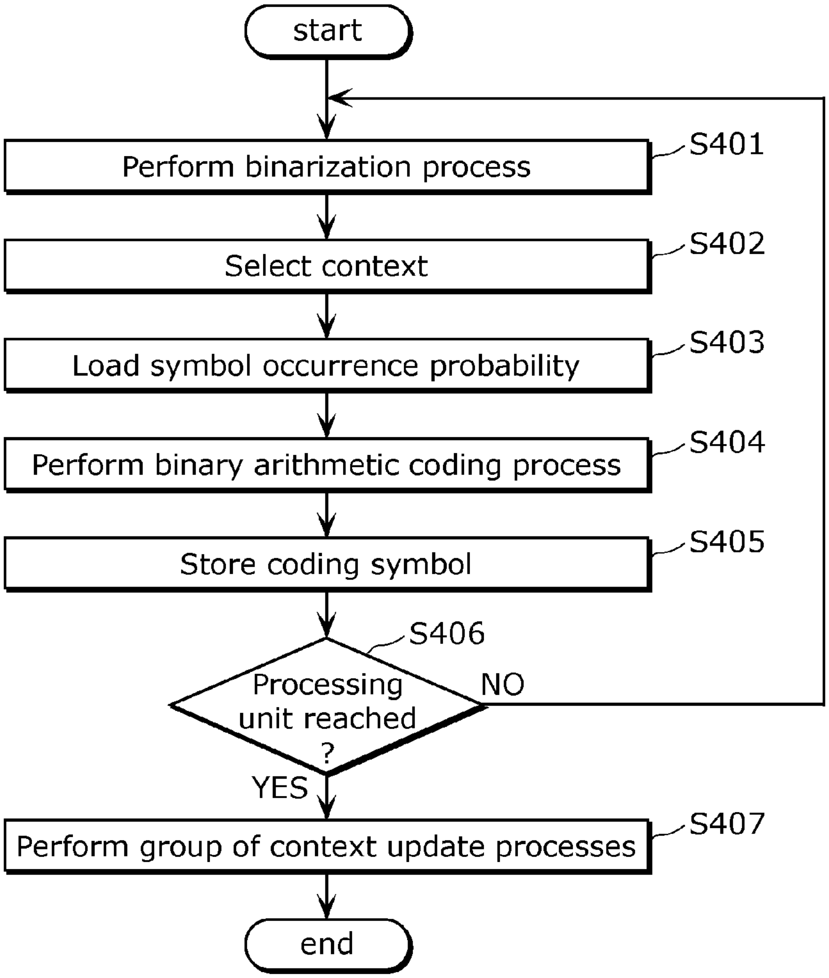
FIG. 9 is a flowchart of arithmetic decoding processes according to Embodiment 2.

FIG. 9 is a flowchart of processes performed by the arithmetic encoder 20.

First, the binarizer 21 transforms each of target signals into a binary signal using a predetermined approach (Step S401). For example, it is also good to use a binarization scheme in which 1, 01, 001, and 0001 are assigned to signals 0 to 3.

Next, an arithmetic coding process is performed for every bit of the resulting binary signals. For this reason, the context selection unit 22 performs context selection processes for each target binary signal (Step S402). In the context selection process, for example, an already coded signal or a signal of an already coded neighboring block is obtained, and a context is determined according to a predetermined scheme, and the determined context number is notified to the context load unit 23.

The context load unit 23 loads a symbol occurrence probability corresponding to the context specified by the context memory 27 according to the context number (Step S403). Here, associations between symbol occurrence probabilities and contexts may be managed in an association table or the like. The symbol occurrence probability table is the same as the table described in Embodiment 1.

Next, based on the loaded symbol occurrence probability, the binary arithmetic encoder 24 performs an arithmetic coding process (Step S404). More specifically, based on the symbol occurrence probability obtained from the context load unit 23, the binary arithmetic encoder 24 updates an internal state of the binary arithmetic encoder 24 and outputs a coding signal according to the updated internal state. Here, the internal state of the binary arithmetic encoder 24 is a value which is sequentially updated until it is initialized or reset. Here, details of operations performed by the binary arithmetic encoder 24 may conform to the H.264 standard.

Next, the coding target symbol subjected to the arithmetic coding process is output to the state reservoir 25 (Step S405). Here, such a coding target symbol is stored for each of contexts, and the state of the context is managed. Here, the state reservoir 25 performs detailed operations which are the same as the operations explained in Embodiment 1.

When a coding unit does not reach a processing unit in the group of context update processes (NO in Step S406), a return is made to a binarization process (S401) for a next coding target symbol (when the coding target symbol is a binary one, a return is made to a context selection process (S402)).

On the other hand, when the coding unit based on which a coding process is performed reaches the processing unit in the group of context update processes (YES in Step S406), the group context update unit 26 obtains the coding target symbol of each context from the state reservoir 25, and executes the group of context update processes (Step S407). Here, the group context update unit 26 resets the information stored in the state reservoir 25.

In the context update process, the symbol occurrence probability corresponding to the context is updated, and the updated symbol occurrence probability is stored in the context memory 27. The group context update unit 26 performs the same detailed operations as operations performed by the group context update unit 16, and thus the same descriptions thereof are not repeated here.

The structure of the arithmetic encoder 20 according to this embodiment has been schematically described above.

Figure 10:
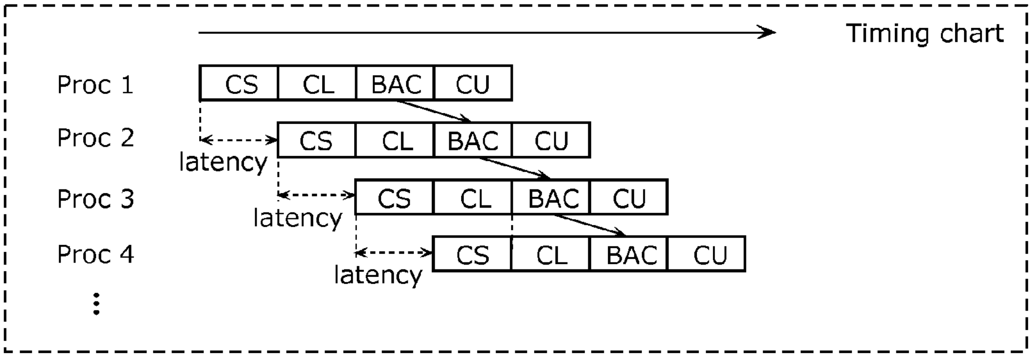
FIG. 10 is a timing chart of arithmetic coding processes according to Embodiment 2.

FIG. 10 is a schematic diagram of processing timings for parallel processes implemented to perform faster arithmetic coding processes.

FIG. 10 shows a case using the group update scheme 1 described in Embodiment 1. Here, the group update scheme 2A and the group update scheme 2B according to Embodiment 1 can be explained similarly.

FIG. 10 illustrates, along a time axis, a context selection process (CS), a context load process (CL), a binary arithmetic decoding process (BAD), and a context update (CU) operation in a processing circuit for a process 1 (Proc1). For simplicity, the time periods required for the respective processes and operation are equal in FIG. 10. Likewise, this example also shows a process 2 (Proc2), a process 3 (Proc3), and a process 4 (Proc4).

In addition, each of parts associated by a corresponding one of the arrows in the diagram has a dependency that they need to be processed in the sequence shown by the arrow. In the binary arithmetic coding process, the internal state of the binary arithmetic encoder 24 is updated for each coding process, and there is a dependency in the binary arithmetic coding process. In addition, in the case where the same context is used (as in the case shown in the diagram), a result of updating the context is further used for reference, and thus there is a dependency between the context update (CU) and the context load (CL) for next coding. However, according to this embodiment, it is possible to solve the dependency, and thus no arrow showing a dependency is required in FIG. 10.

In the case of the group update scheme 1 explained in Embodiment 1, the process 1 is for performing sequential processes (which are the context selection process, the context load process, and the binary arithmetic coding process), and performs the context update process lastly. Here, in the context update process, the update result is not reflected in the context memory. For this reason, a symbol occurrence probability value which is loaded at the time of context load in the process 2 is always a past symbol occurrence provability value, specifically, a symbol occurrence provability value immediately after the group of context update processes. For this reason, even when the context update process in the process 1 is performed after the context load processes in the processes 2 and 3 (in the diagram), it is possible to perform the coding process accurately.

In this way, even when parallel processes are performed, it is possible to minimize (one processing time in the diagram) a processing delay (latency). This processing delay is caused due to a dependency of state values in the arithmetic coding. Thus, it is possible to reduce the processing delay by estimation or the like of the state values. It is to be noted that this embodiment is effective in the viewpoint of reducing the processing delay caused due to the dependency of contexts even in the case of further reducing the processing delay.

Here, the unit in the coding process is the processing unit in the group of context update processes, and may be, for example, one of the following: a transform unit (TU) which is a unit of coding coefficients; a prediction unit (PU) which is a unit of switching prediction schemes in prediction coding; a coding unit (CU) which is a unit of coding; and a largest coding unit (LCU) which is the largest one of available coding units. Use of a larger processing unit can increase the parallelization degree. However, the use of the larger processing unit delays context update, reduces adaptability of a symbol occurrence probability in an image, and increases the possibility that the coding efficiency is reduced.

One of these processing units may be determined in advance for the type of each coding signal, or may be switched based on header information (for example, information indicating a profile). In this way, depending on the parallelization degree to be required in the processing, it is possible to control the processing unit, and thus to increase the parallelization degree in the processing while suppressing decrease in the coding efficiency.

Figure 11:
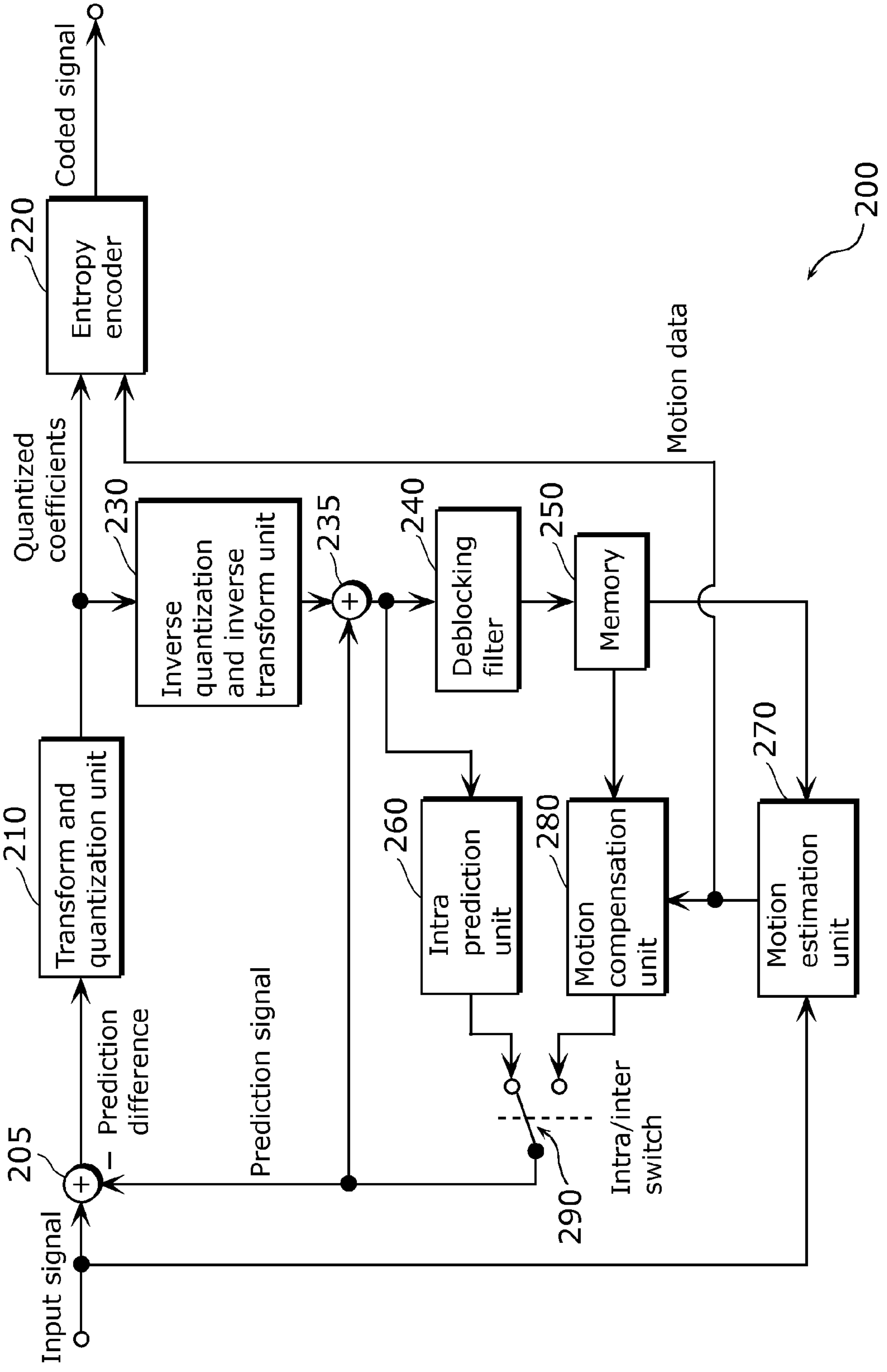
FIG. 11 is a block diagram of an image coding apparatus according to Embodiment 2.

Here, the arithmetic encoder 20 according to Embodiment 2 is included in the image coding apparatus which compression-codes image data. FIG. 11 is a block diagram showing an exemplary structure of the image coding apparatus 200 according to Embodiment 2.

The image coding apparatus 200 compression-codes image data. For example, the image coding apparatus 200 receives an input signal representing each of blocks of the image data. The image coding apparatus 200 generates a coded signal by performing transform, quantization, and variable length coding on the input signal.

As shown in FIG. 11, the image coding apparatus 200 includes: a subtractor 205, a transform and quantization unit 210, an entropy encoder 220, an inverse quantization and inverse transform unit 230, an adder 235, a deblocking filter 240, a memory 250, an intra prediction unit 260, a motion estimation unit 270, a motion compensation unit 280, and an intra/inter switch 290.

The subtractor 205 calculates a difference between the input signal and a prediction signal, that is, a prediction difference.

The transform and quantization unit 210 generates transform coefficients in a frequency domain by transforming the prediction difference in a spatial domain. For example, the transform and quantization unit 210 generates transform coefficients by performing a Discrete Cosine Transform (DCT) on the prediction difference. Furthermore, the transform and quantization unit 210 generates quantized coefficients by quantizing the transform coefficients.

The entropy encoder 220 generates a coded signal by variable-length codes the quantized coefficients. In addition, the entropy encoder 220 codes the motion data (such as a motion vector) estimated by the motion estimation unit 270, and outputs a coded signal including the motion data.

The inverse quantization and inverse transform unit 230 reconstructs transform coefficients by performing inverse quantization on the quantized coefficients. Furthermore, the inverse quantization and inverse transform unit 230 reconstructs a prediction difference by performing inverse transform on the reconstructed transform coefficients. Here, the reconstructed prediction difference suffers from an information loss resulting from the quantization and does not match a prediction difference which is generated by the subtractor 205. In other words, the reconstructed prediction difference includes a quantization difference.

The adder 235 generates a locally decoded image by adding the reconstructed prediction difference and the prediction signal. The deblocking filter 240 performs a deblocking filtering process on the resulting locally decoded image. The memory 250 is a memory for storing reference images for use in motion compensation. More specifically, the memory 250 stores locally decoded images after being subjected to deblocking filtering processes.

The intra prediction unit 260 generates a prediction signal (an intra prediction signal) by performing intra prediction. More specifically, the intra prediction unit 260 generates an intra prediction signal by performing intra prediction with reference to an image neighboring a coding target block (an input signal) in a locally decoded image generated by the adder 235.

The motion estimation unit 270 estimates motion data (such as a motion vector) between the input signal and a reference image stored in the memory 250. The motion compensation unit 280 generates a prediction signal (an inter prediction signal) by performing motion compensation based on the estimated motion data.

The intra/inter switch 290 selects one of the intra prediction signal and the inter prediction signal, and outputs the selected signal as a prediction signal to the subtractor 205 and the adder 235.

With this structure, the image coding apparatus 200 according to Embodiment 2 compression-codes the image data.

Here, in FIG. 11, the arithmetic encoder 20 according to Embodiment 2 is included in the entropy encoder 220. More specifically, the arithmetic encoder 20 performs binarization and arithmetic coding on the quantization coefficients as an input signal SI. In addition, signal type information SE is information indicating the positions of the quantized coefficients, motion data shown in FIG. 11, or an intra prediction direction used by the intra prediction unit 260.

Here, information indicating information about a processing unit (a processing unit or a signal type for classification) in a group of context update processes may be stored at a starting point (a stream header) of a bitstream. In this way, it is possible to generate the coded stream having a structure which can be processed by appropriate parallel processes.

Here, a header storage unit may be a unit corresponding to a slice or a picture. In addition, both of the encoder side and the decoder side do not always need to transmit such information, in other words, may share the information.

As described above, the image coding apparatus and the image coding method according to this embodiment make it possible to perform parallel arithmetic coding processes, and perform the whole processes at high speed.

More specifically, it is possible to solve a dependency of contexts using an appropriate unit although such a dependency is conventionally required. For this reason, it is possible to realize parallel processes while keeping coding efficiency. For example, such parallel processes can be performed by a high speed operation circuit which is required for processing such as real-time code transmission processing on high resolution video.

Embodiment 3

An arithmetic decoding method according to an embodiment is schematically described. The arithmetic decoding method according to this embodiment is intended to perform a group of context update processes on decoding target signals in each of processing units each obtained as a segment having a certain size. In this way, it is possible to realize parallel arithmetic decoding processes within the processing unit.

The arithmetic decoding method according to an embodiment has been schematically described above. Here, common points with respect to Embodiment 1 are not described in detail, and different points are mainly described.

Figure 12:
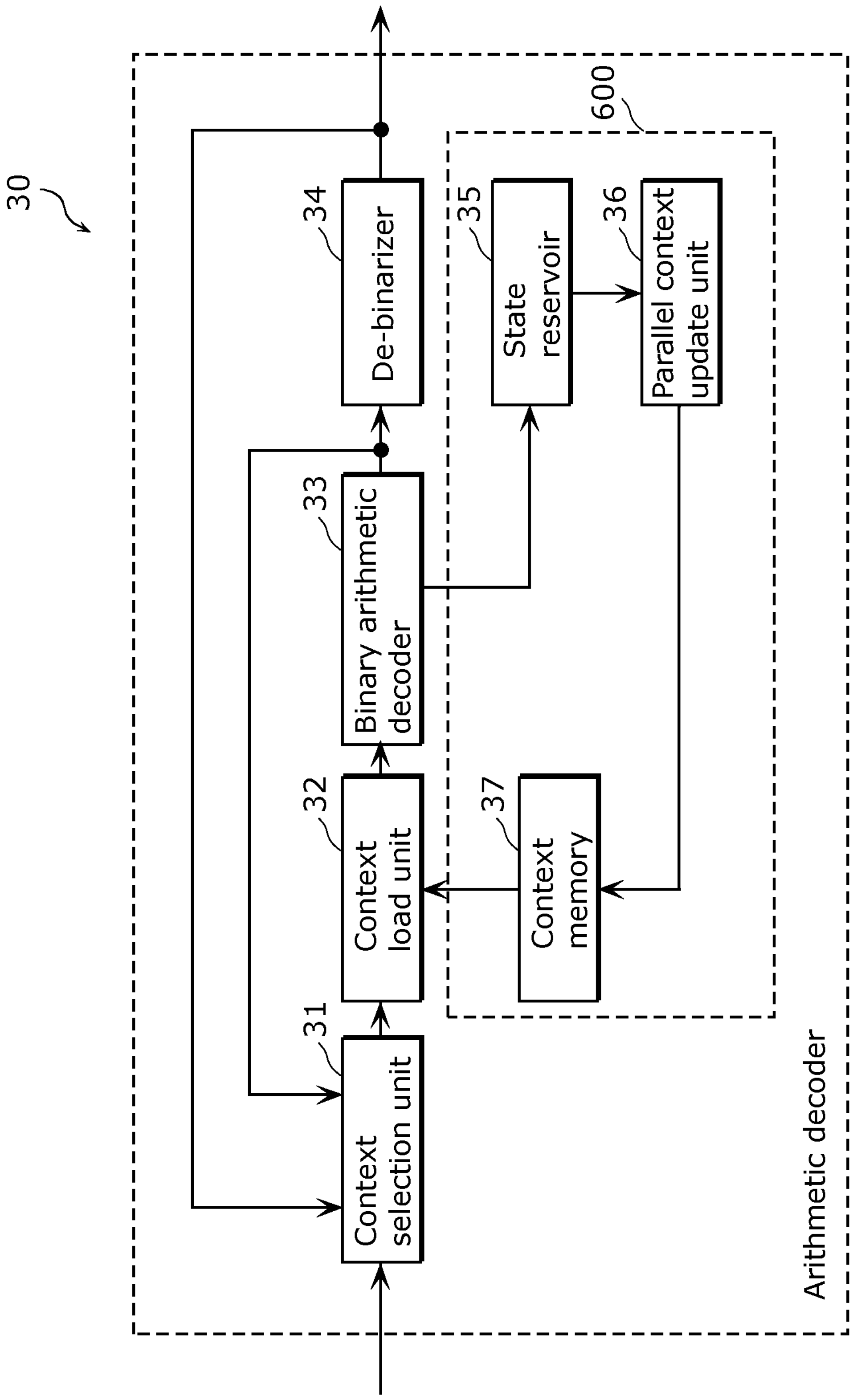
FIG. 12 is a block diagram of an arithmetic decoder according to Embodiment 3.

Next, a description is given of a structure of an arithmetic decoder which performs the arithmetic decoding method in this embodiment. FIG. 12 is a block diagram showing an exemplary structure of the arithmetic decoder according to Embodiment 3. Here, the arithmetic decoder 30 according to Embodiment 3 corresponds to a part of an image decoding apparatus 400 which decodes compression-coded image data.

As shown in FIG. 12, the arithmetic decoder 30 includes a context selection (Context Selection) unit 31, a context load (Context Load) unit 32, a binary arithmetic decoder (Bin Decoder) 33, a de-binarizer (De-Binarizer) 34, a state reservoir (Reservoir) 35, a parallel context update (Parallel Context Update) unit 36, and a context memory (Context Memory) 37. Operations performed by the arithmetic decoder 30 according to Embodiment 3 are described in detail with reference to FIG. 13.

Figure 13:
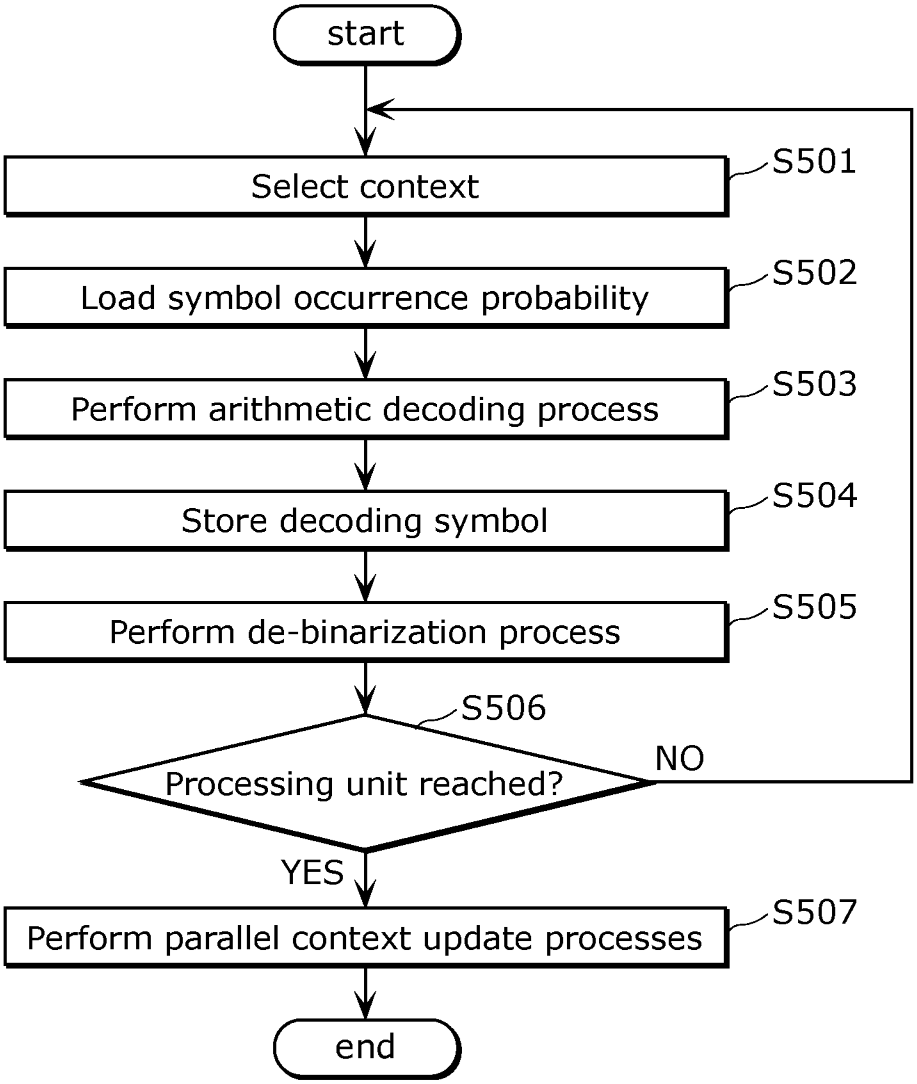
FIG. 13 is a flowchart of arithmetic decoding processes according to Embodiment 3.

FIG. 13 is a flowchart of the arithmetic decoding processes.

First, the context selection unit 31 performs a context selection process on each of the decoding target signals (Step S501). In the context selection, for example, an already decoded decoding symbol or an already decoded signal of a de-binarized neighboring block is obtained. According to a predetermined method, a context is determined and the determined context number is notified to the context load unit 32.

Next, the context load unit 32 loads a symbol occurrence probability corresponding to the specified context from the context memory 37 according to the context number (Step S502). Here, associations between symbol occurrence probabilities and contexts may be managed in an association table or the like. The symbol occurrence probability table may be the same as the table described in Embodiment 1.

Next, based on the loaded symbol occurrence probability, the binary arithmetic decoder 33 performs an arithmetic decoding process (Step S503). More specifically, based on the symbol occurrence probability obtained from the context load unit 32, the binary arithmetic decoder 33 updates an internal state of the binary arithmetic decoder 33 and outputs a decoding symbol according to the updated internal state. Here, the internal state of the binary arithmetic decoder 33 is a value which is sequentially updated until it is initialized or reset. Here, details of operations performed by the binary arithmetic decoder 33 may conform to the H.264 standard.

Next, the decoding symbol resulting from the arithmetic decoding process is output to the state reservoir 35 (Step S504). Here, such a decoding symbol is stored for each of contexts, and the state of the context is managed. The state reservoir 35 is described in detail later.

On the other hand, the decoded symbol resulting from the arithmetic decoding is subjected to a de-binarization process (Step S505), and a decoded signal obtained from the decoding target signal is output.

When the decoding unit based on which a decoding process is performed does not reach a processing unit in parallel context update processes (No in Step S506), a return is made to a context selection process (S501) for a next decoding target signal.

On the other hand, when the decoding unit based on which a decoding process is performed reaches the processing unit in the parallel context update processes (YES in Step S506), the parallel context update unit 36 obtains a decoding symbol group for each context from the state reservoir 35, and executes the parallel context update processes (Step S507). Here, the parallel context update unit 36 resets the information stored in the state reservoir 35.

In the parallel context update process, the symbol occurrence probability corresponding to the context is updated, and the updated symbol occurrence probability is stored in the context memory 37. This process is described in detail later.

The structure of the arithmetic decoder 30 according to this embodiment has been schematically described above.

(Parallel Update Scheme 1)

Figure 14:
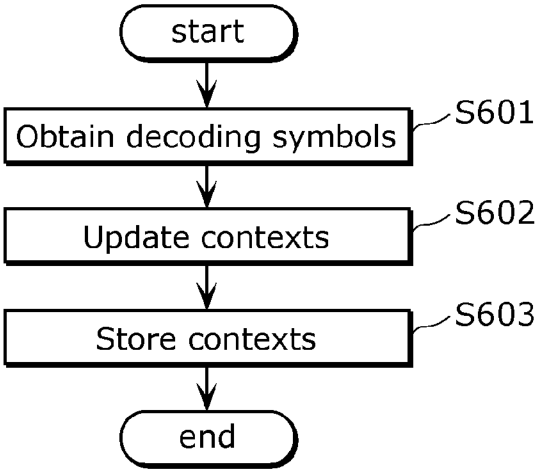
FIG. 14 is a diagram for explaining operations performed by a state reservoir according to Embodiment 3.
Figure 14:
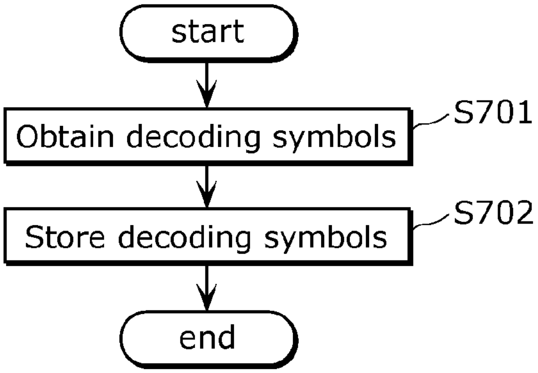

In FIG. 14, (a) shows an exemplary case where the state reservoir 35 performs context update processes based on decoding symbols resulting from arithmetic decoding processes and stores the updated contexts. First, the state reservoir 35 obtains the decoding symbols from the binary arithmetic decoder 33 (Step S601), and performs the update processes for the obtained decoding symbols and the contexts used in the arithmetic decoding processes (Step S602). Although the symbol occurrence probability values in the context memory 37 are obtained for the context update processes in a conventional approach, the updated contexts are stored in the state reservoir 35 instead of the context memory 37 (Step S603). In this case, in Step S507 of FIG. 13, the parallel context update unit 36 reflects the context update result stored in the state reservoir 35 onto the symbol occurrence probability values in the context memory 37. The context update processes in this case may be performed based on, for example, a transition table as shown in FIG. 5.

(Parallel Update Scheme 2)

On the other hand, (b) of FIG. 14 shows an example where the state reservoir 35 stores decoding symbols resulting from arithmetic decoding processes.

First, the state reservoir 35 obtains decoding symbols from the binary arithmetic decoder 33 (Step S701), and stores the obtained decoding symbols using a scheme suitable for the contexts used in the arithmetic decoding processes (Step S702). As an exemplary storage scheme, it is good to store occurrence symbols for contexts in a table as shown in (c) of FIG. 14. The largest value for the length of each occurrence symbol is determined based on the processing unit in the parallel context update processes.

In this case, in Step S507 of FIG. 13, the parallel context update unit 36 performs context update processes based on the resulting occurrence symbols for the contexts stored in the state reservoir 35, and reflects them onto the symbol occurrence probability values in the context memory 37.

Here, it is also good that the parallel context update unit 36 sequentially performs update processes according to occurrence symbols stored in (c) of FIG. 14, with reference to the transition table shown in FIG. 5 (a parallel update scheme 2A).

In this case, the context update processes are performed by executing the sequential processes at the time when the processing unit in the parallel context update processes is reached, and thus there is no need to execute the context update processes at the time of the arithmetic decoding processes. For this reason, there is a possibility that the processing load is distributed.

In addition, the parallel context update unit 36 may perform update processes on signals for which occurrence symbols have been processed in advance and stored in (c) of FIG. 14 (a parallel update scheme 2B).

More specifically, the preparation process is the same as in Embodiment 1, and thus the same description is not repeated here.

Figure 15:
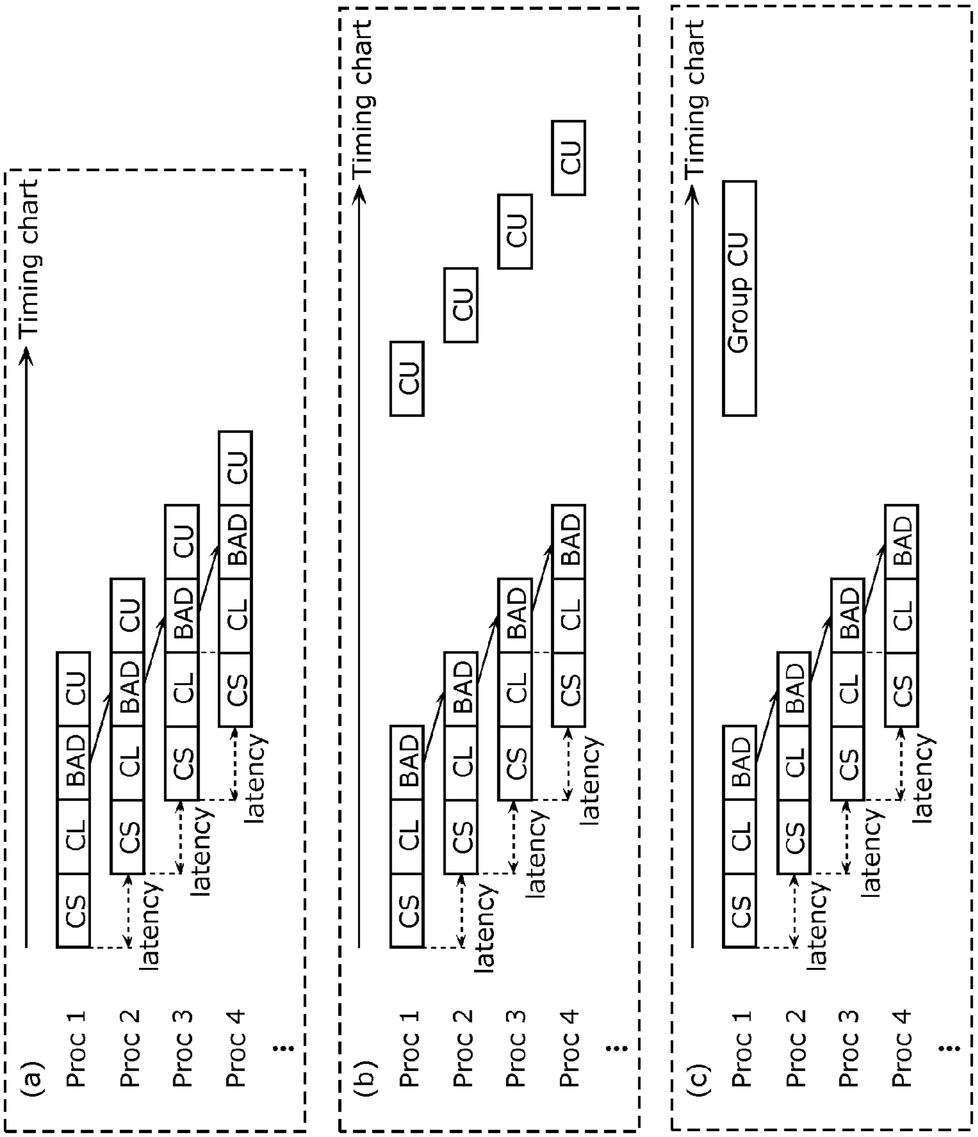
FIG. 15 is a timing chart of arithmetic decoding processes according to Embodiment 3.

FIG. 15 is a schematic diagram of processing timings for parallel processes implemented to perform faster arithmetic decoding processes.

In FIG. 15, (a), (b), and (c) correspond to the parallel update scheme 1, the parallel update scheme 2A, and the parallel update scheme 2B, respectively.

FIG. 15 illustrates, along a time axis, a context selection process (CS), a context load process (CL), a binary arithmetic decoding process (BAD), and a context update (CU) operation in a processing circuit of a process 1 (Proc1). For simplicity, the time periods required for the respective processes and operation are equal in FIG. 15. Likewise, this example also shows a process 2 (Proc2), a process 3 (Proc3), and a process 4 (Proc4). In addition, a Group CU in (c) of FIG. 15 shows a group of context processes in the case where a preparation process is performed on occurrence symbols in advance. The processing time varies depending on the details of the preparation process, and thus the Group CU is represented to have a size larger than or equal to one processing unit.

In addition, each of parts associated by a corresponding one of the arrows in the diagram has a dependency that they need to be processed in the sequence shown by the arrow. In the binary arithmetic decoding process, a current internal state in binary arithmetic decoding is updated for each decoding. This is why the binary arithmetic decoding process involves such a dependency. In addition, in the case where the same context is used (as in the case shown in the diagram), a result of updating the context is further used for reference, and thus there is a dependency between the context update (CU) and the context load (CL) for next decoding. However, according to this embodiment, it is possible to solve the dependency, and thus no arrow showing a dependency is required in FIG. 15.

In the case of the parallel update scheme 1 shown in (a) of FIG. 15, the process 1 is to sequentially perform the processes (which are the context selection process, the context load process, and the binary arithmetic decoding process), and performs the context update process lastly. Here, in the context update process, the update result is not reflected in the context memory. For this reason, a symbol occurrence probability value which is loaded at the time of context load in the process 2 is always a past symbol occurrence provability value, specifically, a symbol occurrence provability value immediately after the parallel context update processes.

For this reason, even when the context update process in the process 1 is performed after the context load processes in the processes 2 and 3 (in the diagram), it is possible to perform the decoding process accurately. In this way, even when parallel processes are performed, it is possible to minimize (one processing time in the diagram) a processing delay (latency). This processing delay is caused due to a dependency of state values in the arithmetic decoding. Thus, it is possible to reduce the processing delay by estimation or the like of the state values. It is to be noted that this embodiment is effective in the viewpoint of reducing the processing delay caused due to the dependency of contexts even in the case of further reducing the processing delay.

Unlike the case of (a) of FIG. 15, the parallel update scheme 2A shown in (b) of FIG. 15 is used in the case of not performing any context update process immediately after arithmetic decoding, and updating contexts for processing units used in the parallel context update processes. Even in this case, it is possible to keep the processing delay (latency) in the arithmetic decoding within the one processing time as in the case of (a) of FIG. 15.

Next, unlike the case of (a) of FIG. 15, the parallel update scheme 2B shown in (c) of FIG. 15 is used in the case of performing a preparation process and then updating contexts for processing units used in the parallel context update processes. Even in this case, it is possible to keep the processing delay (latency) in the arithmetic decoding within the one processing time as in the case of (a) of FIG. 15. In addition, the processing time required for the parallel update processes may be reduced more significantly than in the case of (b) of FIG. 15.

Figure 16A:
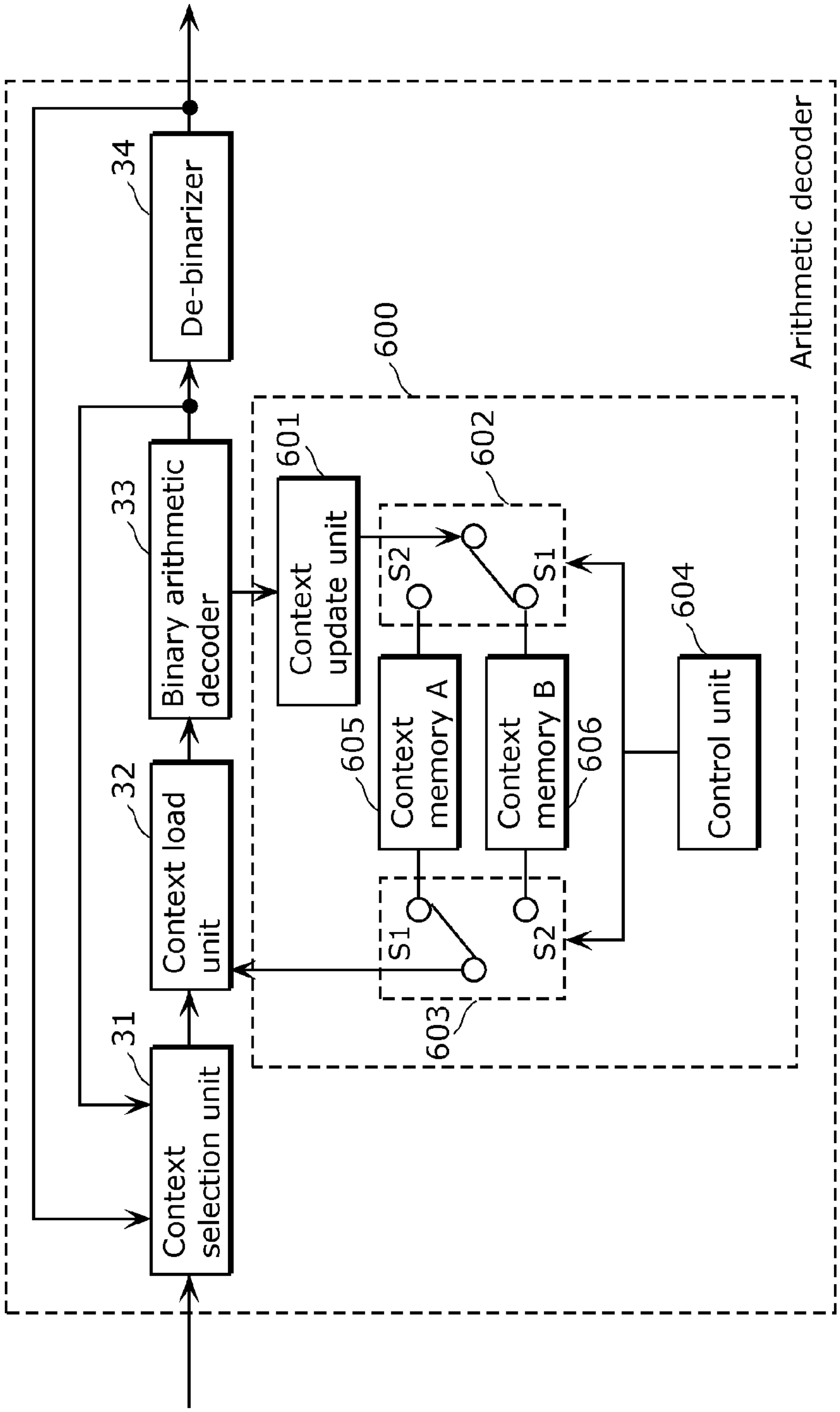
FIG. 16A is a block diagram of an arithmetic decoder according to a Variation of Embodiment 3.

FIG. 16A is a block diagram showing an example of a structure of an arithmetic decoder which performs the above-described context update processes shown in (a) of FIG. 15. In FIG. 16A, the context management unit 600 includes additional structural elements for performing the context update process shown in (a) of FIG. 15, in addition to the structural elements of the context management unit 600 explained with reference to FIG. 12.

The context management unit 600 includes: a context update unit 601, switches 602 and 603, a control unit 604, a context memory A 605, and a context memory B 606. It is assumed here that the other elements which are not explained operate in the same manner as the elements explained with reference to FIG. 12.

The context management unit 600 obtains decoding symbols and context numbers used in the decoding from the binary arithmetic decoder 33, updates symbol occurrence probabilities for contexts on a basis of a processing unit in parallel update processes, and outputs the symbol occurrence probabilities for the requested contexts to the context load unit 32.

Figure 16B:
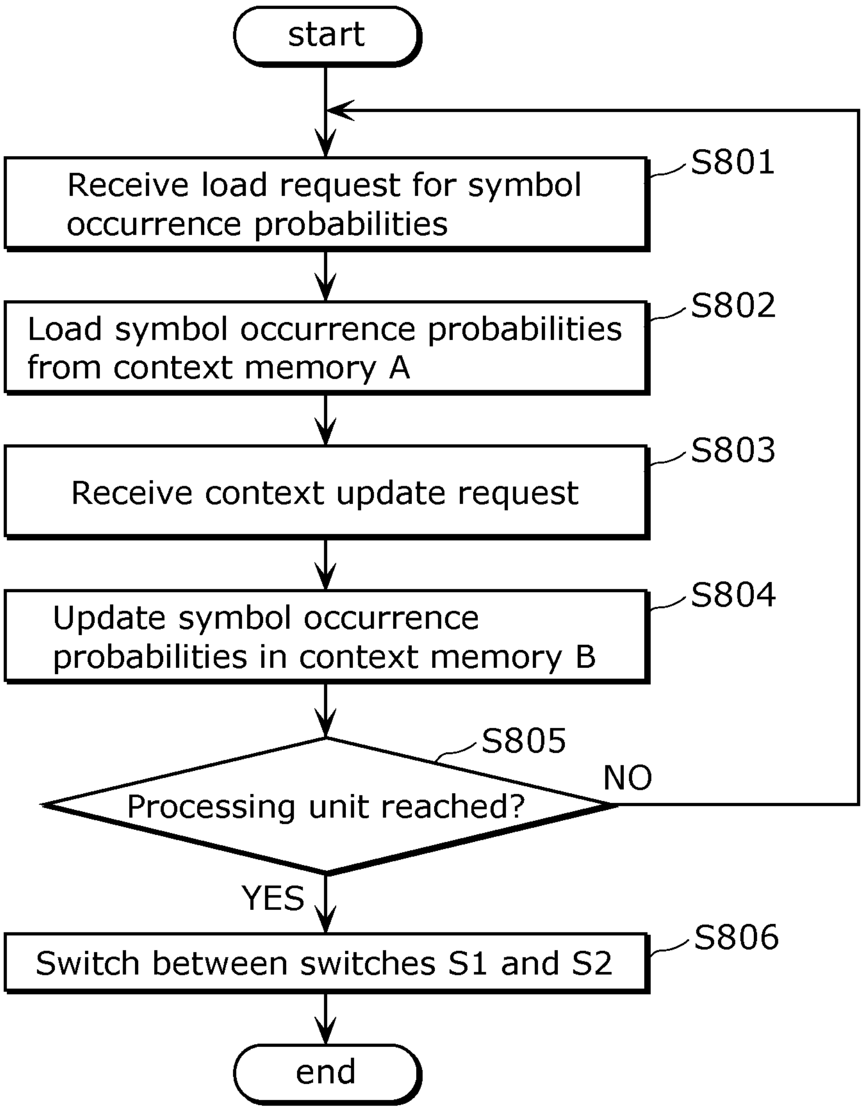
FIG. 16B is a flowchart of context update processes in (a) of FIG. 15 performed by the arithmetic decoder.

Operations performed by the context management unit 600 are described in detail with reference to FIG. 16B. FIG. 16B is a flowchart of context update processes in (a) of FIG. 15 performed by the arithmetic decoder.

In the context management unit 600, the control unit 604 controls the switches 602 and 602 to operate as switches (toggle switches) in cooperation with S1 and S2, respectively. In addition, a description is given assuming that the switches 602 and 603 are set to S1 in an initial state, in reality, switching is made depending on S1 or S2 which is a result of processing for the parallel processing units.

The context update unit 601 receives a load request for symbol occurrence probabilities including context numbers from the context load unit 32 (Step S801). In this case, context information (symbol occurrence probabilities) corresponding to the context numbers stored in the context memory A 605 connected to a side (S1) connected to the switch 603 is output to the context load unit 32 (Step S802).

Next, the context update unit 601 receives a context update request including the context numbers and the decoding symbols from the binary arithmetic decoder 33 (Step S803). In this case, the symbol occurrence probability values corresponding to the context numbers in the context memory B 606 connected to the side (S1) connected to the switch 602 are updated (Step S804).

Here, when the processing unit in the parallel context update processes is not reached (NO in Step S805), processes in response to a next context load request is performed. On the other hand, when the processing unit in the parallel context update processes is reached (YES in Step S805), the control unit 604 switches the cooperative switches 602 and 603. The switches 602 and 603 are switched from a current one of the sides S1 and S2 to the other at the same time (Step S806). In this way, it is possible to perform parallel processes only by preparing paired memories for storage, compared to the conventional art. In addition, since these two memories are switched by the switches, no data transfer is required, and thus the processing time can be reduced.

Next, a processing unit in the parallel context update processes is described with reference to FIG. 16C.

Figure 16C:
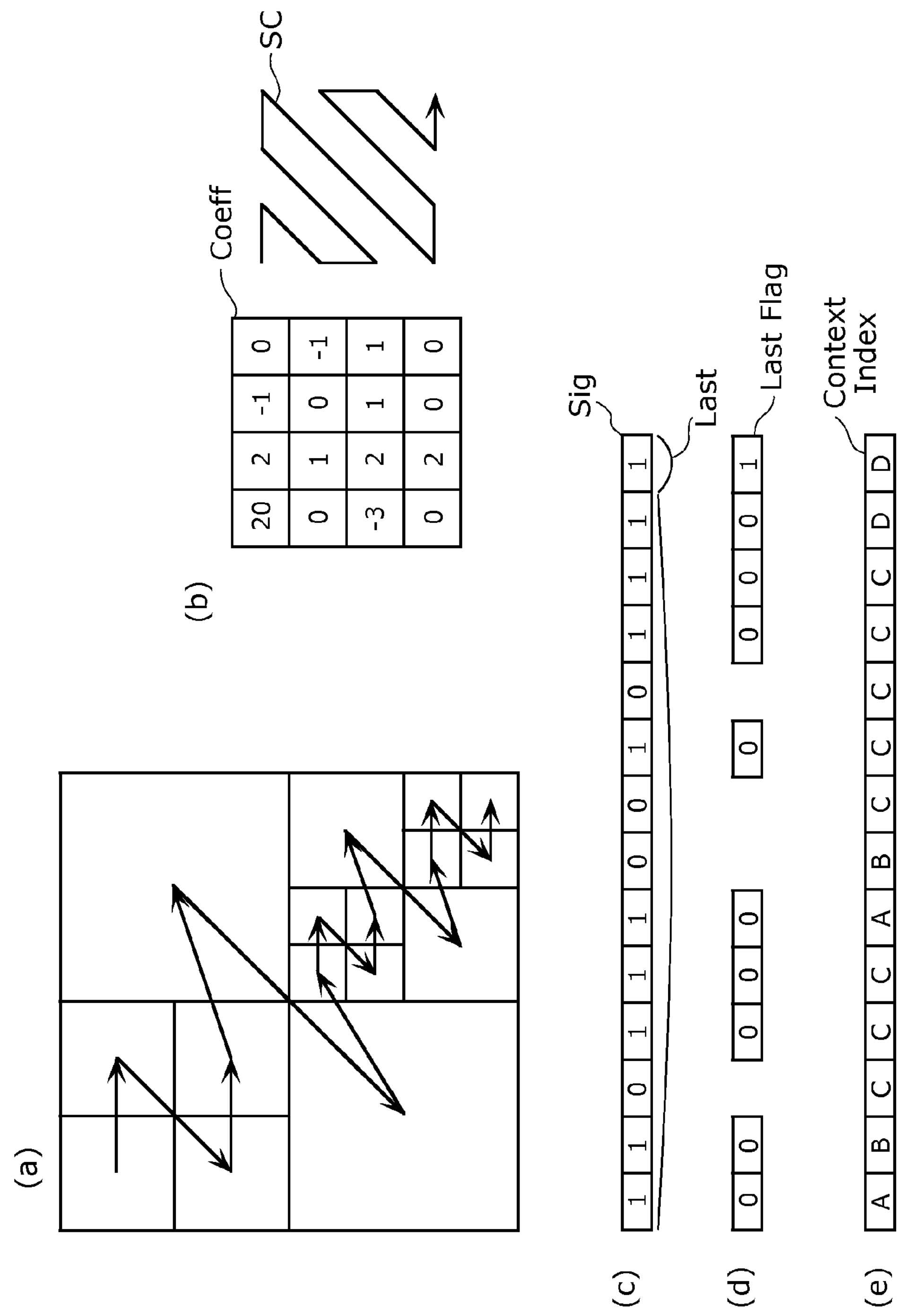
FIG. 16C is a schematic diagram for explaining an exemplary processing unit in the context update method.

FIG. 16C is a schematic diagram for explaining exemplary processing units in the context update method.

In FIG. 16C, (a) shows a structure of coding units (CU) processed after being obtained by dividing a largest coding unit (LCU). In the diagram, each of the units in a square is a coding block, and the arrows indicate a processing order.

The structure of a largest coding unit is determined so as to yield a high coding efficiency at the encoder side. For this reason, images for which a large processing unit is used is images (for example, simple images) that can be subjected to a comparatively easy prediction coding. In contrast, images for which a small processing unit is mostly used is images (for example, complex images) that can be subjected to a comparatively difficult prediction coding.

For example, it is conceivable that a context is updated according to a certain number of binary codes (Bin) (for example, each of parallel context update processes is executed for every 4 binary codes). In this case, a context update unit is determined without considering image features, and thus some image deterioration is predicted.

For this reason, the processing unit in the parallel context update processes is determined as the coding block which is the coding processing unit. In this way, in the case of an image which is difficult to be prediction-coded due to its image features, context update is performed frequently. On the other hand, in the case of an image which is easy to be prediction-coded due to its image features, context update processes are executed while performing context update less frequently. As a result, it is possible to suppress image deterioration due to parallelization of the context update processes.

In addition, a CU is divided into transform units (TU) which are processing units for transform coefficients. By dividing the CU into transform units (TU) as the later-described processing units for coding the transform coefficients, it is possible to perform parallel context update processes further adapted to the image features.

Next, examples of transform coefficients in the embodiments are described with reference to (b) to (d) of FIG. 16C.

In FIG. 16C, (b) shows transform coefficients Coeff to be decoded (which become coding targets) and the processing order SC. In addition, (c) in FIG. 16C shows a binary signal stream Sig obtained by scanning the transform coefficients Coeff in the processing order SC so that, in the binary signal stream Sig, each of non-zero transform coefficients and each of zero transform coefficients are represented as 1 and 0, respectively. In addition, (d) of FIG. 16C shows whether or not the binary signal stream Sig is the last non-zero coefficient. For example, a binary signal stream LastFlag having a value of 1 is shown when the binary signal stream Sig is the last non-zero coefficient, and a binary signal stream LastFlag having a value of 0 is shown when the binary signal stream Sig is not a last non-zero coefficient. It is to be noted that the coefficient information is called Significance Map, and may be the same as ones conforming to the H.264 standard. Alternatively, the position information of Last may be coded separately.

In FIG. 16C, (e) shows an example of a context corresponding to (c) of FIG. 16C. Here, (e) shows an example where a context number to be referred to for decoding a starting bit is A, and context numbers of A, B, C, C, C, A . . . are determined according to the processing order SC.

Here, when the processing unit is determined to be the transform processing unit as mentioned above, the decoding symbol occurrence probability value for the context A which is called several times is a same value.

Conventionally, a decoding symbol occurrence probability value for a context A which is called first and a decoding symbol occurrence probability value for a context A (a second-appearing A) called in a sixth place are different. However, the symbol occurrence probability value is the same in this embodiment because the value is not updated until the processing unit is reached. This is true for the contexts B, C, and D.

Here, the processing unit in the parallel context update processes may be switched, for each of signal types or the like, to one of the following: a transform unit (TU) which is a unit of coding coefficients; a prediction unit (PU) which is a unit of switching prediction schemes in prediction coding; a coding unit (CU) which is a unit of coding; and a largest coding unit (LCU) which is the largest one of available coding units. Use of a larger processing unit can increase the parallelization degree. However, the use of the larger processing unit delays context update, reduces adaptability of a symbol occurrence probability in an image, and increases the possibility that the coding efficiency is reduced.

One of these processing units may be determined in advance for the type of each coding signal, or may be switched based on header information (for example, information indicating a profile). In this way, depending on the parallelization degree to be required in the processing, it is possible to control the processing unit, and thus to increase the parallelization degree in the processing while suppressing reduction in the coding efficiency.

Next, a variation of a method of updating a parallel context update scheme for each symbol is described with reference to FIG. 16D.

Figure 16D:
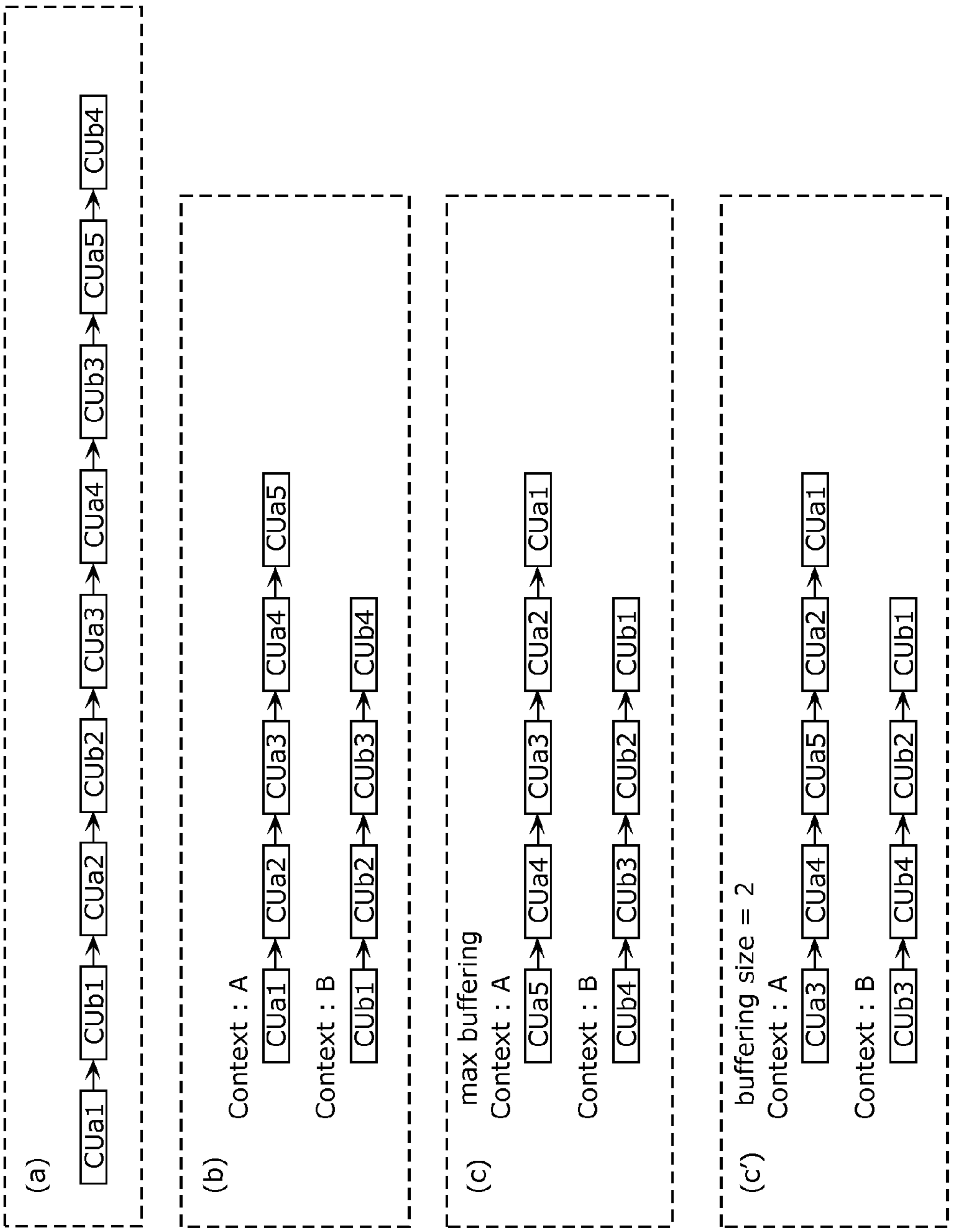
FIG. 16D is a diagram showing exemplary parallel context update processes.

FIG. 16D shows an example of parallel context update processes. CUaN shows a process of updating a context A corresponding to an N-th decoding signal. Likewise, CubN shows a process for a context B.

In FIG. 16D, (a) shows an example where context update processes are sequentially performed in the context call order, among parallel context update schemes. This shows that the processes are performed in the occurrence order as shown in (a) or (b) of FIG. 16C. This scheme provides an advantageous effect that, for example, the use of the circuit structure in FIG. 16A makes it possible to perform such context update processes in a limited additional memory area.

On the other hand, (b) of FIG. 16D shows an example where parallel context update processes for contexts are performed. This scheme is performed by preparing a plurality of processing circuits for performing context update processes, which is expected to reduce the processing time. Here, this scheme is a variation of (a) of FIG. 16D and intended to perform context update processes in a context call order.

On the other hand, (c) of FIG. 16D shows an example where context update processes are sequentially performed in an order inverse to the context call order, among parallel context update schemes. This is an exemplary case of storing decoding symbols corresponding to contexts once and the processes them as shown in (c) of FIG. 16D. More specifically, context update processes are performed starting with a symbol which is decoded last in the processing unit, and an update process corresponding to an occurrence symbol which appears first in the processing unit is executed last.

In this way, a memory for storage is required as mentioned earlier. For example, when the processing unit is determined to be a transform coefficient unit, it is conceivable that the occurrence probability of a starting symbol in a next processing unit and the occurrence probability of the starting symbol in the current processing unit are close to each other. For this reason, by executing the update process for the starting symbol in the current processing unit last, it is possible to use the closer symbol occurrence probability in the decoding of the next processing unit. For this reason, increase in the coding efficiency can be expected.

Furthermore, (c') of FIG. 16D is a variation example of executing context update processes in the inverse order explained in (c) of FIG. 16D. This is a scheme for reducing an additionally required memory amount, for example, when the memory amount is assumed to be 2, by performing, for each of contexts, a storage process for starting two symbols in a processing unit, and sequentially performing storage processes for the following symbols (starting with the third symbol). Even with this scheme, as explained in (c) of FIG. 16D, it is possible to reflect, onto a first context update process in a next processing unit, a result obtained by lastly performing a context update process on the symbol including the starting decoding symbol in a current processing unit, and thus to use a closer symbol occurrence probability for a starting decoding symbol in a next processing unit. For this reason, increase in the coding efficiency can be expected.

Here, the memory amount is assumed to be 2 for simplicity, but the memory amount is not limited thereto. It is only necessary to determine in advance the same value for the encoder side and the decoder side. This value may be switched according to a signal defined in a profile.

Here, as an example for further simplifying update processes, it is also good to perform update processes by separately counting up cases where a decoding symbol and a symbol occurrence probability are similar and cases where a decoding symbol and a symbol occurrence probability are significantly different, and performing update processes according to the count values.

In addition, the counting processes may involve weighting operations. By adding a weight for doubling a value to an association between a decoding symbol and a symbol occurrence provability for a frequently occurring signal (for example, a low frequency area in transform coefficients), it is possible to expect that decrease in the coding efficiency at the time of parallelization of update processes is suppressed.

Embodiment 4

An arithmetic decoding method according to Embodiment 4 is schematically described. The arithmetic coding method in Embodiment 4 is intended to perform a group of context update processes on coding target signals in each of processing units each obtained as a segment having a certain size. In this way, it is possible to realize parallel arithmetic coding processes within the certain processing unit.

The arithmetic coding method according to this embodiment has been schematically described above. Here, common points with respect to Embodiment 2 are not described in detail, and different points are mainly described.

Figure 17:
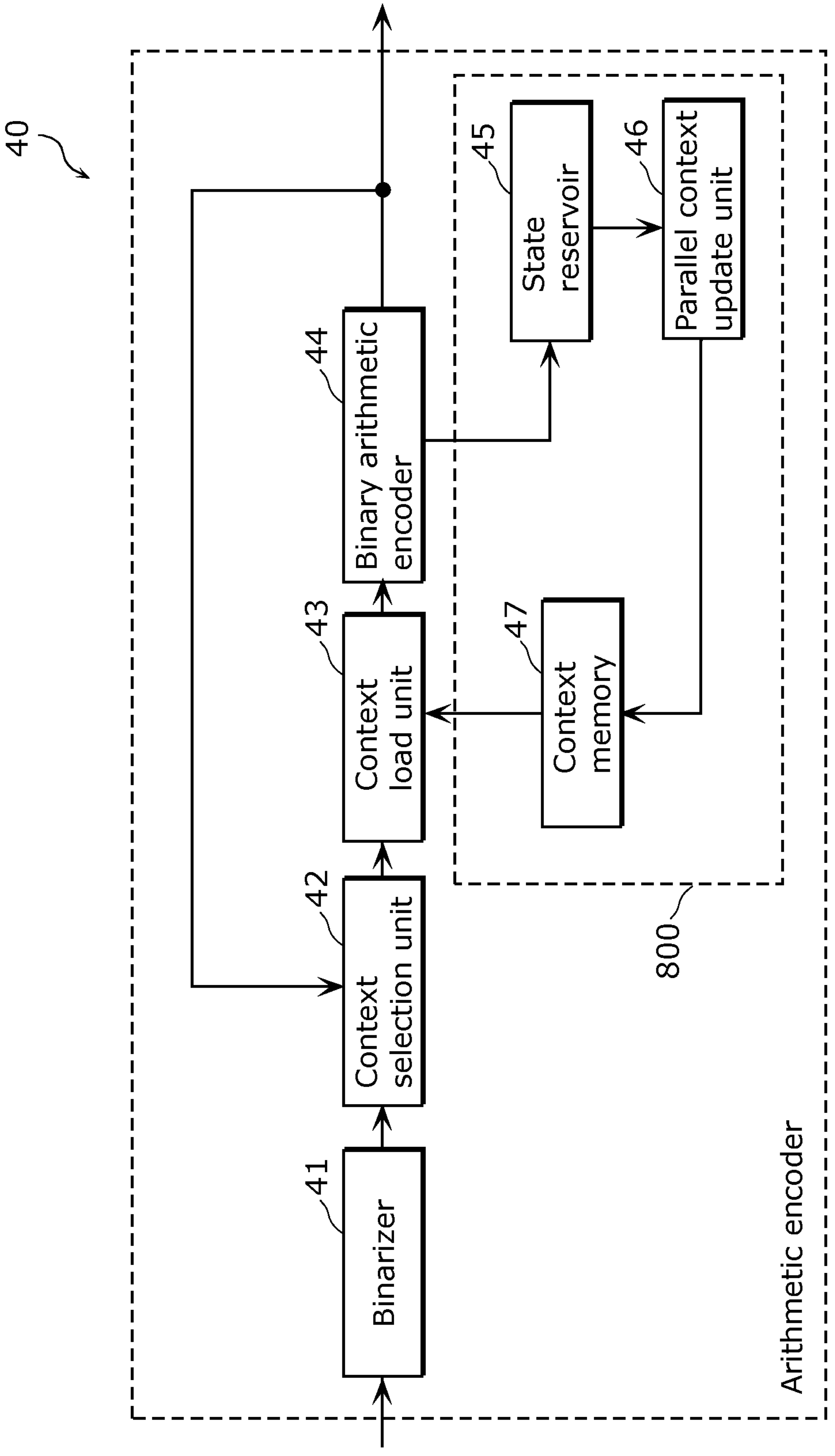
FIG. 17 is a block diagram of an arithmetic encoder according to Embodiment 4.

Next, a description is given of a structure of an arithmetic encoder which performs the arithmetic coding method in this embodiment. FIG. 17 is a block diagram showing an exemplary structure of the arithmetic encoder according to Embodiment 4. Here, the arithmetic encoder 40 according to Embodiment 4 compression-codes an image signal, and corresponds to a part of an image coding apparatus 200 which outputs coded image data.

As shown in FIG. 17, the arithmetic encoder 40 includes: a binarizer (Binarizer) 41, a context selection (Context Selection) unit 42, a context load (Context Load) unit 43, a binary arithmetic encoder (Bin Encoder) 44, a state reservoir (Reservoir) 45, a parallel context update (Parallel Context Update) unit 46, and a context memory (Context Memory) 47. Operations performed by the arithmetic encoder 40 according to Embodiment 4 are described in detail with reference to FIG. 18.

Figure 18:
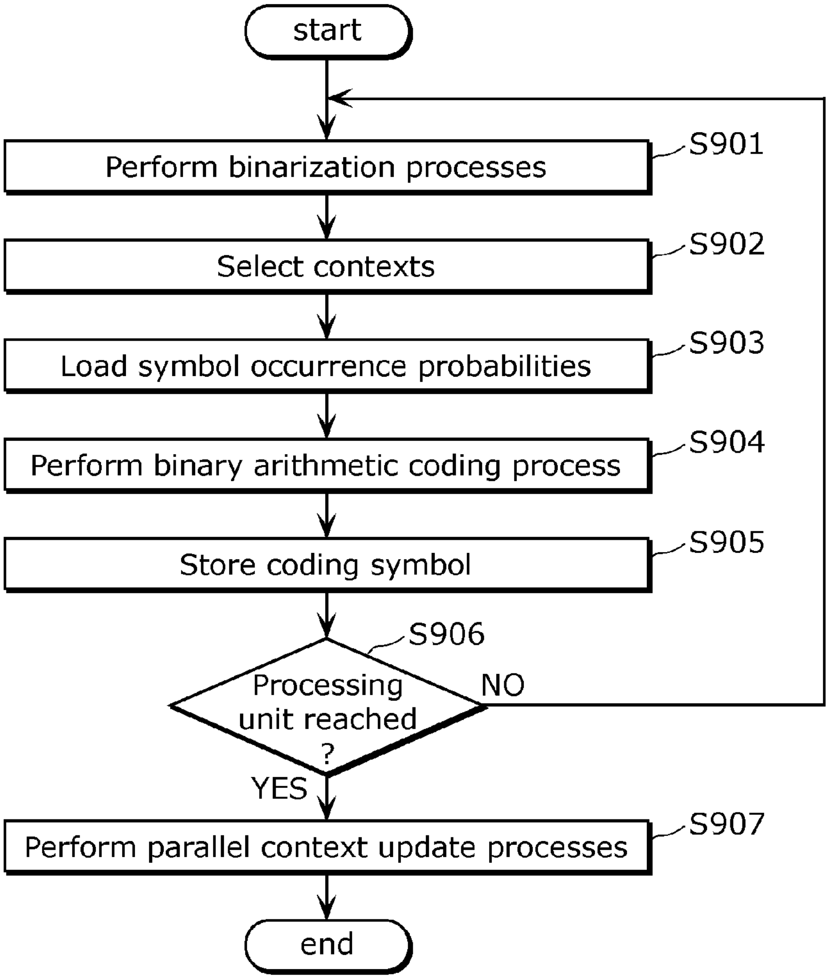
FIG. 18 is a flowchart of arithmetic encoder according to Embodiment 4.

FIG. 18 is a flowchart of the arithmetic encoder 40.

First, the binarizer 41 transforms target signals into binary signals using a predetermined approach (Step S901). For example, it is also good to use a binarization scheme in which 1, 01, 001, and 0001 are assigned to signals 0 to 3.

Next, each of arithmetic coding processes is performed for every bit of the resulting binary signals. For this reason, the context selection unit 42 performs context selection processes on target binary signals (Step S902). In the context selection processes, for example, already coded signals or signals of already coded neighboring blocks are obtained, and contexts are determined according to a predetermined scheme, and the determined context numbers are notified to the context load unit.

The context load unit 43 loads symbol occurrence probabilities corresponding to the contexts specified by the context memory 47 according to the context numbers (Step S903). Here, associations between symbol occurrence probabilities and contexts may be managed in an association table or the like. The symbol occurrence probability table is the same as the table described in Embodiment 3.

Next, based on the loaded symbol occurrence probabilities, the binary arithmetic encoder 44 performs arithmetic coding processes (Step S904). More specifically, based on each symbol occurrence probability obtained from the context load unit 43, the binary arithmetic encoder 24 updates an internal state of the binary arithmetic encoder 44 and outputs a coding signal according to the updated internal state. Here, the internal state of the binary arithmetic encoder 44 is a value which is sequentially updated until it is initialized or reset. Here, details of operations performed by the binary arithmetic encoder 44 may conform to the H.264 standard.

Next, the coding target symbols subjected to the arithmetic coding processes are output to the state reservoir 45 (Step S905). Here, such a coding target symbol is stored for each context, and the state of the context is managed. Here, the state reservoir 45 performs detailed operations which are the same as the operations explained in Embodiment 3.

When a coding unit does not reach a processing unit in the parallel context update processes (NO in Step S906), a return is made to binarization processes (S901) for next coding target symbols (when the coding target symbols are binary ones, a return is made to context selection processes (S902)).

On the other hand, when the coding unit reaches the processing unit in the parallel context update processes (YES in Step S906), the parallel context update unit 46 obtains a group of coding symbols for contexts from the state reservoir 45, and executes the parallel context update processes (Step S907). Here, the parallel context update unit 46 resets the information stored in the state reservoir 45.

In the parallel context update processes, the symbol occurrence probabilities corresponding to the contexts are updated, and the updated symbol occurrence probabilities are stored in the context memory 47. The parallel context update unit 36 in Embodiment 3 performs the same detailed operations as operations performed by the parallel context update unit 36, and thus the same descriptions thereof are not repeated here.

The structure of the arithmetic encoder 40 according to this embodiment has been schematically described above.

Figure 19:
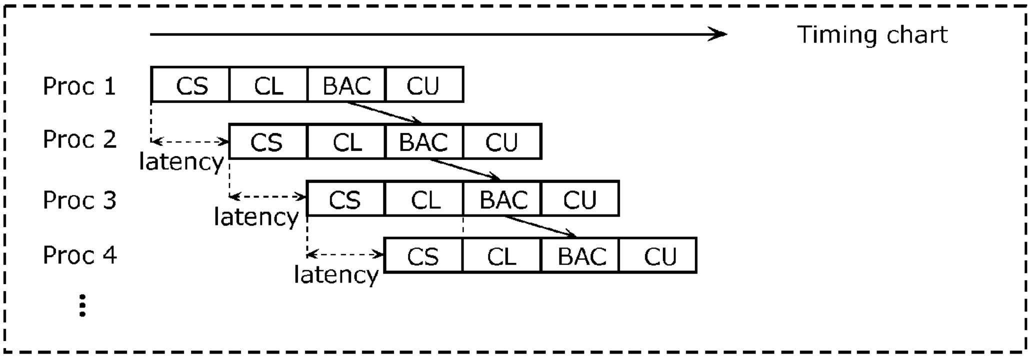
FIG. 19 is a timing chart of arithmetic coding processes according to Embodiment 4.

FIG. 19 is a schematic diagram of processing timings for parallel processes implemented to perform faster arithmetic coding processes.

FIG. 19 shows a case using the parallel update scheme 1 described in Embodiment 3. Here, the parallel update scheme 2A and the parallel update scheme 2B according to Embodiment 3 can be explained similarly.

FIG. 19 illustrates, along a time axis, a context selection process (CS), a context load process (CL), a binary arithmetic coding process (BAD), and a context update (CU) operation in a processing circuit of a process 1 (Proc1). For simplicity, the time periods required for the respective processes and operation are equal in FIG. 19. Likewise, this example also shows a process 2 (Proc2), a process 3 (Proc3), and a process 4 (Proc4).

In addition, each of parts associated by a corresponding one of the arrows in the diagram has a dependency that they need to be processed in the sequence shown by the arrow. In the binary arithmetic coding process, the internal state of the binary arithmetic coding is updated for each coding process, and there is a dependency in the binary arithmetic coding process. In addition, in the case where the same context is used (as in the case shown in the diagram), a result of updating the context is further used for reference, and thus there is a dependency between the context update (CU) and the context load (CL) for next coding. However, according to this embodiment, it is possible to solve the dependency, and thus no arrow showing a dependency is required in FIG. 19.

In the case of the parallel update scheme 1 explained in Embodiment 3, the process 1 performs sequential processes (which are the context selection process, the context load process, and the binary arithmetic coding process), and performs the context update process lastly. Here, in the context update process, the update result is not reflected onto the context memory. For this reason, a symbol occurrence probability value which is loaded at the time of context load in the process 2 is always a past symbol occurrence provability value, specifically, a symbol occurrence provability value immediately after the parallel context update processes.

For this reason, even when the context update process in the process 1 is performed after the context load process in the processes 2 and 3 (in the diagram), it is possible to perform the coding process accurately. In this way, even when parallel processes are performed, it is possible to minimize (one processing time in the diagram) a processing delay (latency). This processing delay is caused due to a dependency of state values in the arithmetic coding. Thus, it is possible to reduce the processing delay by estimation or the like of the state values. It is to be noted that this embodiment is effective in the viewpoint of reducing the processing delay caused due to the dependency of contexts even in the case of further reducing the processing delay.

Figure 20:
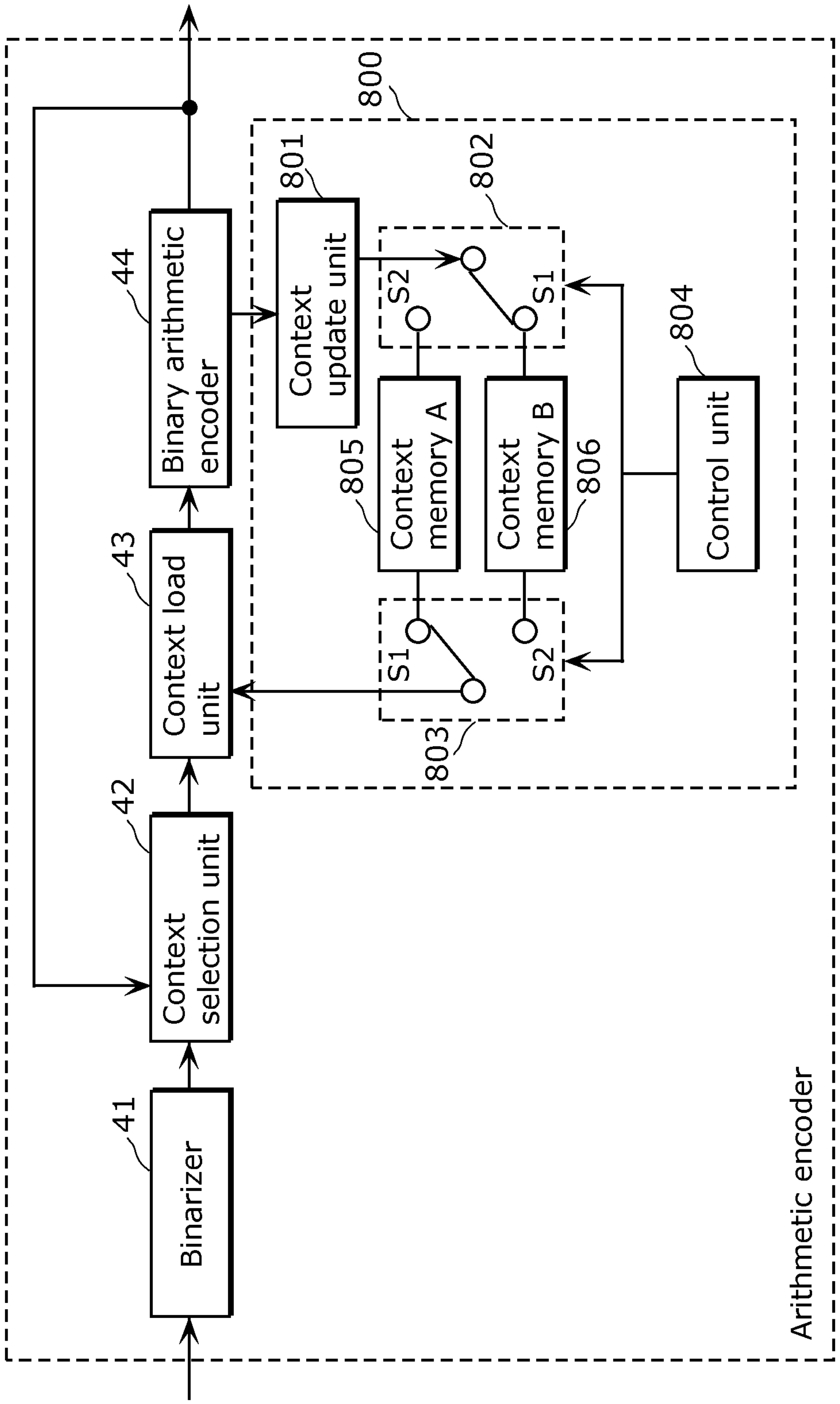
FIG. 20 is a block diagram of an arithmetic encoder according to a Variation of Embodiment 4.

FIG. 20 is a block diagram showing an example of a structure of an arithmetic encoder which performs the above-described context update processes shown in FIG. 19. In FIG. 20, the context management unit 800 includes additional structural elements for performing the context update process shown in FIG. 19, in addition to the structural elements of the context management unit 800 explained with reference to FIG. 17. The context management unit 800 includes: a context update unit 801, switches 802 and 803, a control unit 804, a context memory A805, and a context memory B806. It is assumed here that the other elements which are not explained operate in the same manner as the elements explained with reference to FIG. 17.

The context management unit 800 obtains a coding target symbol and a context number used in the coding from the binary arithmetic encoder, updates a symbol occurrence probability for each of contexts on a basis of a processing unit in the parallel update processes, and outputs a symbol occurrence probability for the requested context to a context obtainment and load unit.

Figure 21:
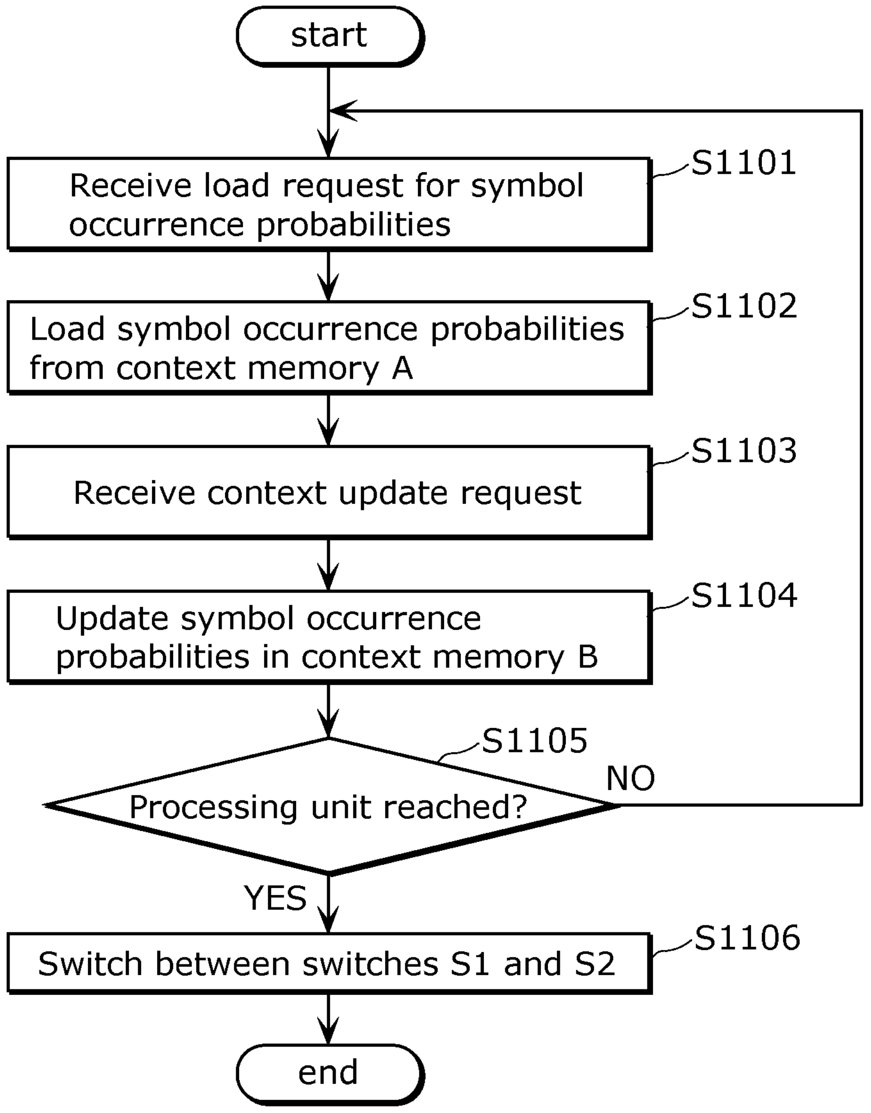
FIG. 21 is a flowchart of context update processes in FIG. 19 performed by the arithmetic encoder.
Figure 22:
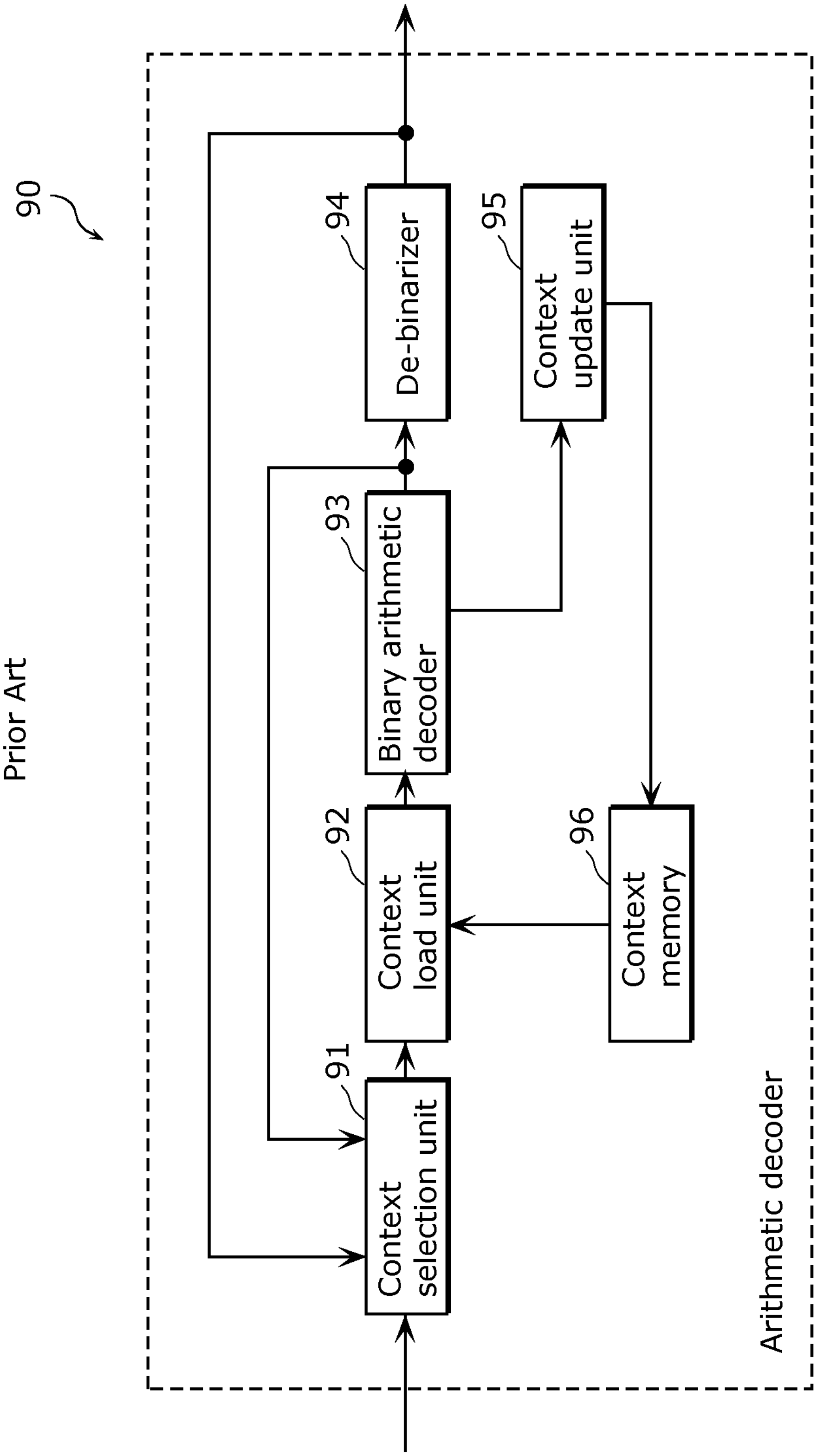
FIG. 22 is a block diagram of a structure of an arithmetic decoder which performs conventional H.264/AVC arithmetic decoding processes.
Figure 23:
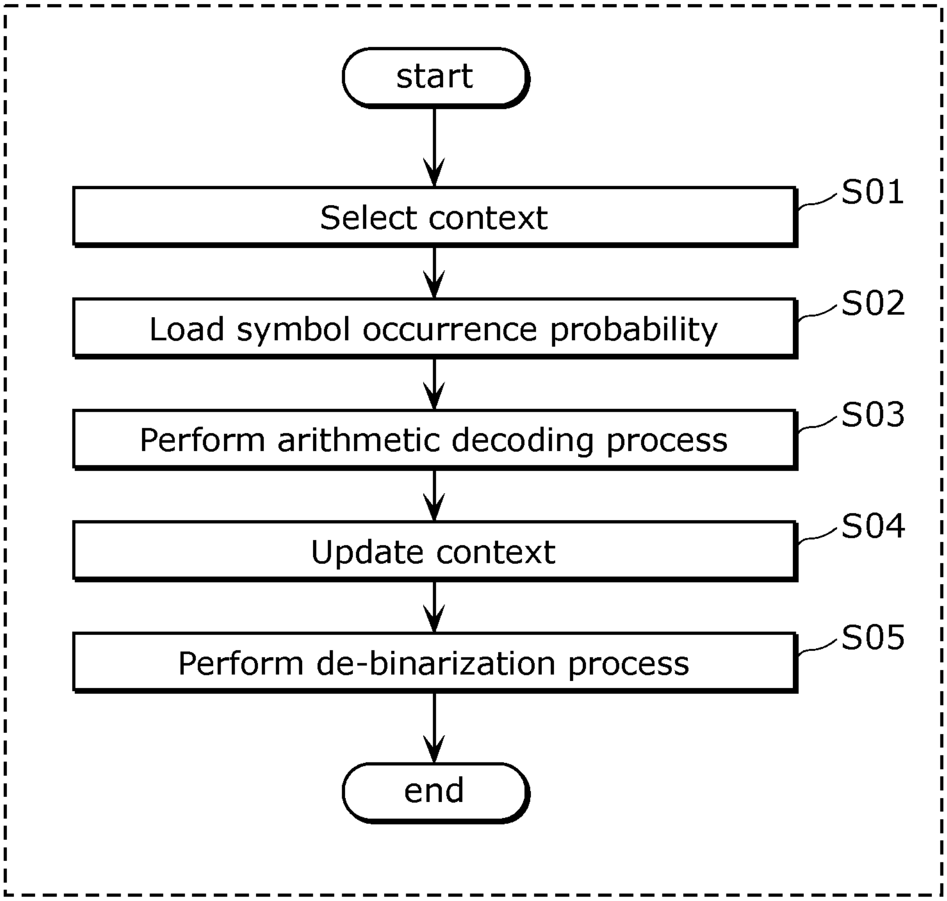
FIG. 23 is a flowchart of the conventional arithmetic decoding processes.
Figure 24:
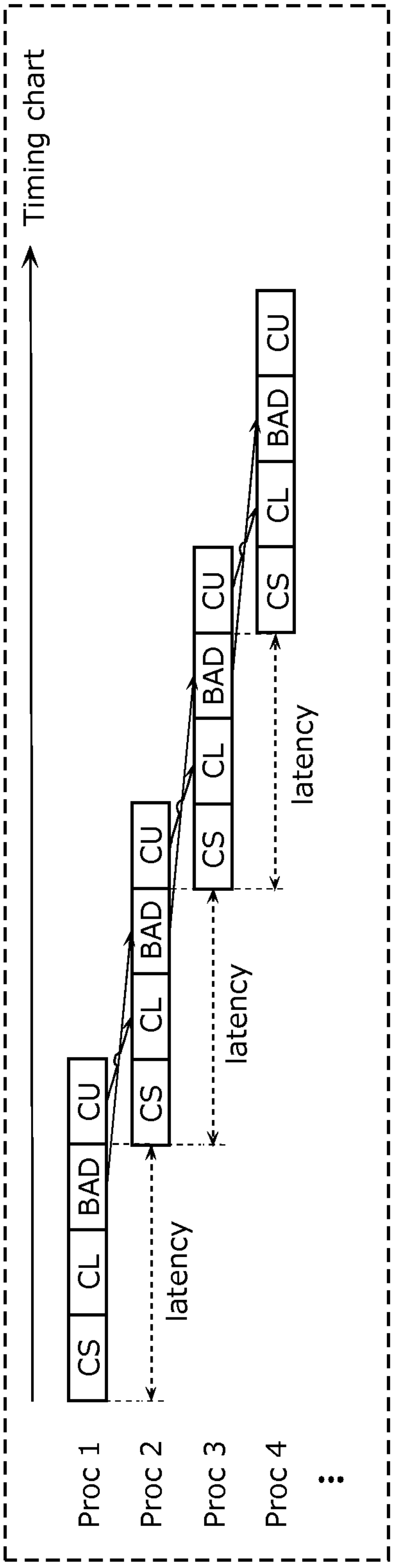
FIG. 24 is a timing chart of the conventional arithmetic decoding processes.

Operations performed by the context management unit 800 are described in detail with reference to FIG. 21. FIG. 21 is a flowchart of context update processes in FIG. 19 performed by the arithmetic encoder.

In the context management unit 800, the control unit 804 controls the switches 602 and 602 to operate as switches (toggle switches) in cooperation with S1 and S2, respectively. In addition, a description is given assuming that S1 is set in an initial state, in reality, switching is made depending on a result of processing parallel processing units.

The context update unit 801 receives a load request of symbol occurrence probabilities including context numbers from the context load unit 43 (Step S1101). In this case, context information (symbol occurrence probabilities) corresponding to the context numbers stored in the context memory A805 connected to a side (S1) connected to the switch 803 is output to the context load unit 43 (Step S1102).

Next, the context update unit 801 receives a context update request including the context numbers and the coding target symbols from the binary arithmetic encoder 44 (Step S1103). In this case, symbol occurrence probability values corresponding to context numbers in the context memory B806 connected to the side (S1) connected to the switch 802 are updated (Step S1104).

Here, when the processing unit in the parallel context processes is not reached (NO in Step S1105), a process in response to a next context load request is performed. On the other hand, when the processing unit in the parallel context processes is reached (YES in Step S1105), the control unit 804 switches the cooperative switches 802 and 803. The switches 802 and 803 are switched from a current one of the sides S1 and S2 to the other at the same time (Step S1106).

In this way, it is possible to perform parallel processes only by preparing paired memories for storage, compared to the conventional art. In addition, since these two memories are switched by the switches, no data transfer is required, and thus the processing time can be reduced.

The processing unit in the parallel context update processes is the same as the one explained for decoding in Embodiment 3, and is described with reference to FIG. 16C.

FIG. 16C is a schematic diagram for explaining exemplary processing units in the context update method.

In FIG. 16C, (a) shows a structure of coding units (CU) processed after being obtained by dividing a largest coding unit (LCU). In the diagram, each of the units in a square is a coding block, and the arrows indicate a processing order.

The structure of a largest coding unit is determined so as to yield a high coding efficiency at the encoder side. For this reason, images in the case where a large processing unit is used have image features (for example, the images are simple images) and thus can be subjected to a comparatively easy prediction coding. In contrast, images in most cases where a small processing unit is used has image features (for example, the images are complex images) and thus can be subjected to a comparatively difficult prediction coding.

For example, it is conceivable that a context is updated according to a certain number of binary codes (Bin) (for example, each of parallel context update processes is executed for every 4 binary codes). In this case, a context update unit is determined without considering image features, some image deterioration is predicted.

For this reason, by determining the processing unit in the parallel context update processes to be the coding unit, context update is performed frequently in the case of an image which is difficult to be prediction-coded due to its image features, and the coding is executed while performing context update less frequently in the case of an image which is easy to be prediction-coded due to its image features. In this way, it is possible to suppress image deterioration due to parallelization of context update processes.

In addition, a CU is divided into transform units (TU) which are processing units for transform coefficients. By dividing the CU into transform units (TU) as the later-described processing units for coding the transform coefficients, it is possible to perform parallel context update processes further adapted to the image features.

Next, examples of applying the transform coefficients to the embodiments are described with reference to (b) to (d) of FIG. 16C.

In FIG. 16C, (b) shows transform coefficients Coeff to be coded (which become coding targets) and the processing order SC. In addition, (c) in FIG. 16C shows a binary signal stream Sig obtained by scanning the transform coefficients Coeff in the processing order SC so that, in the binary signal stream Sig, each of non-zero transform coefficients and each of zero transform coefficients are represented as 1 and 0, respectively. In addition, (d) in FIG. 16C shows whether or not the binary signal stream Sig is the last non-zero coefficient. For example, a binary signal stream LastFlag having a value of 1 is shown when the binary signal stream Sig is the last non-zero coefficient, and a binary signal stream LastFlag having a value of 0 is shown when the binary signal stream Sig is not a last non-zero coefficient. It is to be noted that the coefficient information is called Significance Map, and may be the same as ones conforming to the H.264 standard. Alternatively, the position information of Last may be coded independently.

In FIG. 16C, (e) shows an example of a context corresponding to (c) of FIG. 16C. Here, (e) shows an example where a context number to be referred to for coding a starting bit is A, and context numbers of A, B, C, C, C, A . . . are determined according to the processing order SC.

Here, when the processing unit is determined to be the transform processing unit as mentioned above, the coding symbol occurrence probability value for the context A which is called several times is a same value.

Conventionally, a coding symbol occurrence probability value for a context A which is called first and a coding symbol occurrence probability value for a context A (a second-appearing A) called in a sixth place are different. However, the symbol occurrence probability value in this embodiment is the same because the value is not updated until the processing unit is reached. This is true for the contexts B, C, and D.

Here, the processing unit in the parallel context update processes may be switched, for each of signal types or the like, to one of the following: a transform unit (TU) which is a unit of coding coefficients; a prediction unit (PU) which is a unit of switching prediction schemes in prediction coding; a coding unit (CU) which is a unit of coding; and a largest coding unit (LCU) which is the largest one of available coding units. A larger processing unit can increase a parallelization degree more significantly. On the other hand, the larger processing unit delays context update, reduces adaptability of a symbol occurrence probability in an image, and increases the possibility that the coding efficiency is reduced.

One of these processing units may be determined in advance for the type of each coding signal, or may be switched based on header information (for example, information indicating a profile). In this way, depending on the parallelization degree to be required in the processing, it is possible to control the processing unit, and thus to increase the parallelization degree in the processing while suppressing reduction in the coding efficiency.

Embodiment 5

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter; the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 25:
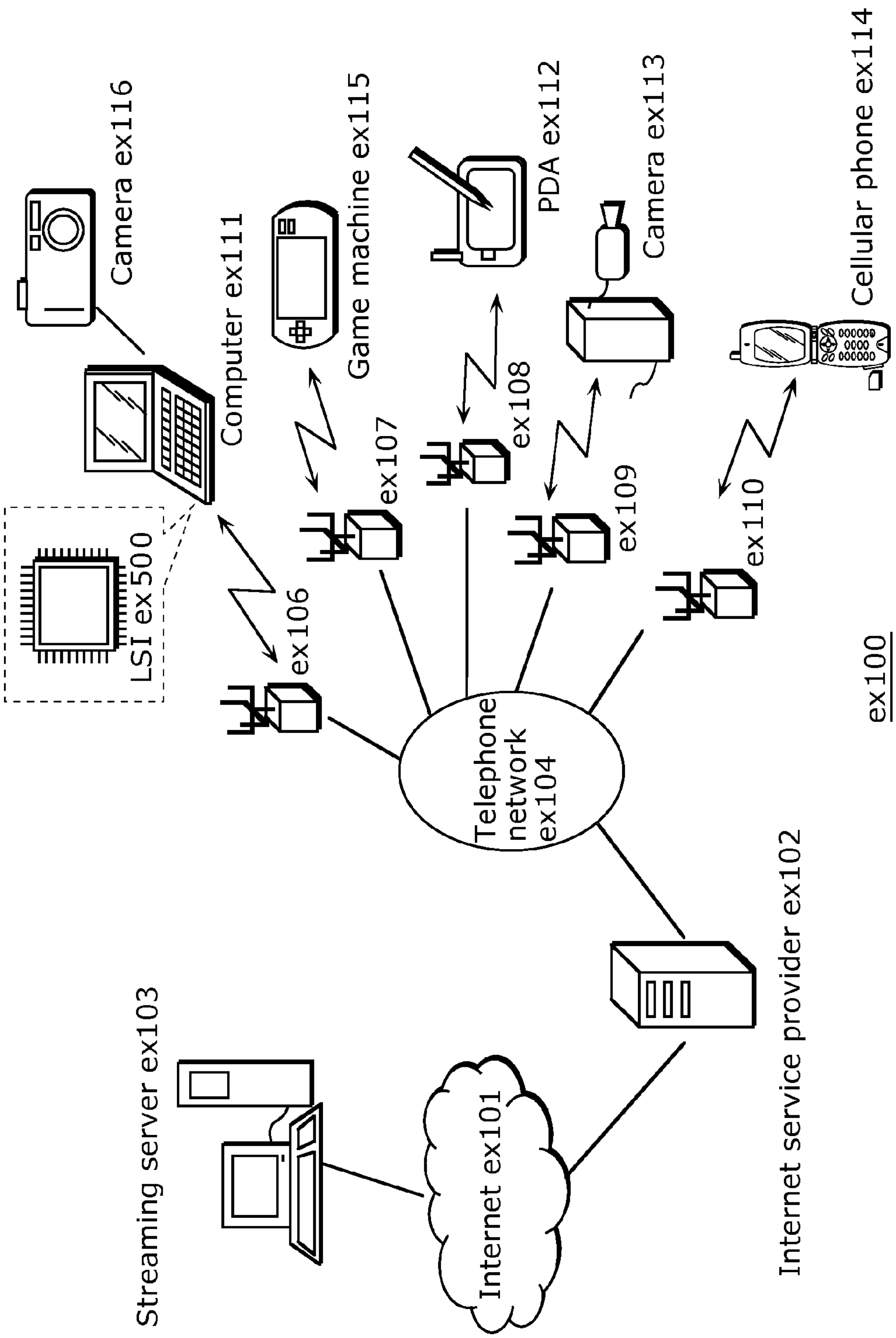
FIG. 25 shows an overall configuration of a content providing system for implementing content distribution services.

FIG. 25 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 25, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for encoding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 26:
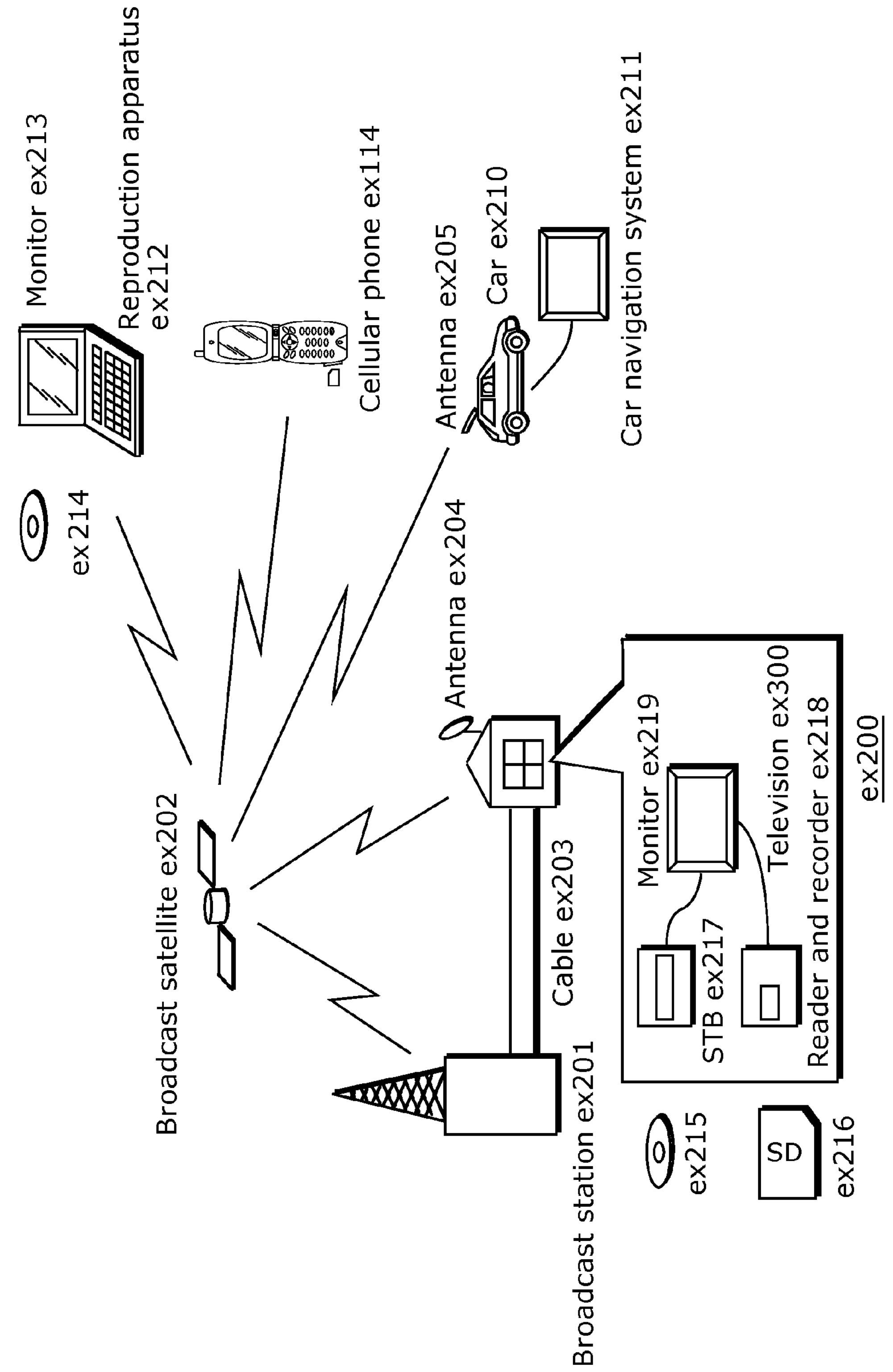
FIG. 26 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 26. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 27:
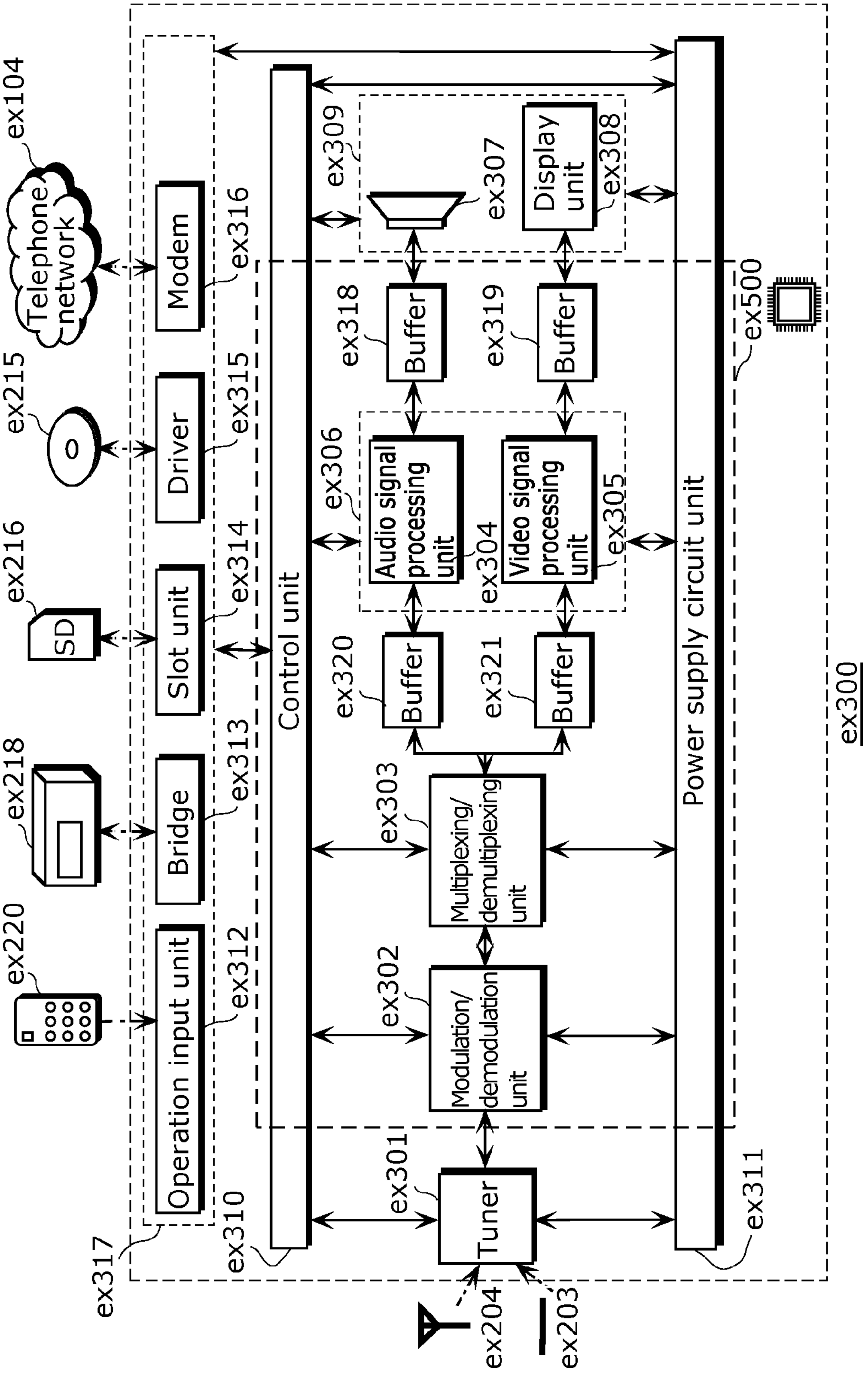
FIG. 27 shows a block diagram illustrating an example of a configuration of a television.

FIG. 27 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or encode the multiplexed data, and the television ex300 and the reader/recorder ex218 may share the decoding or encoding.

Figure 28:
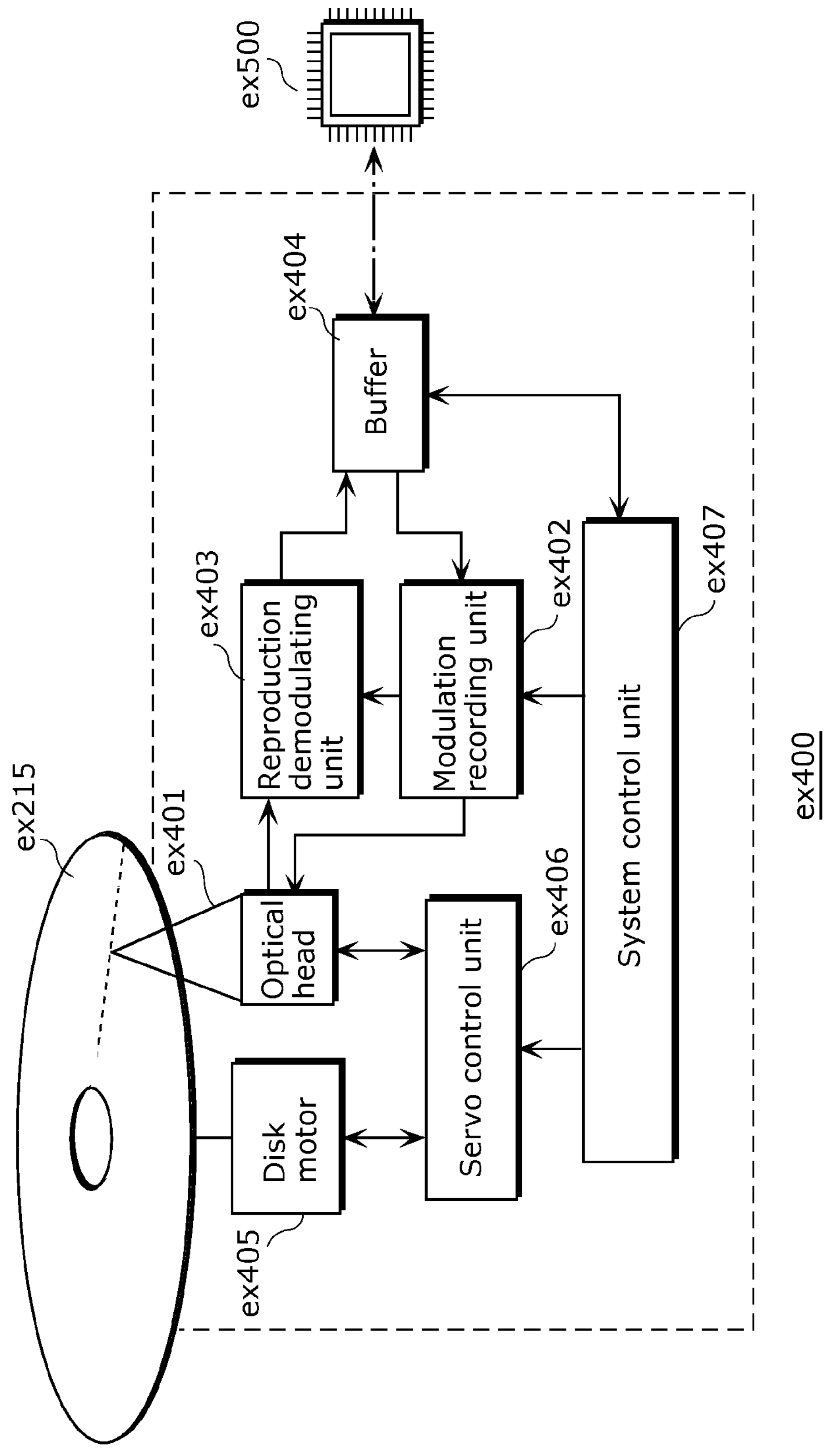
FIG. 28 shows a block diagram illustrating an example of a configuration of an information reproducing/recording unit that reads and writes information from and on a recording medium that is an optical disk.

As an example, FIG. 28 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 29:
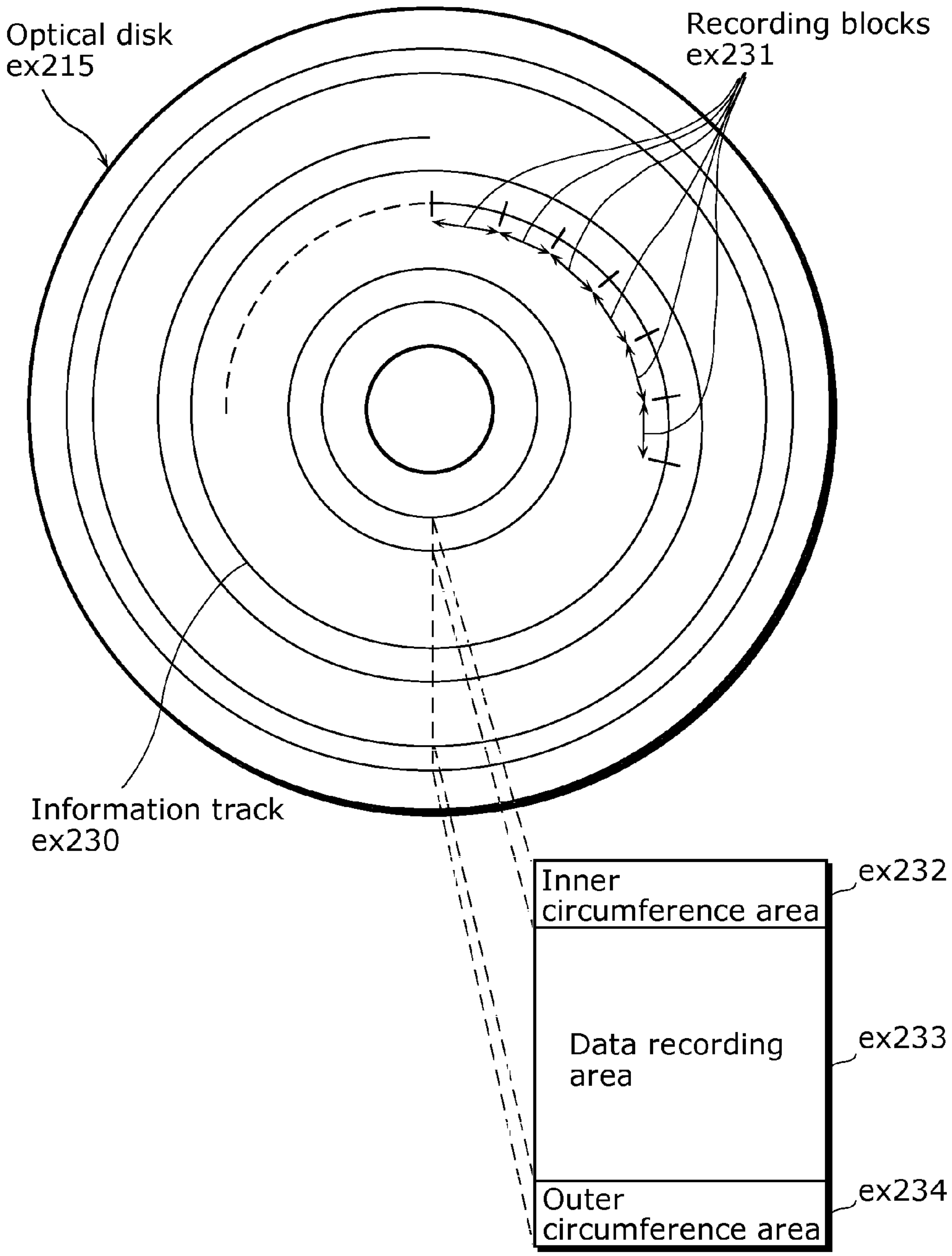
FIG. 29 shows an example of a configuration of a recording medium that is an optical disk.

FIG. 29 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 112. The same will be true for the configuration of the computer ex111, the cellular phone ex114, and others.

Figure 30:
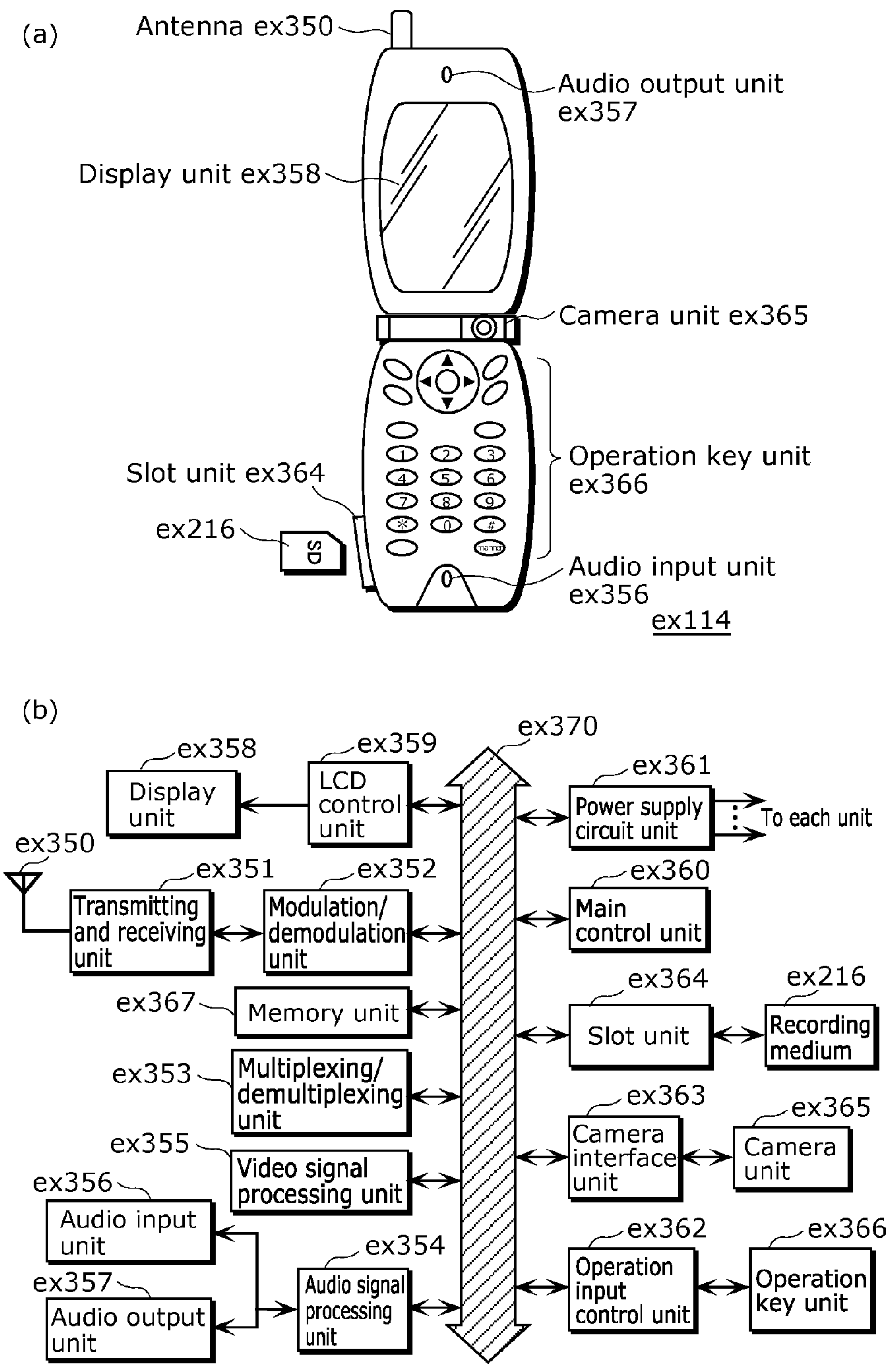
In FIG. 30, (a) shows an example of a cellular phone, and (b) is a block diagram showing an example of a configuration of a cellular phone.

In FIG. 30, (a) illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, encoded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to (b) of FIG. 30. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 6

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating the standard to which the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 31 illustrates a structure of the multiplexed data. As illustrated in FIG. 31, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x1.1F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 32:
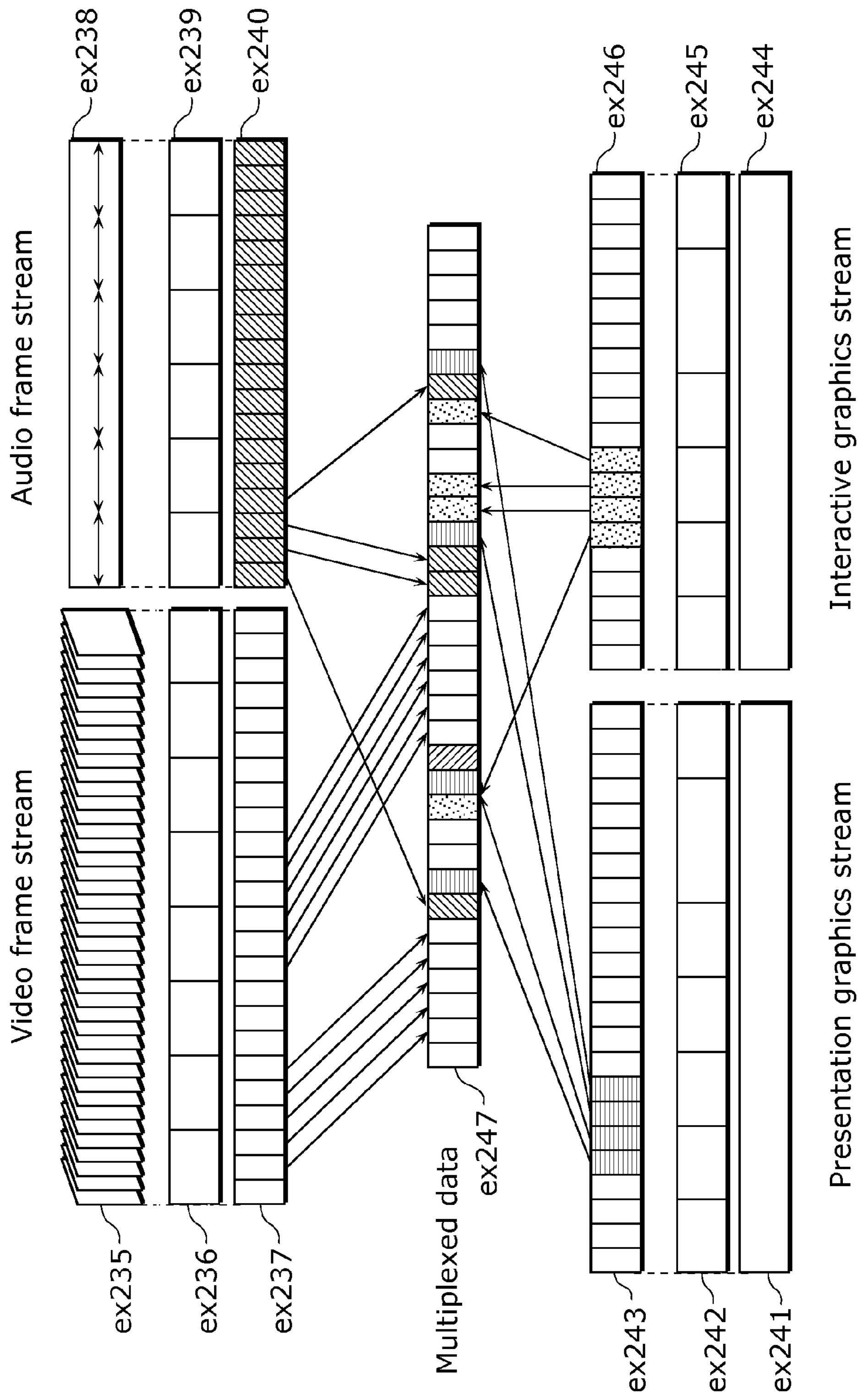
FIG. 32 schematically shows how each stream is multiplexed in multiplexed data.

FIG. 32 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 33:
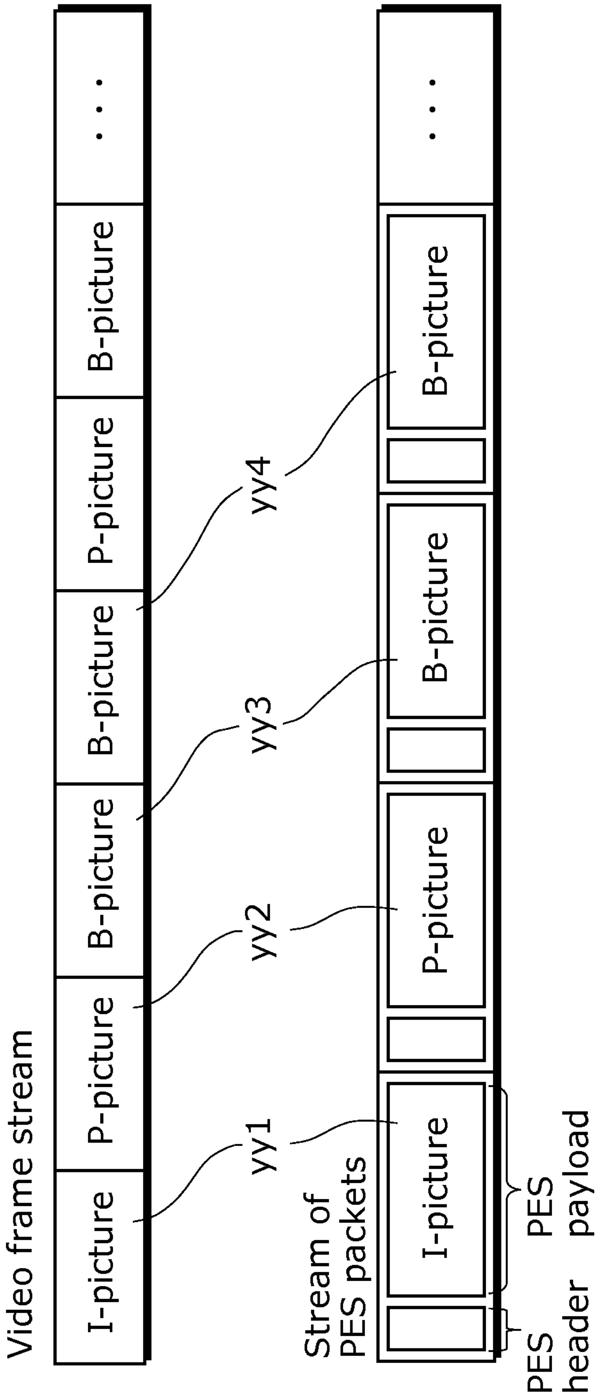
FIG. 33 shows how a video stream is stored in a stream of PES packets in more detail.

FIG. 33 illustrates how a video stream is stored in a stream of PES packets in more detail. The first bar in FIG. 33 shows a video frame stream in a video stream. The second bar shows the stream of PES packets. As indicated by arrows denoted as yy1, yy2, yy3, and yy4 in FIG. 33, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 34:
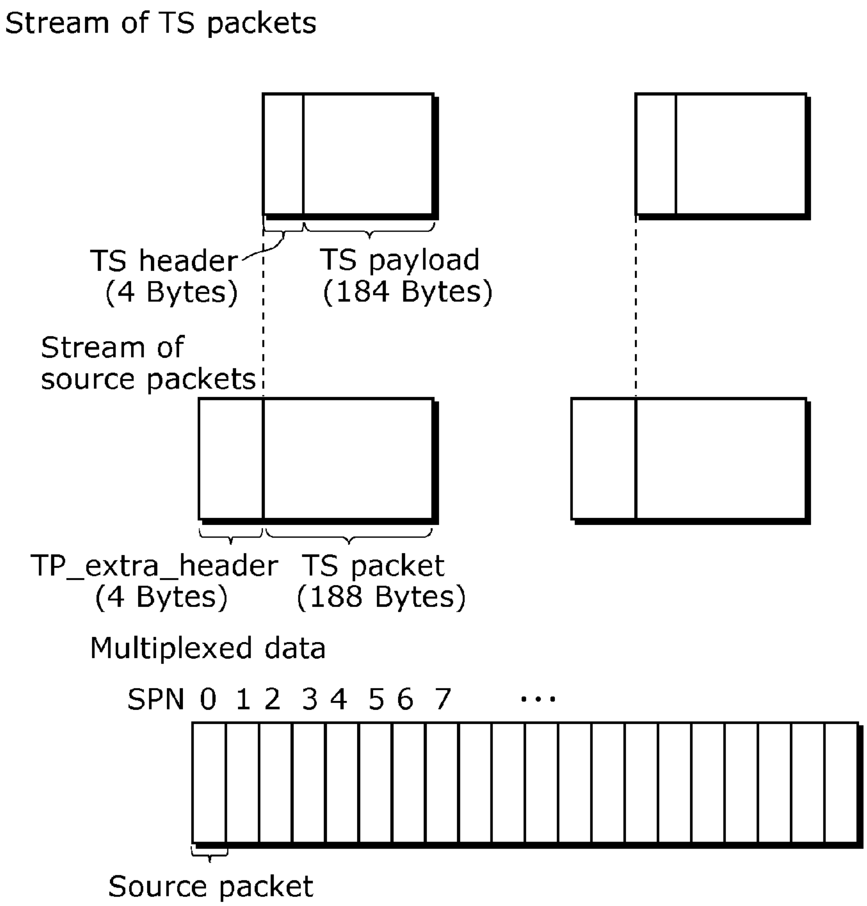
FIG. 34 shows a structure of TS packets and source packets in the multiplexed data.

FIG. 34 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 34. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 35:
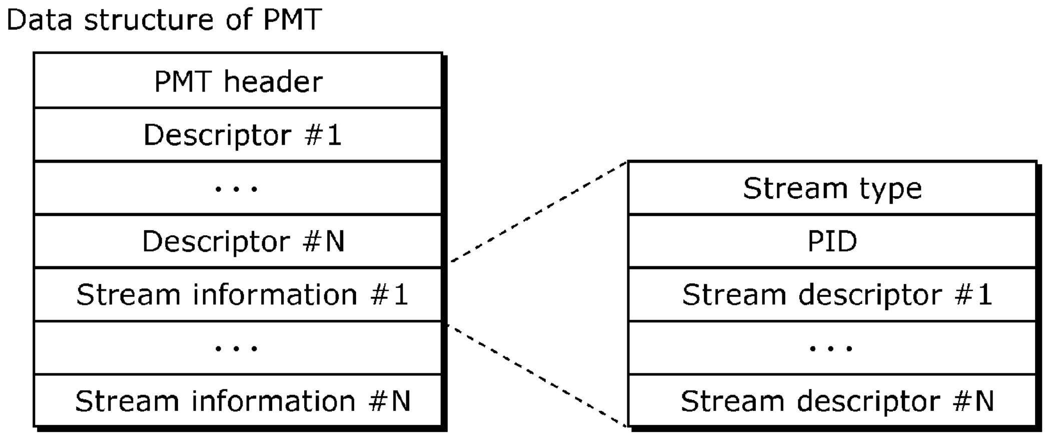
FIG. 35 shows a data structure of a PMT.

FIG. 35 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 36:
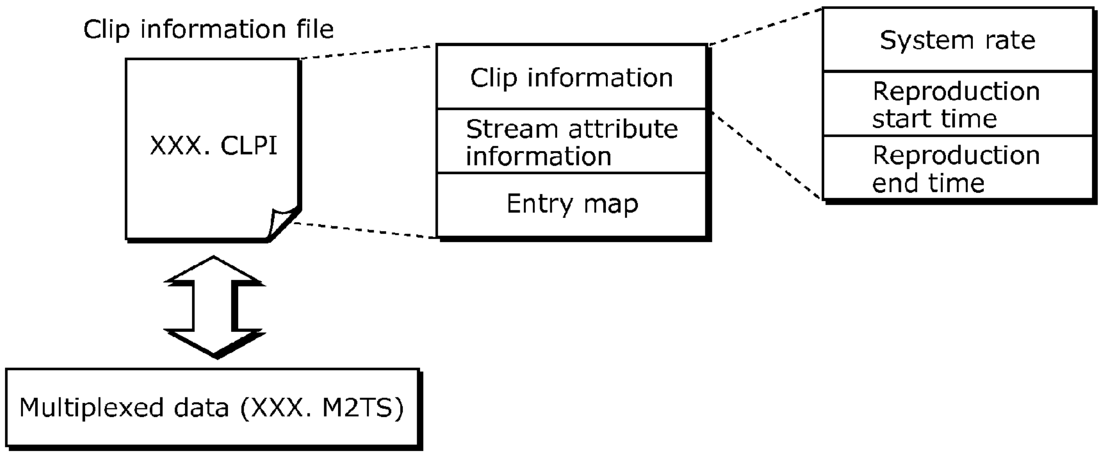
FIG. 36 shows an internal structure of multiplexed data information.

Each of the multiplexed data information files is management information of the multiplexed data as shown in FIG. 36. The multiplexed data information files are in one to one correspondence with the multiplexed data, and each of the files includes multiplexed data information, stream attribute information, and an entry map.

As illustrated in FIG. 36, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 37:
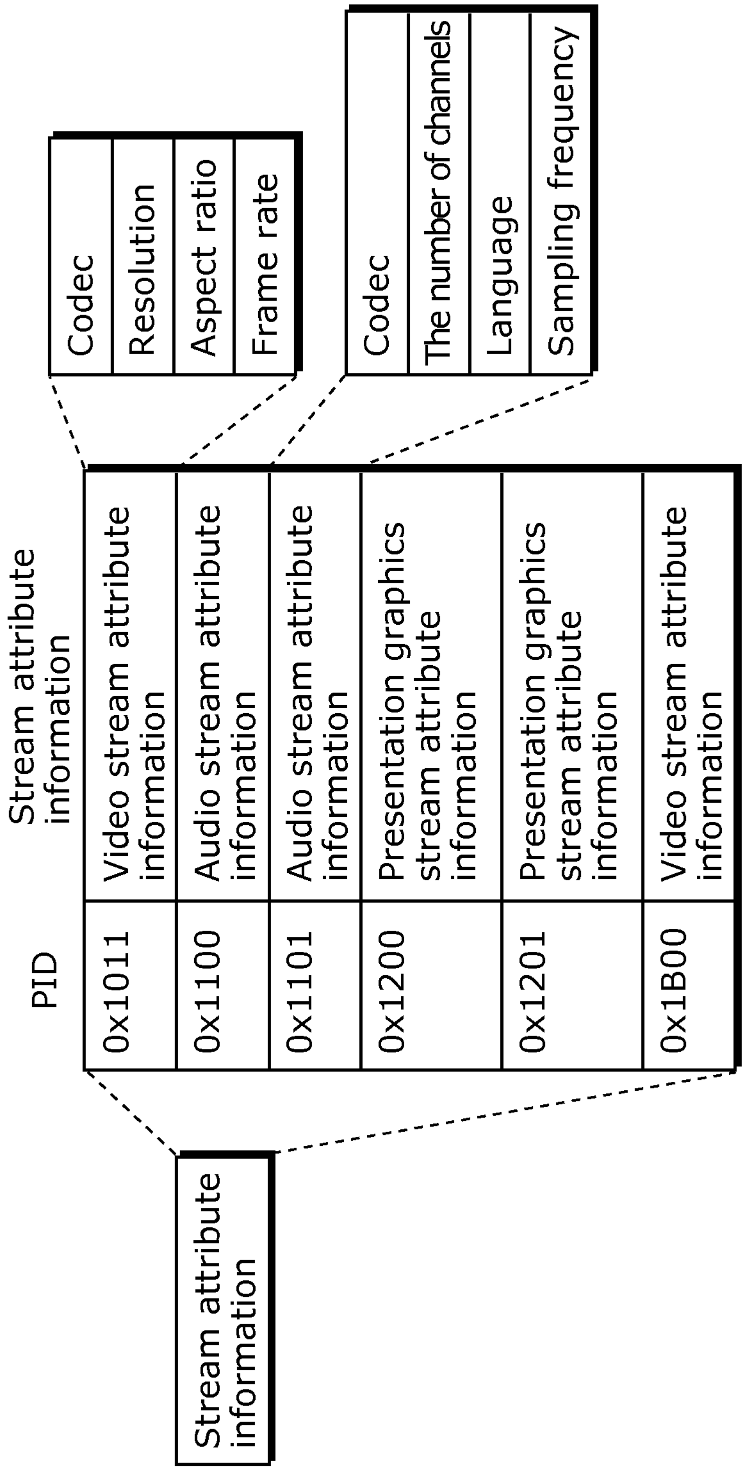
FIG. 37 shows an internal structure of stream attribute information.

As shown in FIG. 37, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 38:
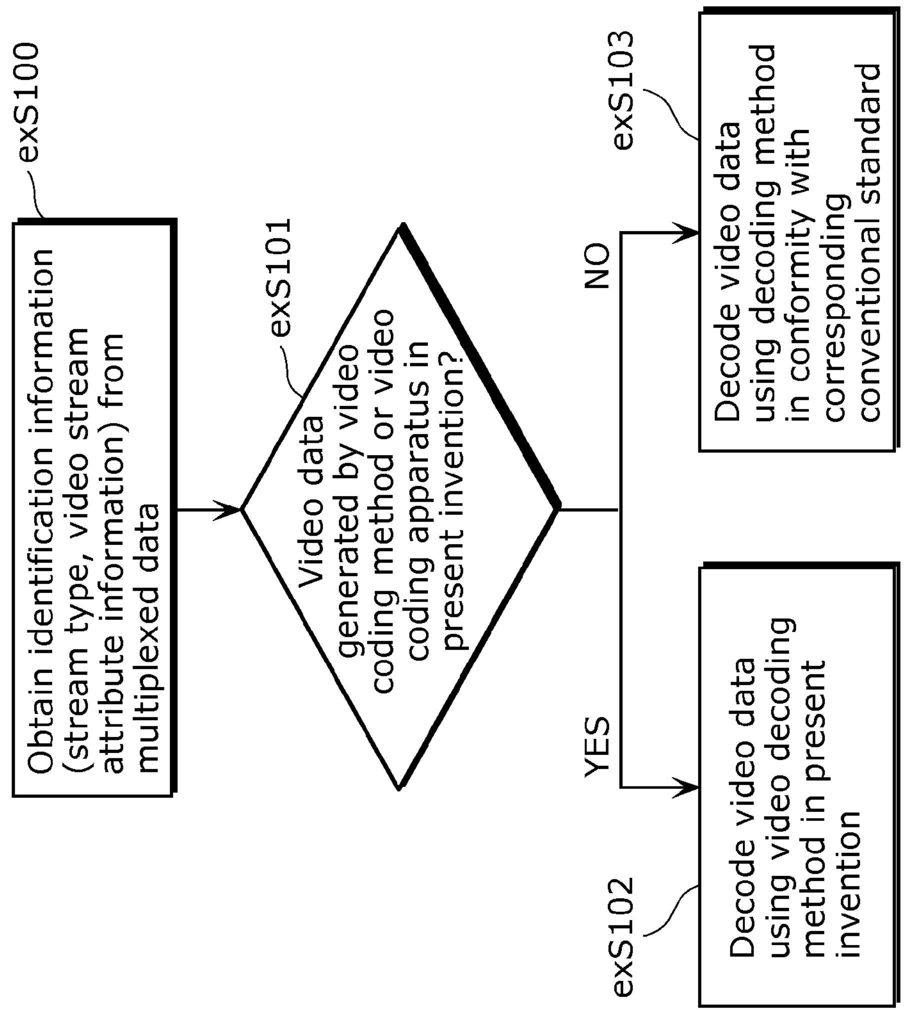
FIG. 38 shows steps for identifying video data.

Furthermore, FIG. 38 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 7

Figure 39:
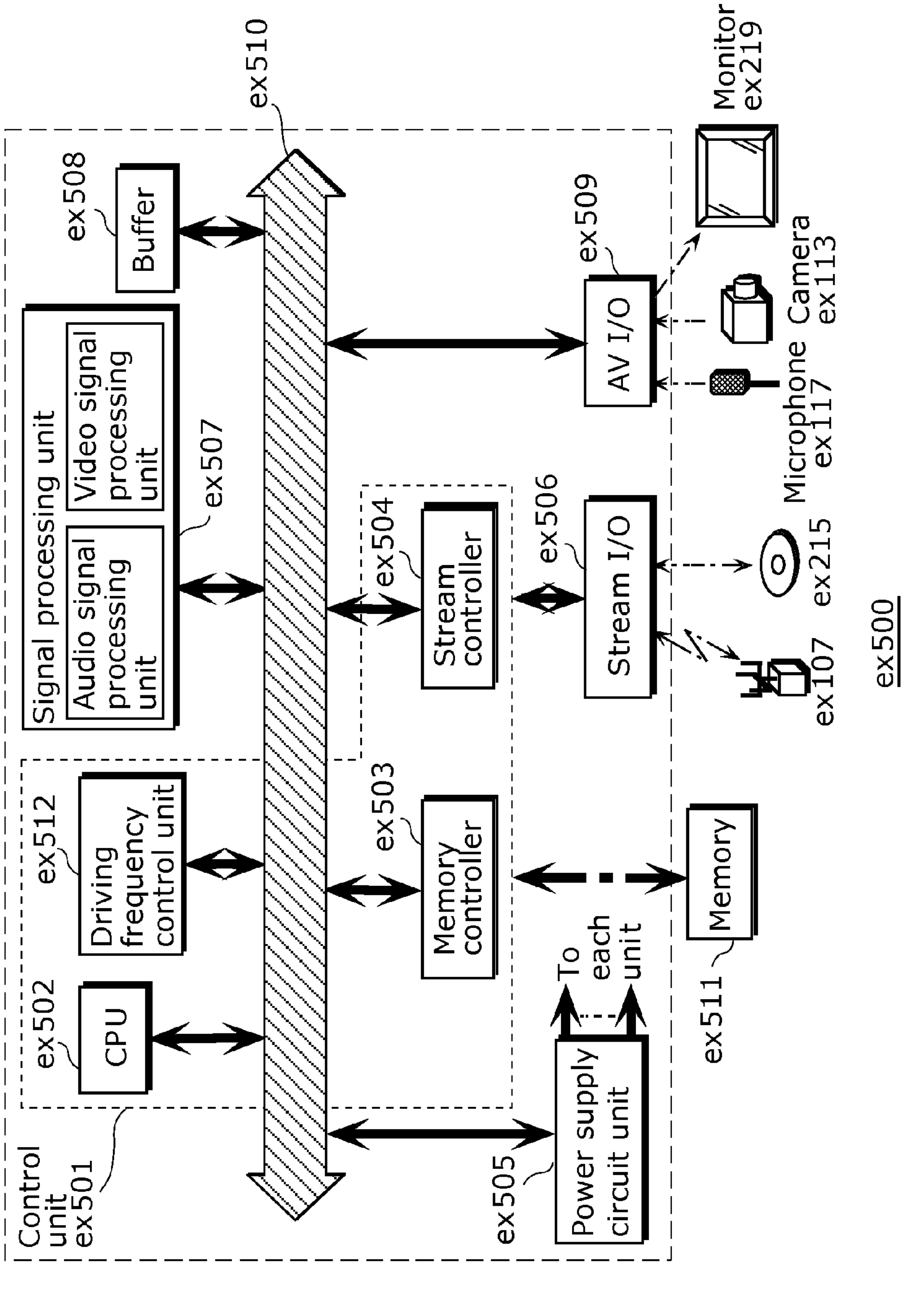
FIG. 39 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 39 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 8

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 40:
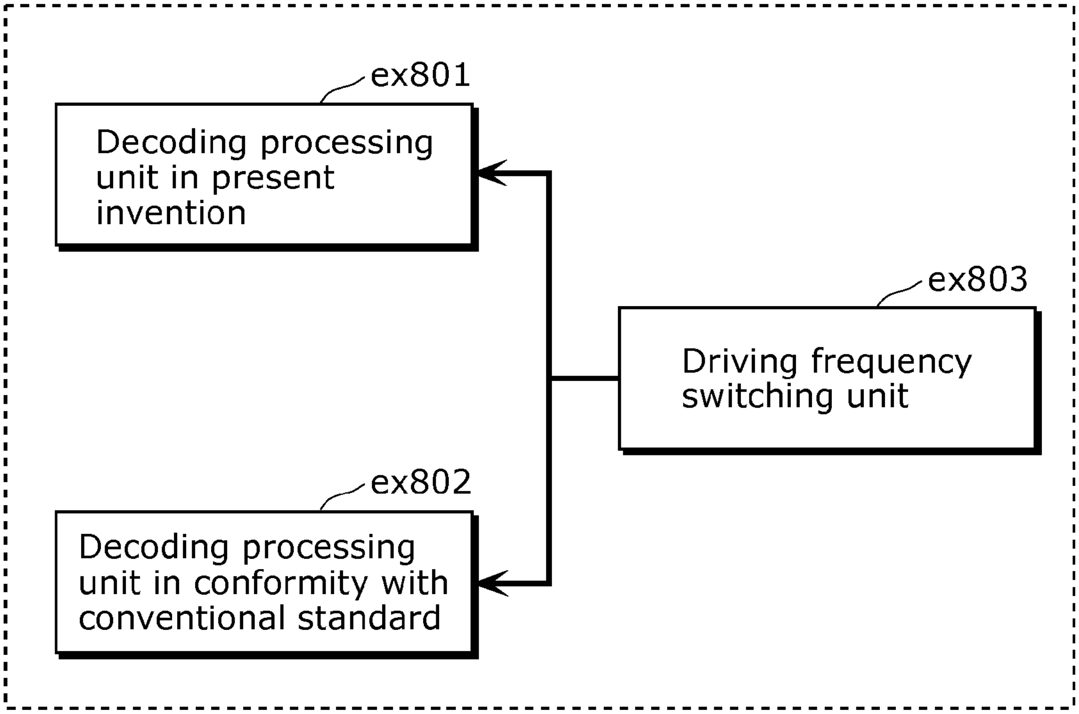
FIG. 40 shows a configuration for switching between driving frequencies.

In order to solve the problem, the moving picture decoding apparatus, such as the television ex300 and the LSI ex500 is configured to determine the standard to which the video data conforms, and switch between the driving frequencies according to the determined standard. FIG. 40 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 39. Here, each of the decoding processing unit ex801 that executes the moving picture decoding method described in each of embodiments and the decoding processing unit ex802 that conforms to the conventional standard corresponds to the signal processing unit ex507 in FIG. 39. The CPU ex502 determines the standard to which the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 6 is probably used for identifying the video data. The identification information is not limited to the one described in Embodiment 6 but may be any information as long as the information indicates the standard to which the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 42. The driving frequency can be selected by storing the look-up table in the buffer ex508 and in an internal memory of an LSI, and with reference to the look-up table by the CPU ex502.

Figure 41:
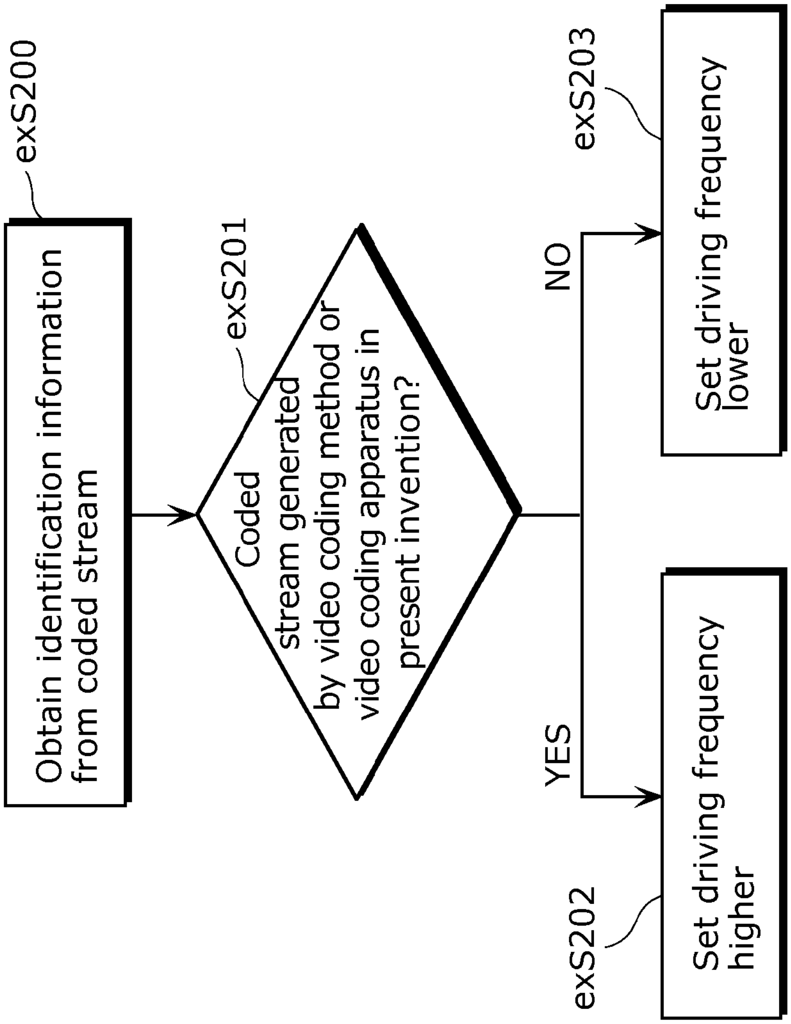
FIG. 41 shows steps for identifying video data and switching between driving frequencies.

FIG. 41 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 43:
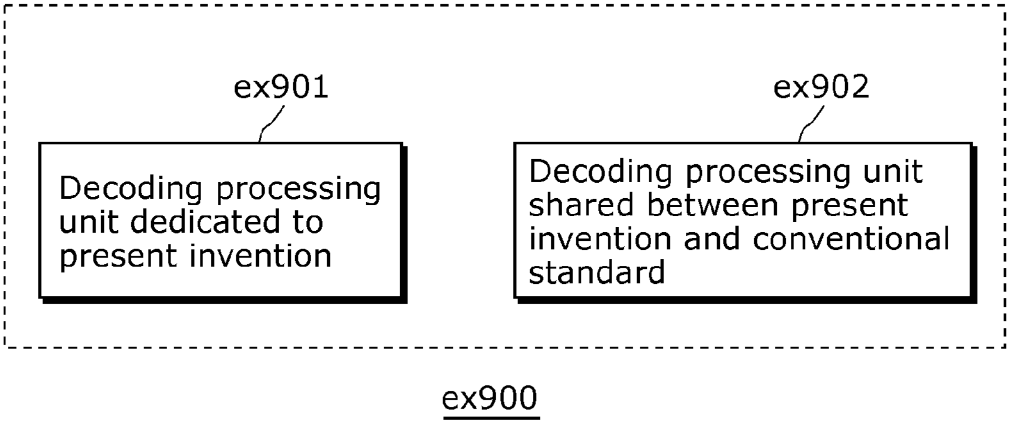
In FIG. 43, (a) is a diagram showing an example of a configuration for sharing a module of a signal processing unit, and (b) is a diagram showing another example of a configuration for sharing a module of the signal processing unit.
Figure 43:
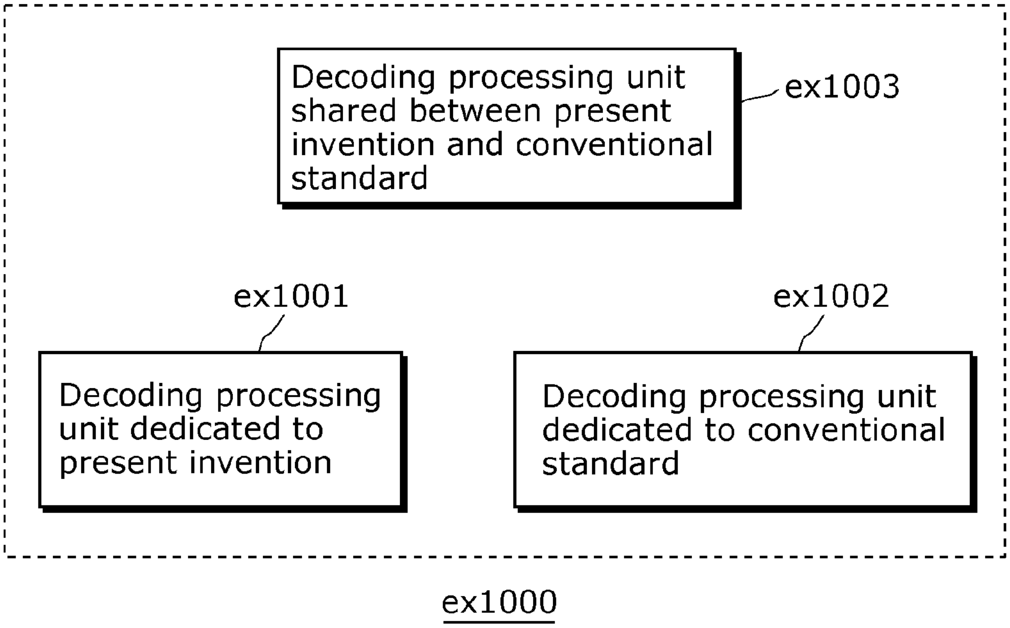

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in (a) of FIG. 43 shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present invention and does not conform to MPEG-4 AVC. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in (b) of FIG. 43 shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The present invention is advantageously used for image decoding methods and image coding methods.

REFERENCE SIGNS LIST

10, 30, 90 Arithmetic decoder
11, 22, 31, 42, 91. Context selection unit
12, 23, 32, 43, 92 Context load unit
13, 33, 93 Binary arithmetic decoder
14, 34, 94 De-binarizer
15, 25, 35, 45 State reservoir
16, 26 Group context update unit
17, 27, 37, 47, 96 Context memory
20, 40 Arithmetic encoder
21, 41 Binarizer
24, 44 Binary arithmetic encoder
36, 46 Parallel context update unit
95 Context update unit
200 Image coding apparatus
205 Subtractor
210 Transform and quantization unit
220 Entropy encoder
230, 420 Inverse quantization and inverse transform unit
235, 425 Adder
240, 430 Deblocking filter
250, 440 Memory
260, 450 Intra prediction unit
270 Motion estimation unit
280, 460 Motion compensation unit
290, 470 Intra/inter switch
400 Image decoding apparatus
410 Entropy decoder
600, 800 Context management unit
601, 801 Context update unit
602, 603, 802, 803 Switch
604, 804 Control unit
605, 805 Context memory A
606, 806 Context memory B

The invention claimed is:

1. An image decoding method for decoding coded image data, the image decoding method comprising:
- deriving a context for each of a plurality of target signals in a processing unit based on a type of the target signal;
- performing arithmetic decoding on the target signal according to the context and a symbol occurrence probability determined based on the context;
- determining whether or not the arithmetic decoding for each of the target signals is performed; and
- executing a context update process on each context for the processing unit when the arithmetic decoding for the each of target signals is performed,
- wherein the processing unit is one of a transform unit, a coding unit and a group of coding units, the transform unit being a unit where transformation of the image data is performed and the coding unit being a unit where coding of the image data is performed.

2. The image decoding method according to claim 1,
- wherein, in the executing, the context update processes on the target signals in the processing unit are executed in an order inverse to a decoding order of the signals.

3. The image decoding method according to claim 1,
- wherein, in the executing, the context update processes are executed such that part of target signals including decoding symbols in the processing unit are executed last in the processing unit and in an order inverse to a decoding order of the part of signals.

4. The image decoding method according to claim 1,
- wherein, in the executing, the each context is not updated when at least one of the target signals is not decoded.

5. An image coding method for compression-coding image data, the image coding method comprising:
- deriving a context for each of a plurality of target signals in a processing unit based on a type of the target signal;
- performing arithmetic coding on the target signal according to the context and a symbol occurrence probability determined based on the context;
- determining whether or not the arithmetic coding for each of the target signals is performed; and
- executing a context update process on each context for the processing unit when the arithmetic coding for the each of target signals is performed,
- wherein the processing unit is one of a transform unit, a coding unit and a group of coding units, the transform unit being a unit where transformation of the image data is performed and the coding unit being a unit where coding of the image data is performed.

6. The image coding method according to claim 5, wherein, in the executing, the context update processes on the signals in the processing unit are executed in an order inverse to a coding order of the signals.

7. The image coding method according to claim 5, wherein, in the executing, the context update processes are executed such that part of signals including coding symbols in the processing unit are executed last and in an order inverse to a coding order of the part of signals.

* * * * *